(12) United States Patent
Kurasawa et al.

(10) Patent No.: US 11,036,332 B2
(45) Date of Patent: Jun. 15, 2021

(54) COVER MEMBER AND DISPLAY APPARATUS

(71) Applicant: Japan Display Inc., Tokyo (JP)

(72) Inventors: Hayato Kurasawa, Tokyo (JP); Shoji Hinata, Tokyo (JP); Toshinori Uehara, Tokyo (JP); Hiroshi Mizuhashi, Tokyo (JP); Yuji Suzuki, Tokyo (JP); Yasuhiro Kanaya, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/828,166

(22) Filed: Mar. 24, 2020

(65) Prior Publication Data

US 2020/0225805 A1 Jul. 16, 2020

Related U.S. Application Data

(63) Continuation of application No. 16/366,400, filed on Mar. 27, 2019, now Pat. No. 10,635,238, which is a (Continued)

(30) Foreign Application Priority Data

Jul. 11, 2016 (JP) .................................. 2016-137132

(51) Int. Cl.
*G06F 3/041* (2006.01)
*G06K 9/00* (2006.01)
*G06F 3/044* (2006.01)

(52) U.S. Cl.
CPC ........ *G06F 3/04166* (2019.05); *G06F 3/0412* (2013.01); *G06F 3/0445* (2019.05);
(Continued)

(58) Field of Classification Search
CPC .................................... G06K 9/00006–9/0012
See application file for complete search history.

(56) References Cited

U.S. PATENT DOCUMENTS 6,401,551 B1  6/2002  Kawahara et al.
6,462,563 B1  10/2002  Kawahara et al.
(Continued)

FOREIGN PATENT DOCUMENTS

JP  2001-046359 A  2/2001
JP  2001-052148 A  2/2001
(Continued)

OTHER PUBLICATIONS

Japanese Office Action dated Mar. 23, 2021 for the corresponding Japanese patent application No. 2020-007112, with an English machine translation.

*Primary Examiner* — Laurence J Lee
(74) *Attorney, Agent, or Firm* — Michael Best & Friedrich LLP

(57) ABSTRACT

Included are a first cover base including an alkali glass layer, a first alkali-free glass layer provided on one face of the alkali glass layer, and a second alkali-free glass layer provided on another face of the alkali glass layer and a sensor that is provided on the first alkali-free glass layer of the first cover base and includes a plurality of first electrodes configured to detect the unevenness of a surface of an object to be detected that comes into contact with or close to the first cover base and a switching element. At least the first electrodes are formed above the first alkali-free glass layer and in a transmissive area that passes an image.

21 Claims, 36 Drawing Sheets

Related U.S. Application Data continuation of application No. 15/642,792, filed on Jul. 6, 2017, now Pat. No. 10,282,029.

(52) U.S. Cl.
CPC ......... *G06F 3/0446* (2019.05); *G06K 9/0002* (2013.01); *G06K 9/00053* (2013.01); *G06F 2203/0338* (2013.01); *G06F 2203/04107* (2013.01); *G06F 2203/04108* (2013.01)

(56) References Cited

U.S. PATENT DOCUMENTS

| | | |
|---|---|---|
| 2012/0092293 A1 | 4/2012 | Ganapathi et al. |
| 2012/0280368 A1 | 11/2012 | Garner et al. |
| 2014/0232952 A1 | 8/2014 | Watanabe et al. |
| 2014/0333328 A1 | 11/2014 | Nelson et al. |
| 2016/0026842 A1 | 1/2016 | Withers et al. |
| 2016/0077622 A1 | 3/2016 | Lee et al. |
| 2016/0132713 A1 | 5/2016 | Bae et al. |
| 2017/0038897 A1 | 2/2017 | Park et al. |
| 2017/0372123 A1 | 12/2017 | Kim et al. |

FOREIGN PATENT DOCUMENTS

| | | |
|---|---|---|
| JP | 2004-138416 A | 5/2004 |
| JP | 2011-093728 A | 5/2011 |
| JP | 2013-140440 A | 7/2013 |
| JP | 2013-541780 A | 11/2013 |
| JP | 2014-157311 A | 8/2014 |
| JP | 2015-152995 A | 8/2015 |
| JP | 2015-201164 A | 11/2015 |
| WO | 2016/105263 A1 | 6/2016 |

COVER MEMBER AND DISPLAY APPARATUS

CROSS-REFERENCE TO RELATED APPLICATIONS

The present application is a Continuation of application Ser. No. 16/366,400, filed Mar. 27, 2019, which is a Continuation of application Ser. No. 15/642,792, filed Jul. 6, 2017, now U.S. Pat. No. 10,282,029, issued on May 7, 2019, which claims priority from Japanese Application No. 2016-137132, filed on Jul. 11, 2016, the contents of which are incorporated by reference herein in its entirety.

BACKGROUND

1. Technical Field

The present disclosure relates to a cover member and a display apparatus.

2. Description of the Related Art

Some display apparatuses including a liquid crystal panel or the like may include a fingerprint sensor. The fingerprint sensor detects a capacitance change responsive to the unevenness of a fingerprint to detect the shape of the fingerprint of a finger that has come into contact with the display apparatus (Japanese Patent Application Laid-open Publication No. 2001-52148 A (JP-A-2001-52148), for example). A detection result of the fingerprint sensor is used for personal authentication, for example. A cover glass for protecting the liquid crystal panel or the like is provided on the surface of the fingerprint sensor, and a finger is brought into contact with or close to the surface of the cover glass, whereby the fingerprint sensor can detect the fingerprint.

When a fingerprint sensor is arranged on a display area of the liquid crystal panel, the cover glass is arranged in between the fingerprint sensor and a finger. Given this situation, the distance between the finger and the fingerprint sensor is long, which may make it difficult to obtain favorable detection sensitivity. The fingerprint reading apparatus described in JP-A-2001-52148 includes detection electrodes for detecting fingerprints and the liquid crystal panel in an integral manner. Consequently, when the cover glass is provided on the liquid crystal panel, the distance between the surface of the cover glass and the detection electrodes is long, which may reduce detection performance.

SUMMARY

According to one aspect, a cover member includes a first cover base that comprises an alkali glass layer, a first alkali-free glass layer provided on one face of the alkali glass layer, and a second alkali-free glass layer that is provided on another face of the alkali glass layer, and a sensor that is provided on the first alkali-free glass layer of the first cover base and comprises a plurality of first electrodes configured to detect unevenness of a surface of an object to be detected that comes into contact with or close to the first cover base and a switching element. At least the first electrodes are formed above the first alkali-free glass layer and in a transmissive area that passes an image.

According to one aspect, a display apparatus includes a cover member that includes a first cover base that comprises an alkali glass layer, a first alkali-free glass layer provided on one face of the alkali glass layer, and a second alkali-free glass layer that is provided on another face of the alkali glass layer, and a sensor that is provided on the first alkali-free glass layer of the first cover base and comprises a plurality of first electrodes configured to detect unevenness of a surface of an object to be detected that comes into contact with or close to the first cover base and a switching element. At least the first electrodes are formed above the first alkali-free glass layer and in a transmissive area that passes an image, and a display panel that comprises a display functional layer configured to display an image and that is provided at a position overlapping with the transmissive area when viewed in a direction perpendicular to a surface of the first cover base, the display panel facing the second alkali-free glass layer of the first cover base.

DETAILED DESCRIPTION

The following describes forms (embodiments) for performing the present invention in detail with reference to the accompanying drawings. The present invention is not limited to the details described in the following embodiments. Components described below include ones that those skilled in the art can easily think of and substantially the same ones. Further, the components described below can be combined as appropriate. The disclosure is only by way of example, and some appropriate modifications that can be easily thought of with the gist of the invention maintained by those skilled in the art are naturally included in the scope of the present invention. The drawings may schematically illustrate the width, thickness, shape, and the like of the components compared with actual forms in order to further clarify the description; they are only by way of example and do not limit the interpretation of the present invention. In the present specification and the drawings, components similar to those previously described with reference to the drawings previously described are denoted by the same symbols, and detailed descriptions thereof may be omitted as appropriate.

First Embodiment

Figure 1:
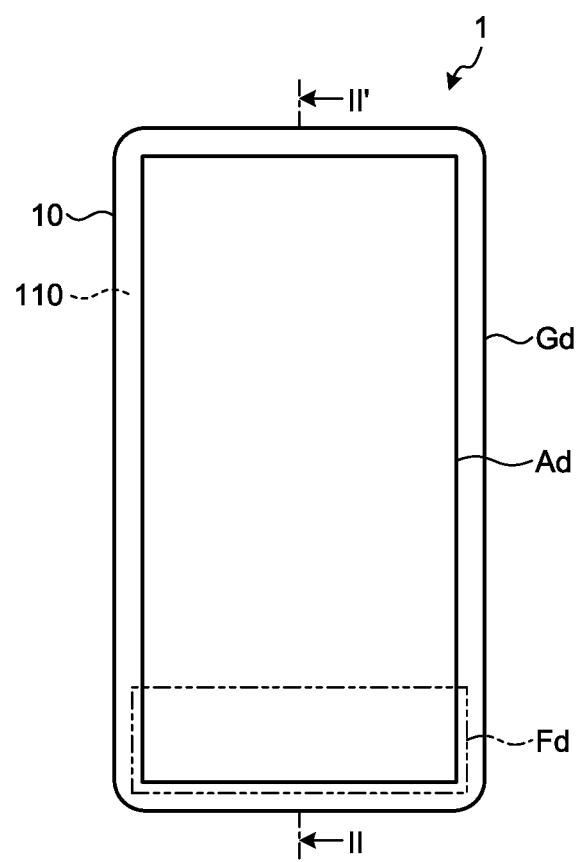
FIG. 1 is a plan view of a display apparatus according to a first embodiment.
Figure 2:
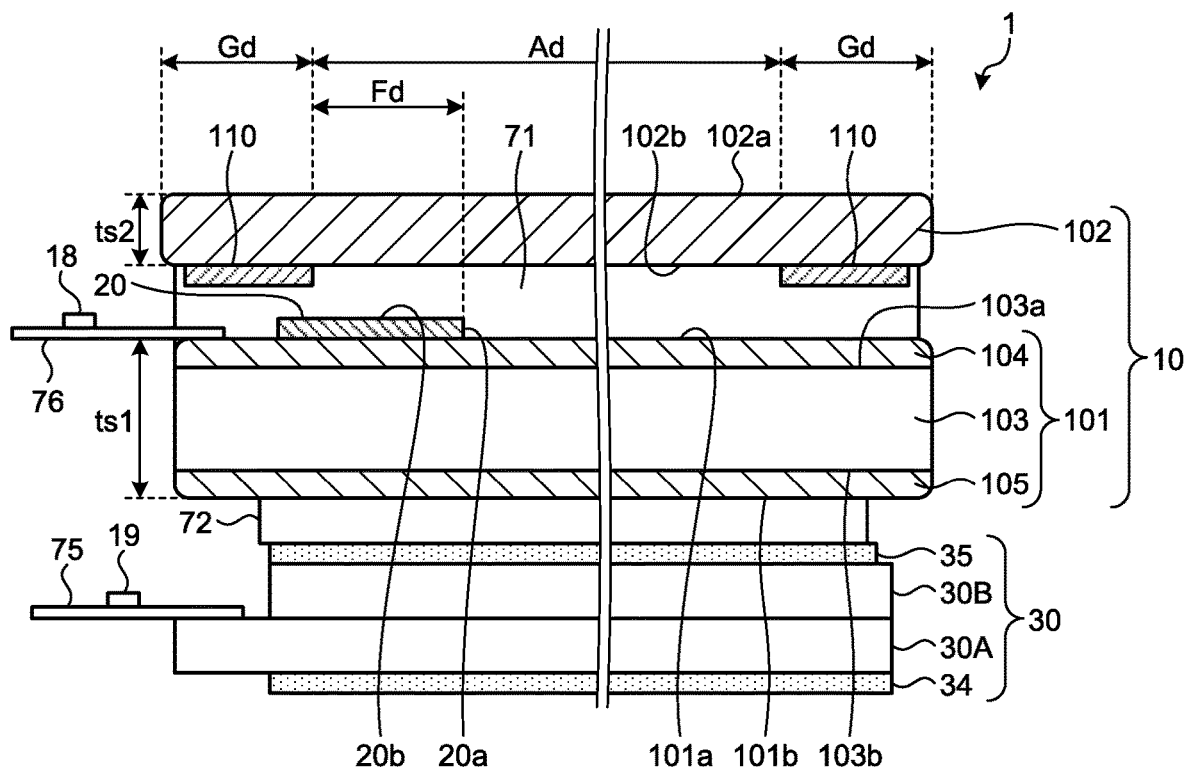
FIG. 2 is a sectional view along the line II-II' in FIG. 1.

FIG. 1 is a plan view of a display apparatus according to a first embodiment. FIG. 2 is a sectional view along the line II-II' in FIG. 1. As illustrated in FIG. 2, this display apparatus 1 of the present embodiment includes a cover member 10 and a display panel 30. The cover member 10 is a member protecting the display panel 30 and is provided covering the display panel 30. As illustrated in FIG. 1 and FIG. 2, the cover member 10 has a transmissive area Ad that passes an image of the display panel 30, a frame area Gd provided outside the transmissive area Ad, and a fingerprint detection area Fd overlapping with part of the transmissive area Ad. In the present embodiment, the fingerprint detection area Fd is a rectangular area along the short side of the transmissive area Ad and is an area for detecting the unevenness of the surface of an object to be detected such as a fingerprint of a finger that comes into contact with or close to the cover member 10.

As illustrated in FIG. 2, the cover member 10 includes a first cover base 101, a second cover base 102, and a fingerprint sensor 20. The first cover base 101 is a plate-shaped member having a first face 101a and a second face 101b on a side opposite to the first face 101a. The second cover base 102 is a plate-shaped member having a first face 102a and a second face 102b on a side opposite to the first face 102a. The first face 101a of the first cover base 101 is arranged facing the second face 102b of the second cover base 102 with an adhesive layer 71 interposed therebetween. The first face 102a of the second cover base 102 is a detection face for detecting fine unevenness of the surface of the object to be detected such as a fingerprint of a finger that comes into contact therewith or close thereto and is a display face through which a viewer visually recognizes the image of the display panel 30 having passed through the transmissive area Ad. The fingerprint sensor 20 is provided in between the first cover base 101 and the second cover base 102. The display panel 30 is laminated on the second face 101b side of the first cover base 101 with an adhesive layer 72 interposed therebetween.

The first cover base 101 includes an alkali glass layer 103, a first alkali-free glass layer 104, and a second alkali-free glass layer 105. The first alkali-free glass layer 104 is provided on a first face 103a of the alkali glass layer 103, whereas the second alkali-free glass layer 105 is provided on a second face 103b on a side opposite to the first face 103a. The upper face of the first alkali-free glass layer 104 forms the first face 101a of the first cover base 101, whereas the lower face of the second alkali-free glass layer 105 forms the second face 101b of the first cover base 101.

The alkali glass layer 103, the first alkali-free glass layer 104, and the second alkali-free glass layer 105 can be simultaneously integrated and formed by a known method such as the fusion process. The fusion process is a process that pours fused glass into a fusion pipe and pulls downward the overflowing fused glass to form it into a plate shape. The method for forming the first cover base 101 is not limiting; the alkali glass layer 103, the first alkali-free glass layer 104, and the second alkali-free glass layer 105 may be formed by separate processes.

For the first alkali-free glass layer 104 and the second alkali-free glass layer 105, used are glass materials that do not substantially contain alkali metal oxides such as lithium oxide ($Li_2O$), sodium oxide ($Na_2O$), and potassium oxide ($K_2O$). In other words, the first alkali-free glass layer 104 and the second alkali-free glass layer 105 do not contain any alkali metal oxides other than impurities of raw materials and alkali metal oxides mixed in a manufacturing process and the like.

The first alkali-free glass layer 104 and the second alkali-free glass layer 105 are smaller in a coefficient of thermal expansion than that of the alkali glass layer 103. For this reason, in forming the first cover base 101, the amount of in-plane contraction of the alkali glass layer 103 is larger than those of the first alkali-free glass layer 104 and the second alkali-free glass layer 105, and in-plane tensile stress is applied to the first alkali-free glass layer 104 and the second alkali-free glass layer 105 from the alkali glass layer 103. Compressive stress layers are formed on the first alkali-free glass layer 104 on the first face 101a side and the second alkali-free glass layer 105 on the second face 101b side, whereby the strength of the first cover base 101 is increased.

A glass material of the same composition is preferably used for the first alkali-free glass layer 104 and the second alkali-free glass layer 105. In this case, the first alkali-free glass layer 104 and the second alkali-free glass layer 105 have substantially the same coefficient of thermal expansion, thereby lessening the occurrence of warps in the first cover base 101. However, this is not limiting; glass materials with different compositions may be respectively used for the first alkali-free glass layer 104 and the second alkali-free glass layer 105. To lessen the occurrence of warps, the first alkali-free glass layer 104 and the second alkali-free glass layer 105 preferably have the same thickness; however, the first alkali-free glass layer 104 and the second alkali-free glass layer 105 may have different thicknesses each other.

The second cover base 102 is tempered glass using alkali glass. Examples of the tempered glass include, but are not limited to, chemically tempered glass that forms a compressive stress layer on the surface by replacing sodium (Na) ions on the surface of glass with potassium (K) ions having a larger ion radius and tempered glass that forms a compressive stress layer on the surface by feeding air to a heated glass substrate and quenching it. The second cover base 102 may be six-side tempered glass. The second cover base 102 is not limited to the tempered glass using alkali glass and can be sapphire glass or translucent ceramic (ceramic glass), for example. Using the sapphire glass or the translucent ceramic can increase the strength and hardness of the second cover base 102.

In the present embodiment, a thickness ts1 of the first cover base 101 is larger than a thickness ts2 of the second cover base 102. The thickness ts1 of the first cover base 101 can be 0.5 mm, for example. The thickness ts2 of the second cover base 102 can be smaller than the thickness ts1 of the first cover base 101 and is 0.2 mm, for example. In the cover member 10 of the present embodiment, even when the thickness ts2 of the second cover base 102 is small, the first cover base 101 and the second cover base 102 are laminated on each other with the adhesive layer 71 interposed therebetween, whereby the cover member 10 is formed in what is called a laminated glass shape, resulting in ability to maintain the strength of the cover member 10.

Both the cover member 10 and the display panel 30 are not limited to be rectangular-shaped in a plan view and may be circular-shaped, elliptic-shaped, or special-shaped with part of these external shapes omitted. The cover member 10 and the display panel 30 may be different in external shape such as a case in which the cover member 10 is circular-shaped, whereas the display panel 30 is regular polygonal-shaped. Further, the first cover base 101 and the second cover base 102 may differ in external shape. The cover member 10 is not limited to be plate-shaped, and a curved display having a curved surface can also be employed therefor such as a case in which the transmissive area Ad is formed by a curved surface or the frame area Gd is curved toward the display panel 30.

As illustrated in FIG. 1 and FIG. 2, in the frame area Gd, a decoration layer 110 is provided on the second face 102b of the second cover base 102. The decoration layer 110 is a colored layer having lower light transmittance than that of the cover member 10 and can lessen the visibility of wiring, circuits, and the like provided overlapping with the frame area Gd by a viewer. The decoration layer 110, which is provided on the second face 102b in the example illustrated in FIG. 2, may be provided on the first face 102a or provided on the first cover base 101. The decoration layer 110 is not limited to a single layer and may be formed by laminating a plurality of layers together.

The fingerprint sensor 20 is a detector configured to detect the unevenness of the surface of an object to be detected such as a fingerprint of a finger that comes into contact with or close to the first face 102a of the second cover base 102. As illustrated in FIG. 2, the fingerprint sensor 20 is provided on the first face 101a of the first cover base 101, that is, the first alkali-free glass layer 104. The fingerprint sensor 20 overlaps with the fingerprint detection area Fd and part of the frame area Gd when viewed in a direction perpendicular to the first face 101a. A flexible board 76 is provided on the first alkali-free glass layer 104 in the frame area Gd, with the fingerprint sensor 20 electrically coupled to the flexible board 76. An IC 18 for detection that controls the detection operation of the fingerprint sensor 20 is mounted on the flexible board 76.

The fingerprint sensor 20 is laminated on the second face 102b of the second cover base 102 with the adhesive layer 71 interposed therebetween. An end 20a of the fingerprint sensor 20 is provided at a position overlapping with the transmissive area Ad. A liquid adhesive having translucency is used for the adhesive layer 71, whereby the end 20a and an upper face 20b of the fingerprint sensor 20 come in intimate contact with the adhesive layer 71 to be embedded in a resin layer. Consequently, the occurrence of air bubbles can be lessened between the adhesive layer 71 and the fingerprint sensor 20 at a step between the end 20a of the fingerprint sensor 20 and the first alkali-free glass layer 104. An optical clear resin (OCR) as a liquid UV-curable resin can be used for the adhesive layer 71, for example. The adhesive layer 71 is applied onto the fingerprint sensor 20 and the first face 101a of the first cover base 101, is then laminated on the second cover base 102, and is cured by UV irradiation. The adhesive layer 71 is adjusted to have viscosity enough to maintain a certain shape before being cured.

Figure 3:
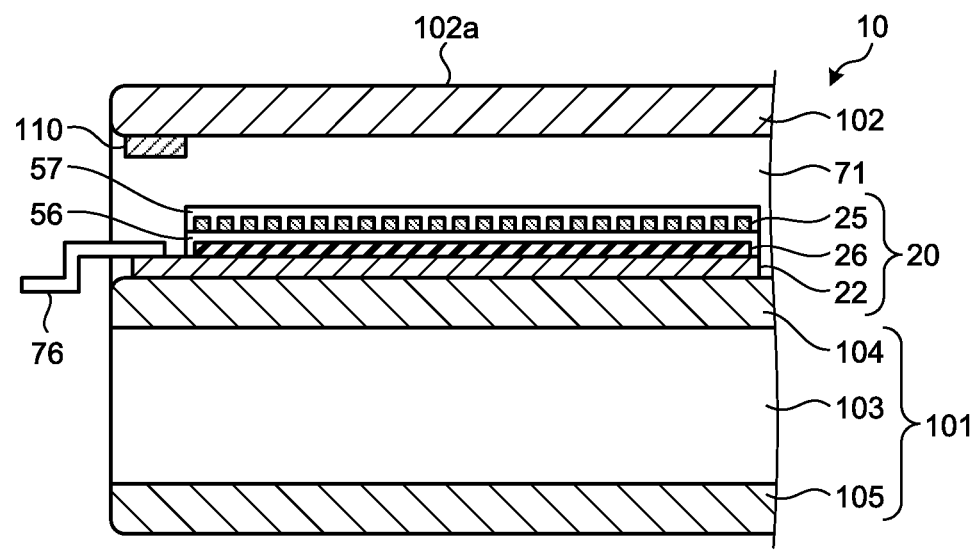
FIG. 3 is a sectional view of a schematic sectional structure of a fingerprint sensor.

FIG. 3 is a sectional view of a schematic sectional structure of the fingerprint sensor. As illustrated in FIG. 3, the fingerprint sensor 20 has a thin film transistor (TFT) layer 22, first electrodes 25, and a second electrode 26. The TFT layer 22 is provided on the first alkali-free glass layer 104 of the first cover base 101. The TFT layer 22 includes first switching elements Tr and various wires such as gate lines GCL and signal lines SGL.

The first electrodes 25 are provided on the upper side of the TFT layer 22. The first electrodes 25 are detection electrodes of the fingerprint sensor 20 and output a detection signal Vdet responsive to a capacitance change caused by the unevenness of the surface of the object to be detected such as a fingerprint of a finger that comes into contact therewith or close thereto. The detection signal Vdet output from the first electrodes 25 is output to the IC 18 for detection mounted on the flexible board 76 via the TFT layer 22. The second electrode 26 is provided in between the first electrodes 25 and the TFT layer 22. The second electrode 26 functions as a shield electrode for the first electrodes 25 to lessen a capacitance change caused by the existence of an external object such as a finger and/or a capacitance change caused by electromagnetic noise and the like on a side of the first electrodes 25 opposite to the second cover base 102.

An insulating layer 56 is provided in between the second electrode 26 and the first electrodes 25. An insulating layer 57 is provided on the first electrodes 25. The insulating layer 57 is adjacent to the adhesive layer 71 to cause the fingerprint sensor 20 and the second cover base 102 to adhere to each other. In other words, from the side of the first face 102a of the second cover base 102 as the detection face of the cover member 10, the first electrodes 25, the second electrode 26, and the TFT layer 22 are laminated in this order.

A translucent conductive material such as indium tin oxide (ITO) can be used for the first electrodes 25 and the second electrode 26. The fingerprint sensor 20 is a sensor having translucency and can lessen degradation in the image quality of the display panel 30 even when it is provided in part of or the entire transmissive area Ad.

The first electrodes 25 of the fingerprint sensor 20 detect the fingerprint based on a capacitance change caused by the fine unevenness of the surface of the finger. To obtain favorable detection sensitivity, the first electrodes 25 are preferably arranged at positions close to the first face 102a as the detection face. When only one glass substrate for protecting the fingerprint sensor 20 is provided on the upper face thereof, for example, the glass substrate is preferably made thinner in order to obtain favorable detection sensitivity. Specifically, the glass substrate preferably has a thickness of 0.3 mm or less. Meanwhile, when the thickness of the glass substrate is 0.5 mm or less, the glass substrate is generally prone to break.

In the present embodiment, the two glass substrates, or the first cover base 101 and the second cover base 102, are provided, with the fingerprint sensor 20 arranged in between the first cover base 101 and the second cover base 102. A pair of substrates are thus laminated on each other with the fingerprint sensor 20 interposed therebetween. With this configuration, the cover member 10 is formed in what is called a laminated glass shape. Consequently, even when the second cover base 102 is made thinner than 0.5 mm, the strength of the cover member 10 can be maintained. The thickness of the second cover base 102 can be reduced to 0.2 mm as described above, and accordingly the distance between the first electrodes 25 and the first face 102a as the detection face is short, making the distance to the surface of the finger as the object to be detected short. With this configuration, favorable detection sensitivity can be obtained. The first cover base 101 is on a side of the fingerprint sensor 20 opposite to the first face 102a as the detection face. With this configuration, even when the first cover base 101 is made thicker, detection sensitivity does not reduce. The cover member 10 of the present embodiment can thus increase strength to lessen the likelihood of breakage and obtain favorable detection sensitivity.

The TFT layer 22 is provided on the first alkali-free glass layer 104 directly or with a passivation film interposed therebetween. Consequently, the pollution of the first switching elements Tr and second switching elements Trx included in the TFT layer 22 by alkali components can be lessened. The first cover base 101 thus functions as a cover member protecting the display panel 30 and is used as a sensor base for mounting the fingerprint sensor 20 thereon.

As illustrated in FIG. 2, the display panel 30 has a pixel substrate 30A, a counter substrate 30B, a polarizing plate 34 provided on the underside of the pixel substrate 30A, and a polarizing plate 35 provided on the upper side of the counter substrate 30B. An IC 19 for display that controls the display operation of the display panel 30 is coupled to the pixel substrate 30A with a flexible board 75 interposed therebetween. In the present embodiment, the display panel 30 is a liquid crystal panel in which a liquid crystal display element is used as a display functional layer; this is not limiting, and the display panel 30 may be an organic EL display panel, for example. The IC 18 for detection and the IC 19 for display may be provided on a control substrate outside a module. The IC 19 for display may be provided on a first substrate 31 (refer to FIG. 4) of the pixel substrate 30A.

Figure 4:
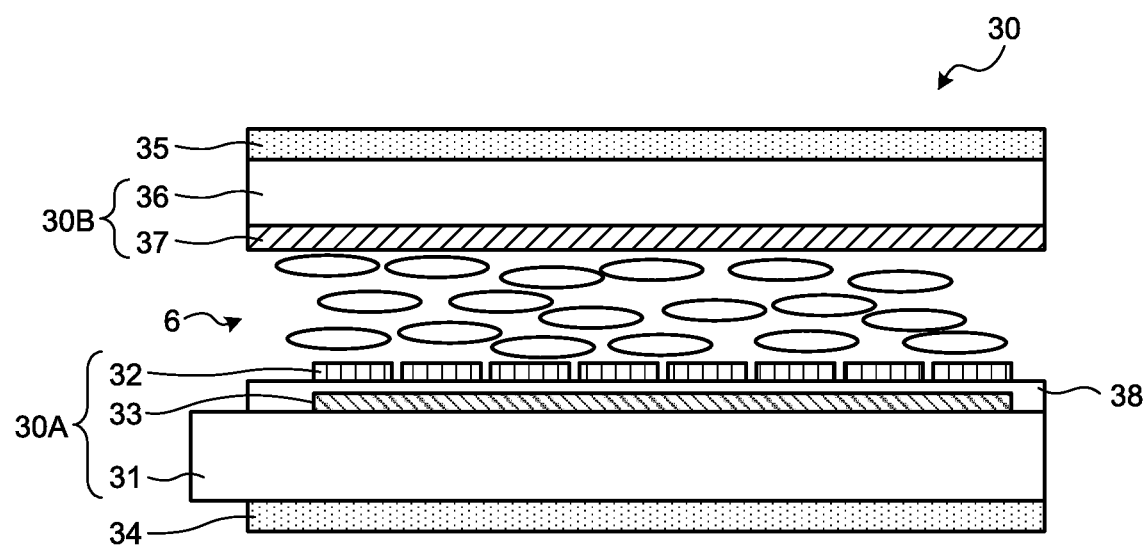
FIG. 4 is a sectional view of a schematic sectional structure of a display panel.

FIG. 4 is a sectional view of a schematic sectional structure of the display panel. The pixel substrate 30A includes the first substrate 31, pixel electrodes 32, and a common electrode 33. The common electrode 33 is provided to the first substrate 31. The multiple pixel electrodes 32 are provided on the upper side of the common electrode 33 with an insulating layer 38 interposed therebetween in a matrix (row-column configuration) manner in a plan view. The pixel electrodes 32 are provided corresponding to sub-pixels forming respective pixels Pix of the display panel 30, and a pixel signal for performing display operation is supplied thereto. A DC drive signal for display is supplied to the common electrode 33, which functions as a common electrode for the pixel electrodes 32.

In the present embodiment, the common electrode 33, the insulating layer 38, and the pixel electrodes 32 are laminated on the first substrate 31 in this order. The polarizing plate 34 is provided on the underside of the first substrate 31 with an adhesive layer (not illustrated) interposed therebetween. TFTs as switching elements for display are arranged on the first substrate 31 (not illustrated in FIG. 4). A conductive material having translucency such as ITO is used for the pixel electrodes 32 and the common electrode 33.

The arrangement of the pixel electrodes 32 is not limited to matrix-shaped arrangement in which they are arranged in a first direction and a second direction orthogonal to the first direction, and adjacent pixel electrodes 32 can be arranged in a manner displaced in the first direction or the second direction. Based on the difference in the size of adjacent pixel electrodes 32, for one pixel electrode 32 forming a pixel row arranged in the first direction, a plurality of, or two or three, pixel electrodes 32 can be arranged on one side of the pixel electrode 32.

The counter substrate 30B includes a second substrate 36 and a color filter 37 formed on one face of this second substrate 36. The color filter 37 faces a liquid crystal layer 6 in a direction perpendicular to the first substrate 31. Further, the polarizing plate 35 is provided to the second substrate 36 with an adhesive layer interposed therebetween. The color filter 37 may be arranged on the first substrate 31. In the present embodiment, the first substrate 31 and the second substrate 36 are glass substrates or resin substrates, for example.

The liquid crystal layer 6 is provided in between the first substrate 31 and the second substrate 36. The liquid crystal layer 6 modulates light passing therethrough in accordance with the state of an electric field, and liquid crystals of the transverse electric field mode such as in-plane switching (IPS) including fringe field switching (FFS) are used therefor, for example. An alignment film may be respectively arranged in between the liquid crystal layer 6 and the pixel substrate 30A and in between the liquid crystal layer 6 and the counter substrate 30B illustrated in FIG. 4.

An illuminator (a backlight device, not illustrated) is provided below the first substrate 31. The illuminator has a light source such as an LED and emits light from the light source toward the first substrate 31. The light from the illuminator passes through the pixel substrate 30A, and a part in which the light is shielded not to be emitted and a part in which the light is emitted are switched depending on the state of the liquid crystal at the position, whereby an image is displayed on the display face (the first face 102a).

As illustrated in FIG. 2, the display panel 30 is laminated on the second face 101b of the first cover base 101 with the adhesive layer 72 provided on the polarizing plate 35 interposed therebetween. As described above, the fingerprint sensor 20 is provided on the first face 101a of the first cover base 101. The fingerprint sensor 20 is thus arranged at a position closer to the first face 102a as the detection face than the display panel 30 in a direction perpendicular to the first face 102a of the second cover base 102. With this configuration, compared with a case in which detection electrodes for fingerprint detection are provided integrally with the display panel 30, for example, the distance between the first electrodes 25 as the detection electrodes and the first face 102a as the detection face can be reduced. Consequently, the display apparatus 1 of the present embodiment can improve detection performance.

An optical clear adhesive (OCA) is used for the adhesive layer 72, for example. The optical clear adhesive is a translucent double-sided adhesive tape in which adhesive layers are provided on both sides of a film-shaped base. The above-described optical clear resin (OCR) may be used as the adhesive layer 72.

Figure 5:
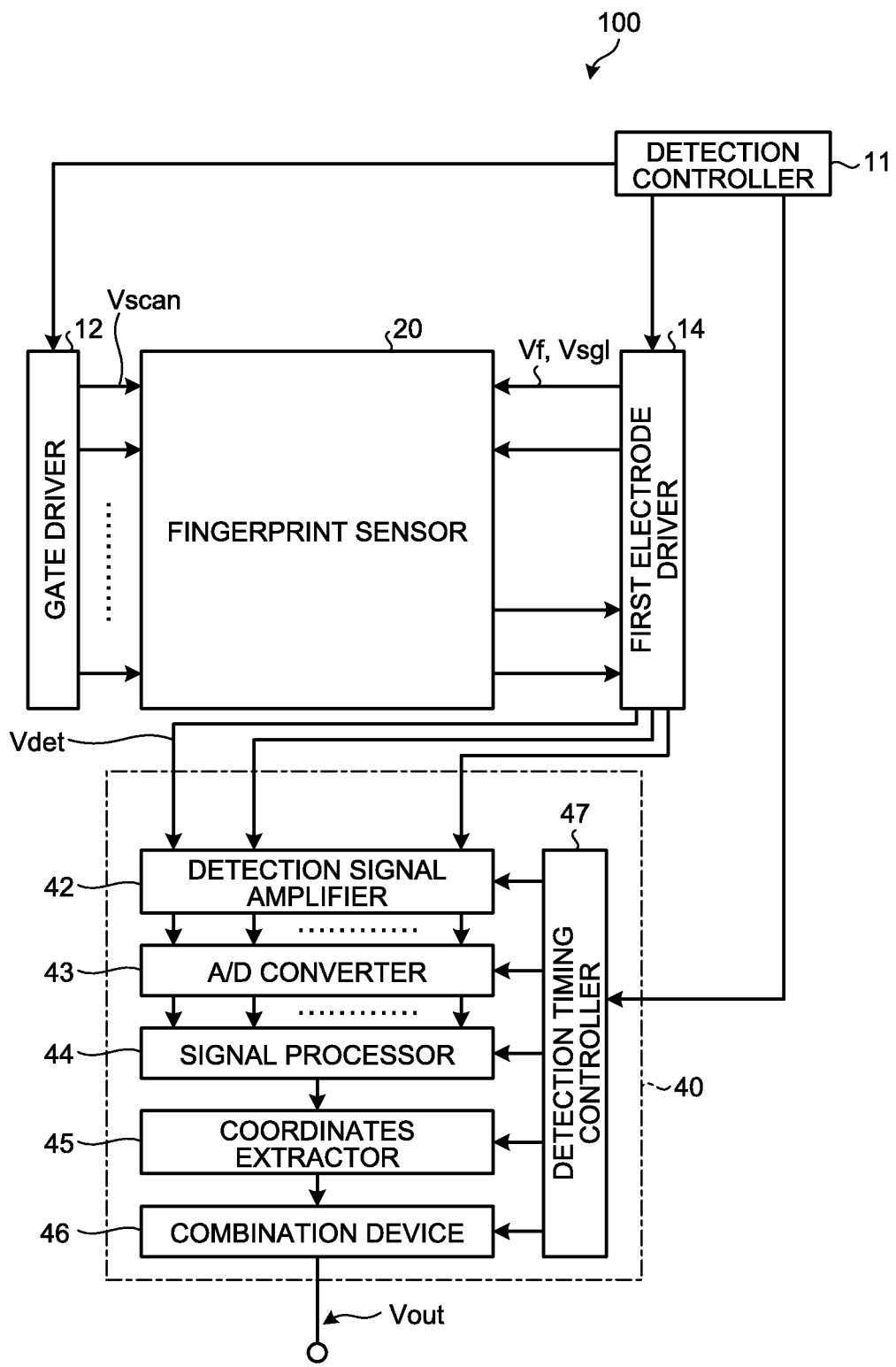
FIG. 5 is a block diagram of a configuration example of a detection apparatus including the finger sensor.

The following describes a detailed configuration of the fingerprint sensor 20. FIG. 5 is a block diagram of a configuration example of a detection apparatus including the finger sensor. As illustrated in FIG. 5, this detection apparatus 100 includes the fingerprint sensor 20, a detection controller 11, a gate driver 12, a first electrode driver 14, and a detector 40.

The fingerprint sensor 20 successively scans detection lines one by one in accordance with a scan signal Vscan supplied from the gate driver 12 to perform detection. The fingerprint sensor 20 detects the unevenness of the surface of the object to be detected such as a fingerprint of a finger that comes into contact therewith or close thereto based on self-capacitance-type detection principle.

The detection controller 11 is a circuit that respectively supplies control signals to the gate driver 12, the first electrode driver 14, and the detector 40 and performs control to cause these devices to operate in sync with each other. The gate driver 12 successively selects a first electrode block 25A including a plurality of first electrodes 25 as objects of the detection drive of the fingerprint sensor 20 based on the control signal supplied from the detection controller 11. The first electrode driver 14 supplies a drive signal Vf to the first electrodes 25 as objects of the detection drive of the fingerprint sensor 20 based on the control signal supplied from the detection controller 11.

The detector 40 is a circuit configured to detect the presence or absence of a touch with a fine pitch based on the control signal supplied from the detection controller 11 and the detection signal Vdet supplied from the fingerprint sensor 20 via the first electrode driver 14. The detector 40 includes a detection signal amplifier 42, an A/D converter 43, a signal processor 44, a coordinates extractor 45, a combination device 46, and a detection timing controller 47. The detection timing controller 47 performs control to cause the detection signal amplifier 42, the A/D converter 43, the signal processor 44, the coordinates extractor 45, and the combination device 46 to operate in sync with each other based on the control signal supplied from the detection controller 11.

The detection signal Vdet is supplied to the detection signal amplifier 42 of the detector 40 from the fingerprint sensor 20 via the first electrode driver 14. The detection signal amplifier 42 amplifies the detection signal Vdet. The A/D converter 43 samples respective analog signals output from the detection signal amplifier 42 with timing synchronized with the drive signal Vf and converts them into digital signals.

The signal processor 44 is a logic circuit configured to detect the presence or absence of a touch on the fingerprint sensor 20 based on the output signals of the A/D converter 43. The signal processor 44 performs processing to extract a differential signal (an absolute value $|\Delta V|$) of a detection signal by a finger. The signal processor 44 compares the absolute value $|\Delta V|$ with a certain threshold voltage and determines that an external close object is in a non-contact state if this absolute value $|\Delta V|$ is less than the threshold voltage. In contrast, if the absolute value $|\Delta V|$ is the threshold voltage or more, the signal processor 44 determines that the external close object is in a contact state. The detector 40 thus enables touch detection.

The coordinates extractor 45 is a logic circuit that, when a touch is detected by the signal processor 44, determines its detection coordinates. The coordinates extractor 45 outputs the detection coordinates to the combination device 46. The combination device 46 combines detection signals Vdet output from the fingerprint sensor 20 to generate two-dimensional information indicating the shape of the object that comes into contact therewith or close thereto. The combination device 46 outputs the two-dimensional information as output Vout of the detector 40. Alternatively, the combination device 46 may generate an image based on the two-dimensional information, and image information may be the output Vout.

The above described IC 18 for detection (refer to FIG. 2) functions as the detector 40 illustrated in FIG. 5. Part of the functions of the detector 40 may be included in the IC 19 for display or provided as functions of an external microprocessing unit (MPU).

Figure 6:
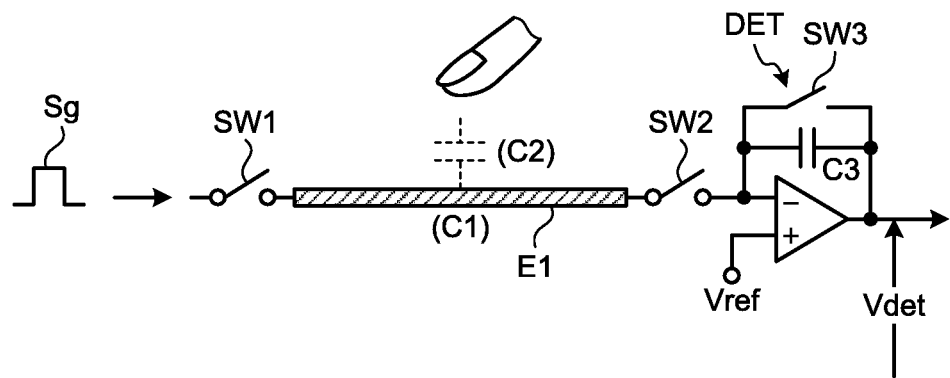
FIG. 6 is an illustrative diagram for illustrating the basic principle of touch detection of a self-capacitance type.
Figure 7:
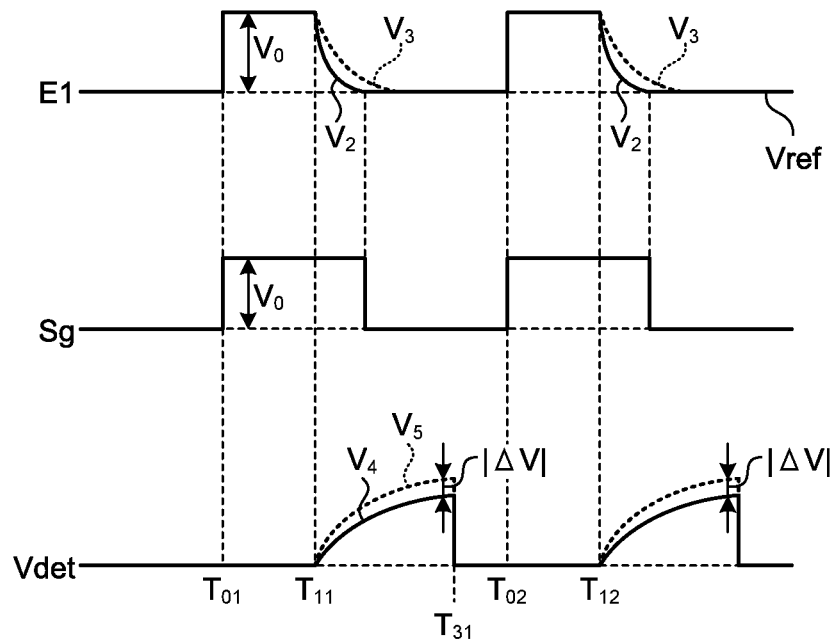
FIG. 7 is a diagram of examples of waveforms of a drive signal and a detection signal of touch detection of the self-capacitance type.

As described above, the fingerprint sensor 20 operates based on the basic principle of capacitance-type touch detection. The following describes the basic principle of touch detection by the self-capacitance type of the fingerprint sensor of the present embodiment with reference to FIG. 6 and FIG. 7. FIG. 6 is an illustrative diagram for illustrating the basic principle of touch detection of the self-capacitance type. FIG. 6 illustrates a finger as an external object to be detected as an example. FIG. 7 is a diagram of examples of waveforms of a drive signal and a detection signal of touch detection of the self-capacitance type. FIG. 6 illustrates a detection circuit together.

In a state in which the finger is well separate, an AC rectangular wave Sg with a certain frequency (about a few kilohertz to a few hundred kilohertz, for example) is applied to a detection electrode E1. The detection electrode E1 has a capacitance C1 and passes a current responsive to the capacitance C1 therethrough. A voltage detector DET converts fluctuations in current responsive to the AC rectangular wave Sg into fluctuations in voltage (a solid line waveform $V_4$ (refer to FIG. 7)).

Next, as illustrated in FIG. 6, with the finger in contact therewith or close thereto, a capacitance C2 between the finger and the detection electrode E1 is applied to the capacitance C1 of the detection electrode E1. Consequently, when the AC rectangular wave Sg is applied to the detection electrode E1, a current responsive to the capacitance C1 and the capacitance C2 passes. As illustrated in FIG. 7, the voltage detector DET converts fluctuations in current responsive to the AC rectangular wave Sg into fluctuations in voltage (a dotted line waveform $V_5$). Based on the absolute value $|\Delta V|$ of the difference between the waveform $V_4$ and the waveform $V_5$, the presence or absence of the finger (the presence or absence of a touch) can be measured.

Specifically, in FIG. 7, at time $T_{01}$, the AC rectangular wave Sg raises a voltage level corresponding to a voltage $V_0$. At this moment, a switch SW1 is turned on, whereas a switch SW2 is turned off, and the potential of the detection electrode E1 also rises to the voltage $V_0$. Next, before time $T_{11}$, the switch SW1 is turned off. At this moment, the detection electrode E1 is in a floating state, but the potential of the detection electrode E1 is maintained at $V_0$ by the capacitance C1 (or C1+C2, refer to FIG. 6) of the detection electrode E1. Further, before time $T_{11}$, resetting operation of the voltage detector DET is performed.

Subsequently, when the switch SW2 is turned on at time $T_{11}$, electric charges accumulated in the capacitance C1 (or C1+C2) of the detection electrode E1 move to a capacitance C3 within the voltage detector DET, and accordingly the output of the voltage detector DET rises (refer to the detection signal Vdet in FIG. 7). When the finger or the like is not close to the detection electrode E1, the output of the voltage detector DET (the detection signal Vdet) is the waveform $V_4$ indicated by the solid line, and Vdet=$C1 \times V_0$/C3. When capacitance by the influence of the finger or the like is added, the output of the voltage detector DET (the detection signal Vdet) is the waveform $V_5$ indicated by the dotted line, and Vdet=$(C1+C2) \times V_0$/C3.

Subsequently, at time $T_{31}$, the switch SW2 is turned off, and the switch SW1 and a switch SW3 are turned on, whereby the potential of the detection electrode E1 is turned to a low level, which is the same potential as that of the AC rectangular wave Sg, and the voltage detector DET is reset. The above operation is repeated with a certain frequency (about a few kilohertz to a few hundred kilohertz, for example).

Figure 8:
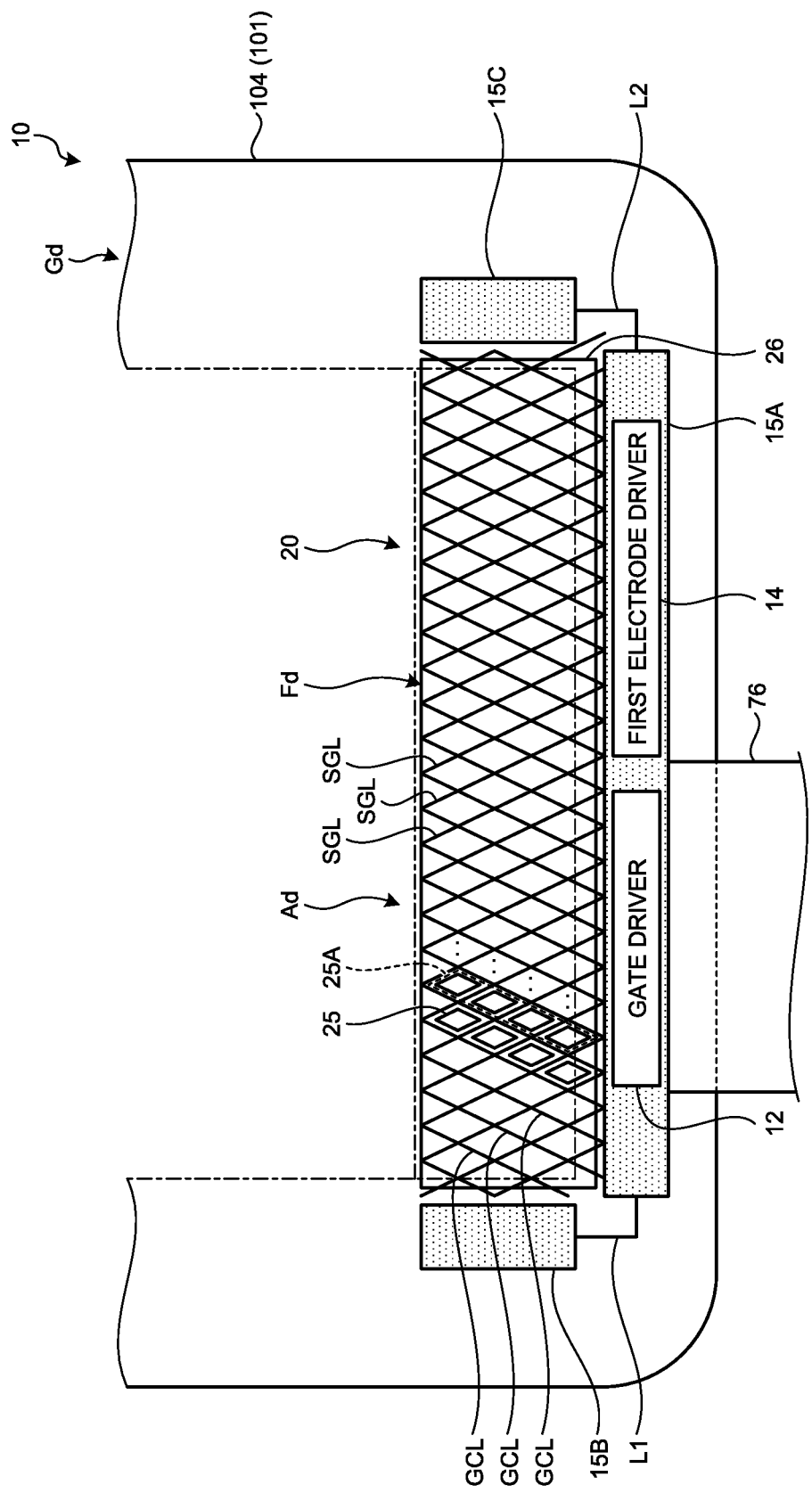
FIG. 8 is a plan view schematically illustrating an entire configuration of first electrodes, a second electrode, gate lines, and signal lines of the fingerprint sensor according to the first embodiment.
Figure 9:
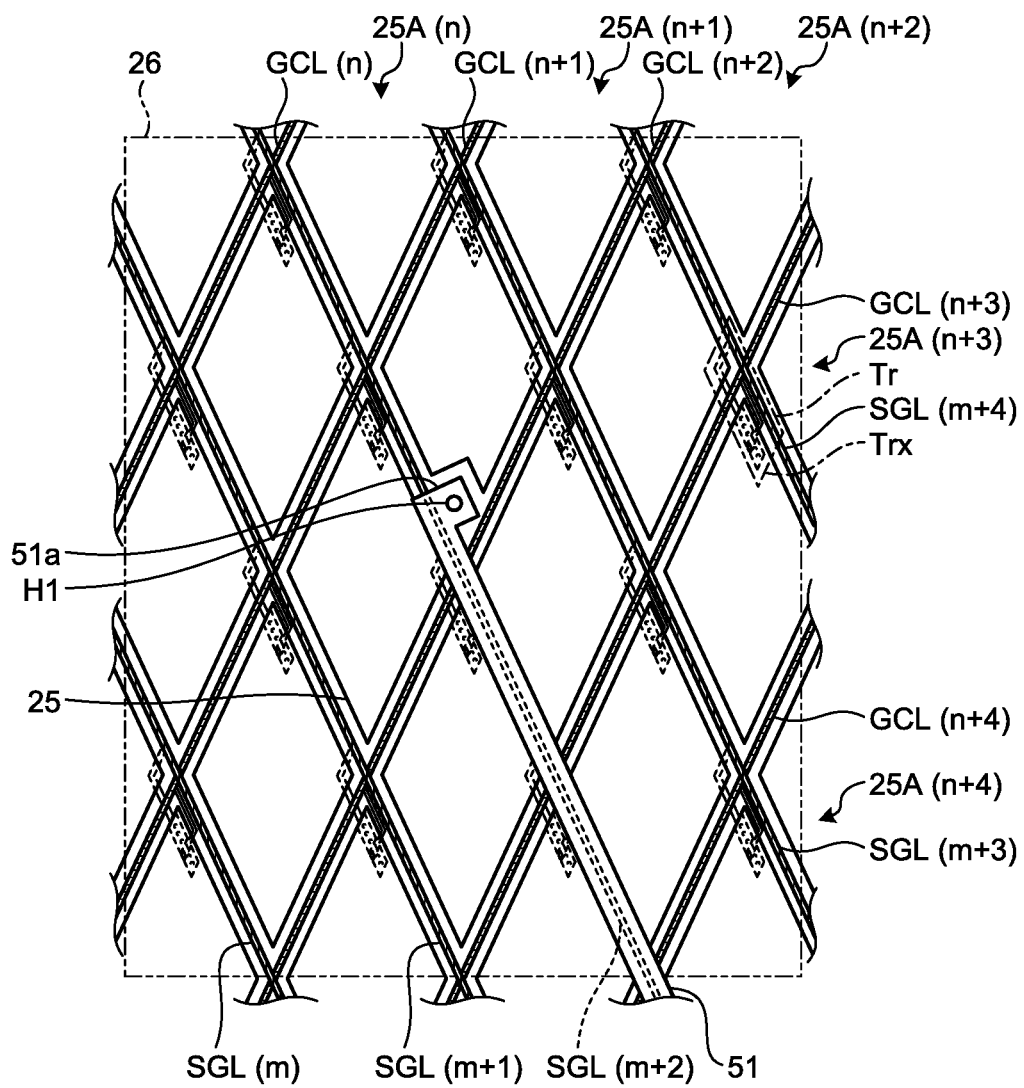
FIG. 9 is a schematic plan view of a configuration of the first electrodes and wires in an enlarged manner.

FIG. 8 is a plan view schematically illustrating an entire configuration of the first electrodes, the second electrode, gate lines, and signal lines of the fingerprint sensor according to the first embodiment. FIG. 9 is a schematic plan view of a configuration of the first electrodes and wires in an enlarged manner. FIG. 8 is a top view of the first cover base 101 of the cover member 10 when viewed from the second cover base 102 side, in which the second cover base 102 is omitted for easy viewing.

As illustrated in FIG. 8, the multiple first electrodes 25 of the fingerprint sensor 20 are arranged in a matrix manner on the first alkali-free glass layer 104 of the first cover base 101 in the fingerprint detection area Fd as part of the transmissive area Ad. The first electrodes 25 are each rhombic-shaped and are arranged so as to cause the respective sides of the rhombic shape to face each other. Although FIG. 8 illustrates only partial first electrodes 25 for easy viewing of the drawing, the first electrodes 25 may be provided in the entire fingerprint detection area Fd.

The second electrode 26 is provided continuously in the entire fingerprint detection area Fd overlapping with the first electrodes 25. In other words, each of the first electrodes 25 has a smaller area than the second electrode 26, and many first electrodes 25 are arranged for one second electrode 26. Although one second electrode 26 is provided in the fingerprint detection area Fd in FIG. 8, a plurality of second electrodes 26 may be provided, in which the second electrodes 26 may be arranged in a matrix manner, for example.

As illustrated in FIG. 8 and FIG. 9, a plurality of gate lines GCL and a plurality of signal lines SGL are provided overlapping with the second electrode 26. The gate lines GCL are inclined relative to a direction along the long side of the transmissive area Ad. The signal lines SGL are inclined in a direction opposite to the gate lines GCL relative to the direction along the long side of the transmissive area Ad. The signal lines SGL and the gate lines GCL cross each other to be arranged in a mesh manner. The rhombic-shaped first electrodes 25 are provided in the respective areas surrounded by the signal lines SGL and the gate lines GCL. Although each of the first electrode 25 is rhombic-shaped, in which the four sides are the same in length, this is not limiting; it may be parallelogrammatic-shaped, rectangular-shaped, or square-shaped, for example.

As illustrated in FIG. 8, in the frame area Gd, circuitries 15A, 15B, and 15C including drive circuits such as the gate driver 12 and the first electrode driver 14 are formed on the first alkali-free glass layer 104 of the first cover base 101. The gate driver 12 includes a scan signal generator that generates the scan signal Vscan and a gate scanner that selects any of the gate lines GCL. The first electrode driver 14 includes a drive signal generator that generates the drive signal Vf for detection and a selection circuit such as a multiplexer that selects any of the signal lines SGL.

The circuitry 15A is provided in the frame area Gd on the short side of the frame area Gd, that is, the side to which the flexible board 76 is coupled. On the short side of the frame area Gd, the signal lines SGL, the gate lines GCL, and the circuitry 15A are coupled to each other. The circuitry 15B is provided in one of the long sides of the frame area Gd, whereas the circuitry 15C is provided on the other of the long sides of the frame area Gd. The circuitries 15B and 15C are coupled to the signal lines SGL and the gate lines GCL on the respective long side sides of the frame area Gd.

The circuitries 15B and 15C are electrically coupled to the circuitry 15A via wires L1 and L2, respectively. The circuitries 15A, 15B, and 15C are electrically coupled to the flexible board 76 and operate on a control signal from the IC 18 for detection. The circuitries 15A, 15B, and 15C successively select the first electrodes 25 of the fingerprint detection area Fd to be driven.

The circuitries 15A, 15B, and 15C and the first electrodes 25 are thus provided on the first cover base 101. With this configuration, the length of various wires that couple the circuitries 15A, 15B, and 15C and the first electrodes 25 to each other can be reduced. Consequently, the responsivity of detection operation for the many first electrodes 25 is improved, thereby improving detection performance.

As illustrated in FIG. 9, the first switching elements Tr and the second switching elements Trx are provided at respective intersections of the signal lines SGL and the gate lines GCL. The first switching elements Tr and the second switching elements Trx are provided at respective positions corresponding to the first electrodes 25. The first switching elements Tr can switch between coupling and isolation between the signal lines SGL and the first electrodes 25. The second switching elements Trx can switch between coupling and isolation between the first electrodes 25 and the second electrode 26.

The first switching element Tr includes a thin film transistor and includes an n-channel metal oxide semiconductor (MOS)-type TFT in this example. The second switching element Trx performs switching operation opposite to that of the first switching element Tr. In this example, the second switching element Trx includes a p-channel MOS-type TFT. The same scan signal is supplied to the first switching elements Tr and the second switching elements Trx; when the scan signal is at a high level, the first switching elements Tr are turned on, whereas the second switching elements Trx are turned off, for example. When the scan signal is at a low level, the first switching elements Tr are turned off, whereas the second switching elements Trx are turned on.

As illustrated in FIG. 8, the gate lines GCL are coupled to the gate driver 12 provided on the first cover base 101. The gate driver 12 successively selects a plurality of gate lines GCL(n), GCL(n+1), . . . , GCL(n+4) illustrated in FIG. 9 and successively supplies the scan signal Vscan to the selected gate lines GCL(n), GCL(n+1), . . . , GCL(n+4). The first switching elements Tr are switched between on and off by the scan signal Vscan. The first electrodes 25 arranged along the gate lines GCL are selected as the first electrode block 25A as an object to be detected, and a high-level scan signal Vscan is supplied to the first switching elements Tr corresponding to the respective first electrodes 25 of the first electrode block 25A.

The signal lines SGL are coupled to the first electrode driver 14 provided on the first cover base 101. The first electrode driver 14 successively selects a plurality of signal lines SGL(m), SGL(m+1), . . . , SGL(m+4) and supplies the drive signal Vf to the selected signal lines SGL(m), SGL(m+1), . . . , SGL(m+4). With this operation, the drive signal Vf is supplied to the respective first electrodes 25 of the first electrode block 25A as the object to be detected via the signal lines SGL and the first switching elements Tr. Upon being supplied with the drive signal Vf, the respective first electrodes 25 output a signal responsive to a capacitance change to the IC 18 for detection via the signal lines SGL. With this operation, the fingerprint of the finger that comes into contact therewith or close thereto can be detected. The first electrodes 25 correspond to the detection electrode E1 in the basic principle of touch detection of the self-capacitance type.

As illustrated in FIG. 9, a conductive wire 51 is coupled to the second electrode 26 through a contact hole H1. In the present embodiment, one conductive wire 51 is coupled to one second electrode 26. The conductive wire 51 is routed from the fingerprint detection area Fd to the frame area Gd and is coupled to the circuitries 15A, 15B, and 15C (refer to FIG. 8). The circuitries 15A, 15B, and 15C supply a guard signal Vsgl to the conductive wire 51. The guard signal Vsgl is a voltage signal that is in sync with and has the same waveform as the drive signal Vf. The guard signal Vsgl is a voltage signal for lessening a capacitance change between the first electrodes 25 and the second electrode 26 when the drive signal Vf is supplied. The guard signal Vsgl having the same waveform as that of the drive signal Vf supplied to the first electrodes 25 is supplied in sync with the second electrode 26. With this operation, the second electrode 26 facing the first electrodes 25 is oscillated at the same potential as that of the first electrodes 25. With this operation, parasitic capacitance between the first electrodes 25 and the second electrode 26 when the drive signal Vf is supplied is reduced. Consequently, degradation in the detection sensitivity of the fingerprint sensor 20 can be lessened. Thus, in the present embodiment, the second electrode 26 functions as a shield electrode for the first electrodes 25.

Although the central part of the second electrode 26 is coupled to the conductive wire 51 in FIG. 9, an end of the second electrode 26 may be coupled to the conductive wire 51. One conductive wire 51 may be coupled to the second electrode 26 at a plurality of parts, or a plurality of conductive wires 51 may be coupled to one second electrode 26.

The first electrodes 25 can be coupled to the second electrode 26 via the second switching elements Trx. Among the first electrodes 25, the first electrodes 25 that are not selected as the first electrode block 25A as the object to be detected turn the first switching elements Tr off and turn the second switching elements Trx on. Consequently, the guard signal Vsgl is supplied to the first electrodes 25 around a first electrode block 25A(n) via the second electrode 26. Consequently, the electrodes around the first electrode block 25A(n) selected as the object to be detected are also oscillated at the same potential as that of the first electrode block 25A(n). With this operation, parasitic capacitance between the respective first electrodes 25 of the first electrode block 25A(n) and the first electrodes 25 therearound is reduced. Consequently, degradation in the detection sensitivity of the fingerprint sensor 20 can be lessened.

The gate lines GCL, the signal lines SGL, and the conductive wire 51 are formed of at least one metallic material of aluminum (Al), copper (Cu), silver (Ag), molybdenum (Mo), or an alloy of these metals. The conductive wire 51 may be a laminate of a plurality of layers using one or more of these metallic materials. To reduce reflectance, blackening treatment is preferably performed on the outermost surface of the gate lines GCL, the signal lines SGL, and the conductive wire 51.

As illustrated in FIG. 9, the conductive wire 51 is provided overlapping with the signal lines SGL and is provided along the signal lines SGL. Consequently, the visibility of the signal lines SGL can be lessened. The conductive wire 51, the signal lines SGL, and the gate lines GCL are provided in a manner inclined relative to the long side of the transmissive area Ad. In other words, the conductive wire 51, the signal lines SGL, and the gate lines GCL are inclined relative to the arrangement direction of the pixels Pix of the display panel 30, whereby the occurrence of moire can be lessened.

Figure 10:
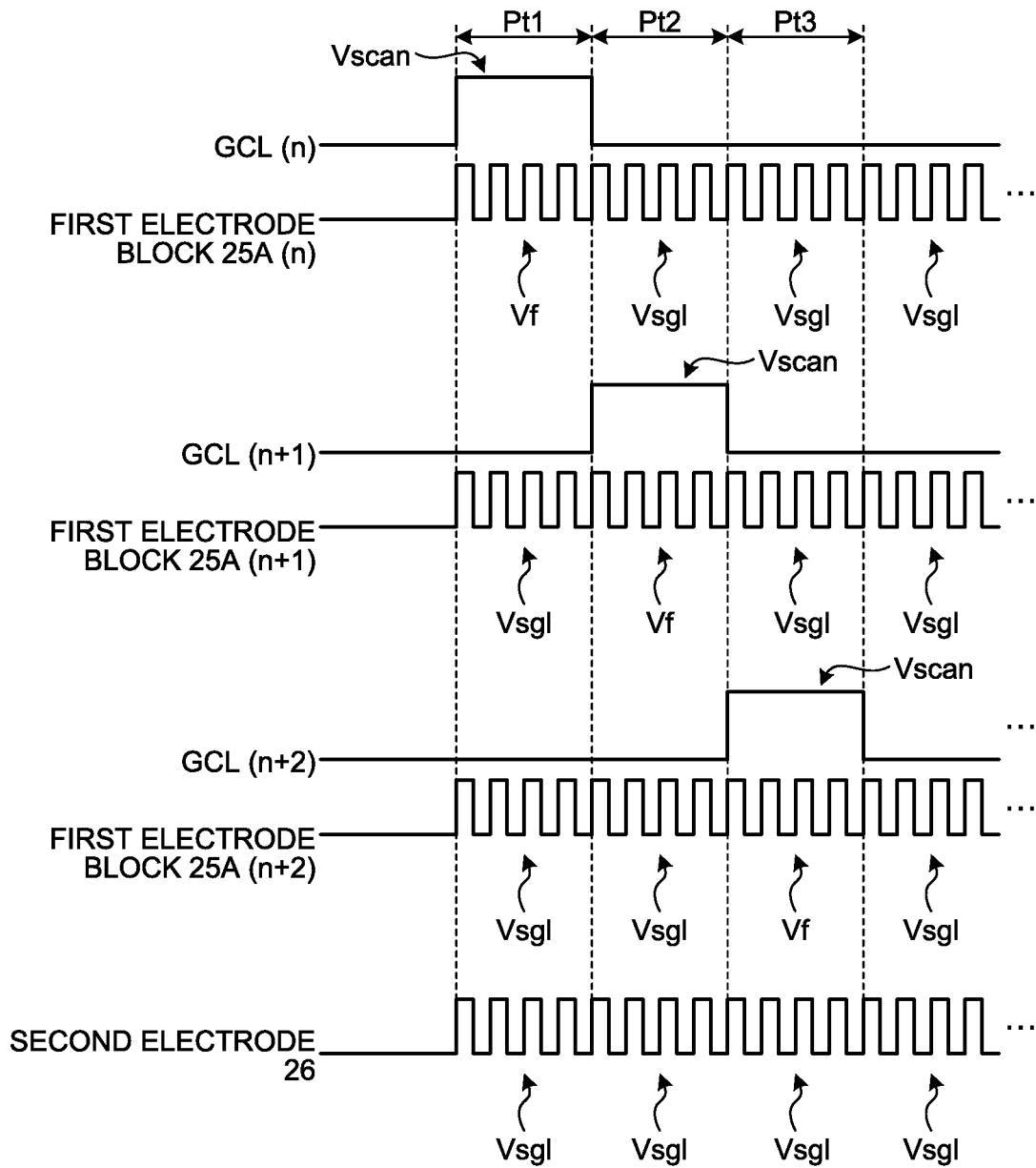
FIG. 10 is a timing waveform diagram of the fingerprint sensor according to the first embodiment.

The following describes an example of the detection operation of the fingerprint sensor 20. FIG. 10 is a timing waveform diagram of the fingerprint sensor according to the first embodiment. As illustrated in FIG. 10, detection periods Pt1, Pt2, and Pt3, . . . are arranged in a time division manner. In the detection period Pt1, an n-th gate line GCL(n) is selected, and the scan signal Vscan is turned on (high level). The first switching elements Tr coupled to the n-th gate line GCL(n) are supplied with the scan signal Vscan to be turned on. With this operation, the drive signal Vf is supplied to the respective first electrodes 25 of the first electrode block 25A(n) corresponding to the gate line GCL(n) via the signal line SGL(m).

In the detection period Pt1, the guard signal Vsgl is supplied to the second electrode 26. In gate lines GCL(n+1) and GCL(n+2) that are not selected, the scan signal Vscan is off (low level). Consequently, the second switching elements Trx coupled to the gate lines GCL(n+1) and GCL(n+2) are turned on. The guard signal Vsgl is supplied to first electrode blocks 25A(n+1) and 25A(n+2) that are not selected, via the second electrode 26. With this operation, parasitic capacitance between the first electrodes 25 and the second electrode 26 and parasitic capacitance between the first electrode block 25A(n) and the first electrodes 25 around the first electrode block 25A(n) are reduced. Consequently, degradation in the detection sensitivity of the fingerprint sensor 20 can be lessened.

Next, in the detection period Pt2, an (n+1)th gate line GCL(n+1) is selected, and the scan signal Vscan is turned on (high level). The first switching elements Tr coupled to the (n+1)th gate line GCL(n+1) are supplied with the scan signal Vscan to be turned on. With this operation, the drive signal Vf is supplied to each of the first electrodes 25 of the first electrode block 25A(n+1) corresponding to the gate line GCL(n+1) via the signal line SGL(m+1). In the detection period Pt2, the guard signal Vsgl is supplied to the second electrode 26 and the first electrode blocks 25A(n) and 25A(n+2) that are not selected.

In the detection period Pt3, an (n+2)th gate line GCL(n+2) is selected, and the scan signal Vscan is turned on (high level). The first switching elements Tr coupled to the (n+2)th gate line GCL(n+2) are supplied with the scan signal Vscan to be turned on. With this operation, the drive signal Vf is supplied to each of the first electrodes 25 of the first electrode block 25A(n+2) corresponding to the gate line GCL(n+2) via the signal line SGL(m+2). In the detection period Pt3, the guard signal Vsgl is supplied to the second electrode 26 and the first electrode blocks 25A(n) and 25A(n+1) that are not selected.

This operation is repeated, whereby the detection signal Vdet is output from the first electrode 25 at a position with which or to which the finger has come into contact or close in the fingerprint detection area Fd to the detector 40 (refer to FIG. 1) based on the self-capacitance-type detection principle. The detection operation of the fingerprint is thus performed by the fingerprint sensor 20.

Figure 11:
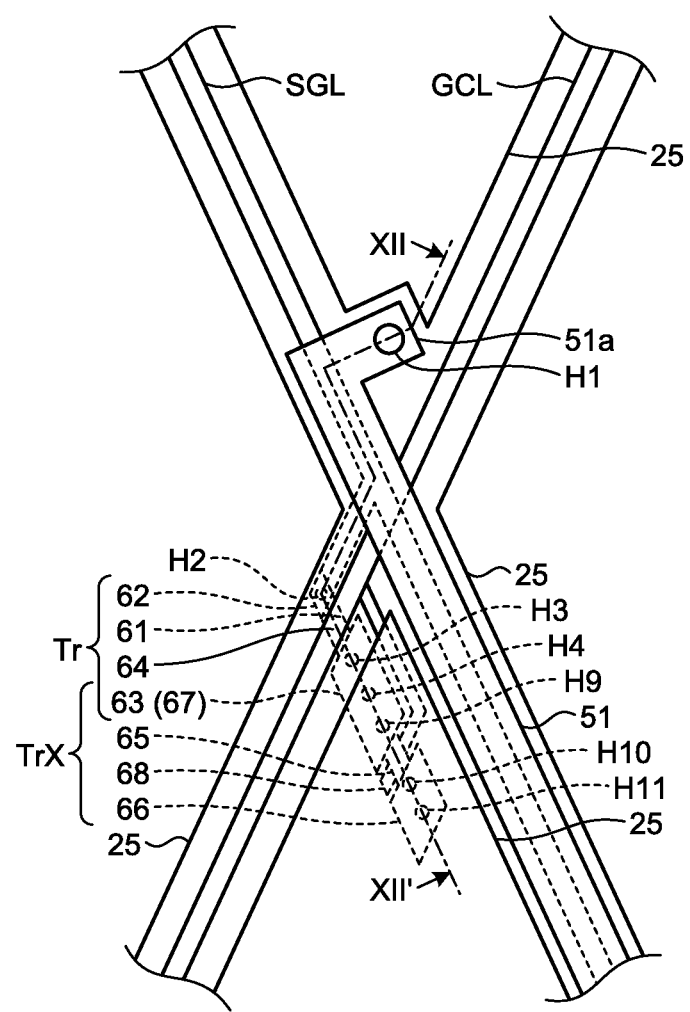
FIG. 11 is a plan view for illustrating a configuration of the first electrodes and switching elements.
Figure 12:
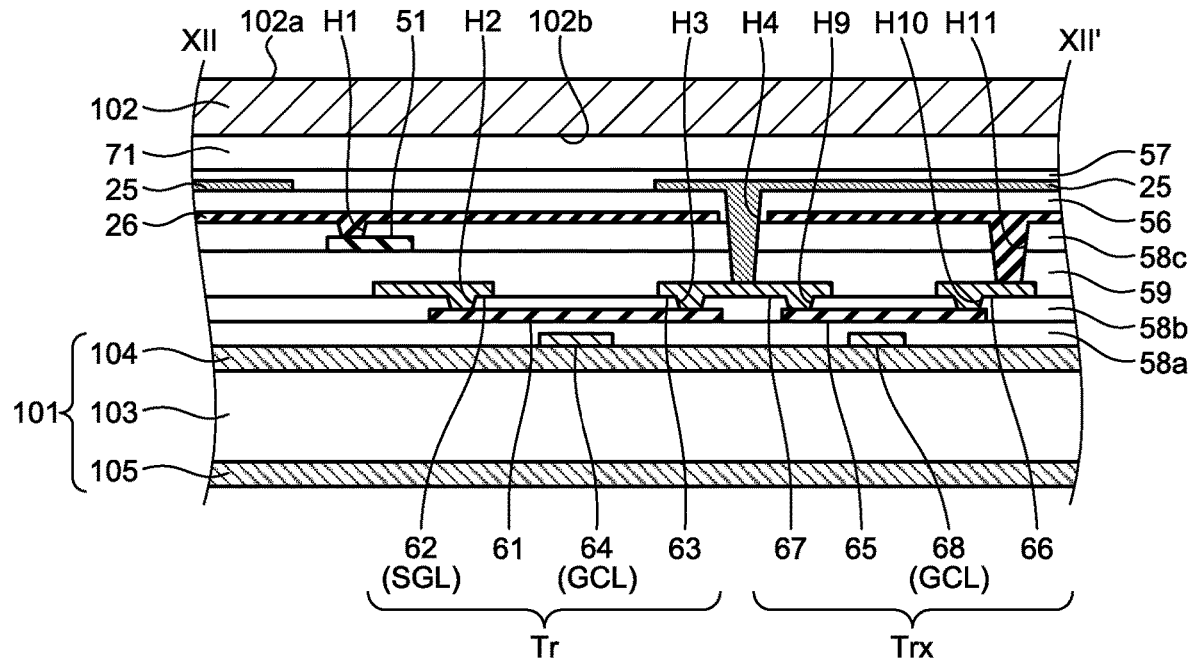
FIG. 12 is a sectional view along the line XII-XII' in FIG. 11.

The following describes a configuration of the first electrodes 25, the second electrode 26, the first switching elements Tr, and the second switching elements Trx. FIG. 11 is a plan view for illustrating a configuration of the first electrodes and the switching elements. FIG. 12 is a sectional view along the line XII-XII' in FIG. 11.

As illustrated in FIG. 11, the sides of the adjacent first electrodes 25 face spaced apart from each other, and the gate line GCL and the signal line SGL are provided crossing each other in between the first electrodes 25 in a plan view. The first electrode 25 is coupled to a drain electrode 63 of the first switching element Tr through a contact hole H4 near an intersection of the gate line GCL and the signal line SGL. Although FIG. 11 omits the second electrode 26 for easy viewing of the drawing, the second electrode 26 is arranged overlapping with the first electrodes 25, the gate lines GCL, and the signal lines SGL as described above.

As illustrated in FIG. 11 and FIG. 12, the first switching element Tr includes a semiconductor layer 61, a source electrode 62, the drain electrode 63, and a gate electrode 64. The second switching element Trx includes a semiconductor layer 65, a source electrode 66, a drain electrode 67, and a gate electrode 68. In this example, the drain electrode 67 of the second switching element Trx is an electrode common to the drain electrode 63 of the first switching element Tr.

As illustrated in FIG. 12, the first switching element Tr and the second switching element Trx are provided on the first alkali-free glass layer 104 of the first cover base 101. On the first alkali-free glass layer 104, the gate electrode 64 and the gate electrode 68 (the gate line GCL) are provided. On the upper side of the gate electrode 64 and the gate electrode 68 (the gate line GCL), the semiconductor layer 61 and the semiconductor layer 65 are provided with an insulating layer 58*a* interposed therebetween. On the upper side of the semiconductor layer 61 and the semiconductor layer 65, the drain electrode 63, the drain electrode 67, the source electrode 62 (the signal line SGL), and the source electrode 66 are provided with an insulating layer 58*b* interposed therebetween. On the upper side of the drain electrode 63, the drain electrode 67, the source electrode 62 (the signal line SGL), and the source electrode 66, the conductive wire 51 is provided with a flattening layer 59 interposed therebetween. On the upper side of the conductive wire 51, the second electrode 26 is provided with an insulating layer 58*c* interposed therebetween. As described above, the insulating layer 56 is provided on the upper side of the second electrode 26, and the first electrodes 25 are provided on the insulating layer 56. The insulating layer 57 is provided on the first electrodes 25, and the second face 102*b* of the second cover base 102 is laminated on the insulating layer 57 with the adhesive layer 71 interposed therebetween.

In the present embodiment, an inorganic insulating material such as silicon oxide ($SiO_2$) or silicon nitride (SiN) is used for the insulating layers 56, 57, 58*a*, 58*b*, and 58*c*. An organic resin material such as a polyimide resin is used for the flattening layer 59.

As illustrated in FIG. 12, the second switching element Trx is provided on the same layer as the first switching element Tr; this is not limiting, and the second switching element Trx may be provided on a layer different from the first switching element Tr.

As illustrated in FIG. 11 and FIG. 12, in the first switching element Tr, the semiconductor layer 61 is coupled to the drain electrode 63 through a contact hole H3. The semiconductor layer 61 crosses the gate line GCL in a plan view. A part of the gate line GCL overlapping with the semiconductor layer 61 functions as the gate electrode 64. The semiconductor layer 61 is provided along the signal line SGL and bends at a position overlapping with the signal line SGL. The semiconductor layer 61 is electrically coupled to the signal line SGL through a contact hole H2. A part of the signal line SGL overlapping with the semiconductor layer 61 functions as the source electrode 62. The signal line SGL and the first switching element Tr, and the gate line GCL and the first switching element Tr are thus electrically coupled to each other. Although the semiconductor layer 61 crosses the gate line GCL at one part in FIG. 11, the semiconductor layer 61 may bend so as to cross the gate line GCL twice.

In the second switching element Trx, the semiconductor layer 65 is coupled to the drain electrode 67 through a contact hole H9. The drain electrode 67 is coupled to the first electrode 25 through the contact hole H4. The semiconductor layer 65 is provided in a direction parallel to the signal line SGL and crosses the gate line GCL in a plan view. A part of the gate line GCL overlapping with the semiconductor layer 65 functions as the gate electrode 68. As illustrated in FIG. 11, the gate electrode 68 of the second switching element Trx is provided in a manner branched from the gate line GCL and is electrically coupled to the gate electrode 64 of the first switching element Tr. In other words, the first switching element Tr and the second switching element Trx share the gate line GCL. The semiconductor layer 65 is coupled to the source electrode 66 through a contact hole H10, and the source electrode 66 is coupled to the second electrode 26 through a contact hole H11. The first electrode 25 and the second switching element Trx, and the second electrode 26 and the second switching element Trx are thus electrically coupled to each other.

A known material such as polysilicon or an oxide semiconductor can be used for the material of the semiconductor layers 61 and 65. A transparent amorphous oxide semiconductor (TAOS) can be used, for example.

As illustrated in FIG. 11, a tab 51a is coupled to the conductive wire 51. The tab 51a is provided near the intersection of the signal line SGL and the gate line GCL and protrudes in a direction crossing the conductive wire 51. The tab 51a is provided at a position that is not overlapped with the signal line SGL and is electrically coupled to the second electrode 26 (omitted in FIG. 11) through the contact hole H1. The second electrode 26 and the conductive wire 51 are thus electrically coupled to each other.

With this configuration, the first electrodes 25 are arranged closer to the first face 102a as the detection face of the cover member 10 than the first switching element Tr, the second switching element Trx, the second electrode 26, and the wires. Consequently, the distance between the finger as the object to be detected and the first electrodes 25 is short, thereby achieving favorable detection sensitivity. The second electrode 26 is provided in between the first electrodes 25 and the first switching element Tr, the second switching element Trx, and the wires. Consequently, the capacitance change of the first electrodes 25 caused by the voltage fluctuations of the wires can be lessened.

As illustrated in FIG. 12, the gate electrode 64 (the gate line GCL) of the first switching element Tr and the gate electrode 68 (the gate line GCL) of the second switching element Trx are provided directly on the first alkali-free glass layer 104. In other words, the first alkali-free glass layer 104 is provided in between the alkali glass layer 103 and the first switching element Tr and in between the alkali glass layer 103 and the second switching element Trx. With this configuration, the entry of alkali components into the first switching element Tr and the second switching element Trx can be lessened. Consequently, corrosion of the various wires such as the signal lines SGL and the gate lines GCL and deterioration of characteristics of the semiconductor layers 61 and 65 can be lessened.

As described above, the cover member 10 of the present embodiment has the first cover base 101 including the alkali glass layer 103, the first alkali-free glass layer 104 provided on the first face 103a of the alkali glass layer 103, and the second alkali-free glass layer 105 provided on the second face 103b of the alkali glass layer 103. The cover member 10 also has the fingerprint sensor 20 that includes the first electrodes 25 configured to detect the unevenness of an object that comes into contact with or close to the first cover base 101 and the first switching elements Tr. The fingerprint sensor 20 is provided on the first alkali-free glass layer 104 in the transmissive area Ad that passes an image.

With this configuration, the fingerprint sensor 20 is provided closer to the cover member 10 than the display panel 30. With this configuration, compared with a case in which detection electrodes for fingerprint detection are provided integrally with the display panel 30, for example, the distance between the first electrodes 25 as the detection electrodes and the first face 102a of the second cover base 102 as the detection face can be reduced. Further, the fingerprint sensor 20 is provided on the first cover base 101. With this configuration, the second cover base 102 arranged in between the fingerprint sensor 20 and the finger can be made thinner to reduce the distance between the first electrodes 25 and the first face 102a as the detection face. Consequently, the cover member 10 of the present embodiment can improve detection performance.

The fingerprint sensor 20 detects the unevenness of a finger or the like that comes into contact therewith or close thereto based on the self-capacitance-type detection principle. Consequently, compared with a mutual capacitance type, the intensity of an electric field in a direction perpendicular to the first face 102a of the cover member 10 when the drive signal Vf is supplied to the first electrodes 25 can be increased. Consequently, the cover member 10 of the present embodiment can reduce the area of the first electrodes 25 of the fingerprint sensor 20 to increase the resolution of detection and can obtain favorable detection sensitivity.

Further, the guard signal Vsgl is supplied to the second electrode 26 facing the first electrodes 25. With this operation, the capacitance change of the first electrodes 25 on the first cover base 101 side can be lessened. Consequently, the cover member 10 of the present embodiment can lessen degradation in the detection sensitivity of the fingerprint sensor 20.

Figure 13:
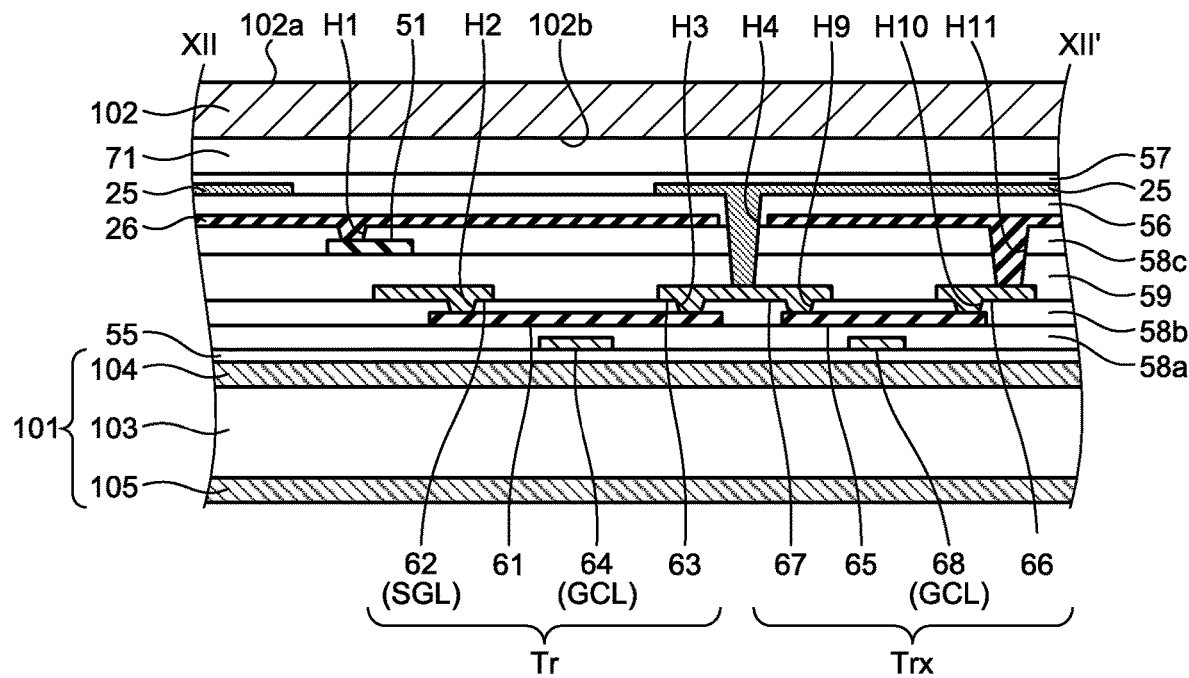
FIG. 13 is a sectional view of a cover member according a first modification of the first embodiment.

FIG. 13 is a sectional view of a cover member according to a first modification of the first embodiment. As illustrated in FIG. 13, in the present modification, the gate electrode 64 (the gate line GCL) of the first switching element Tr and the gate electrode 68 (the gate line GCL) of the second switching element Trx are provided on the first alkali-free glass layer 104 with a passivation film 55 interposed therebetween. Even with this configuration, the entry of alkali components into the first switching element Tr and the second switching element Trx can be lessened. An inorganic insulating material such as silicon nitride ($Si_3N_4$) is used for the passivation film 55.

If the passivation film 55 is provided on the alkali glass layer 103 without providing the first alkali-free glass layer 104, alkali components may pass through the passivation film 55 to reach the first switching element Tr and the second switching element Trx. By providing the passivation film 55 on the first alkali-free glass layer 104, degradation in the characteristics of the first switching element Tr and the second switching element Trx can be surely lessened.

Figure 14:
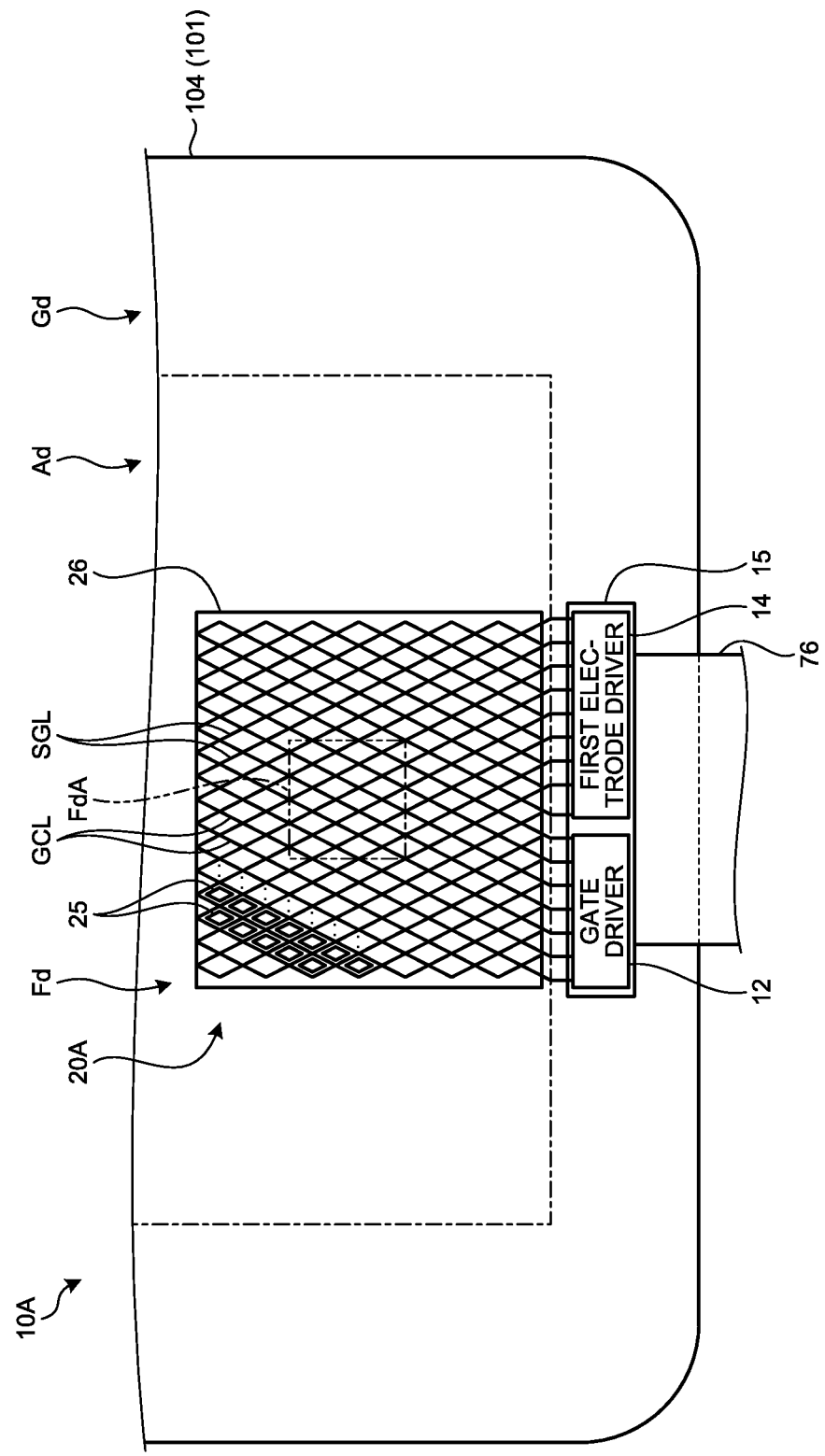
FIG. 14 is a schematic plan view of a fingerprint sensor of a cover member according to a second modification of the first embodiment.

FIG. 14 is a schematic plan view of a fingerprint sensor of a cover member according to a second modification of the first embodiment. As illustrated in FIG. 14, in this cover member 10A of the present modification, a fingerprint sensor 20A is arranged at the central part of the short side of the transmissive area Ad. The fingerprint sensor 20A is not provided at both ends of the short side of the transmissive area Ad, in other words, the corners of the transmissive area Ad. The adhesive layer 71 (refer to FIG. 2) that laminates the first cover base 101 and the second cover base 102 together is provided at areas adjacent to the fingerprint sensor 20A in a direction along the short side of the transmissive area Ad.

In the present modification, the fingerprint detection area Fd is an area overlapping with the transmissive area Ad and a rectangular area protruding from the central part of the short side of the transmissive area Ad toward a central part in an in-plane direction. The first electrodes 25, the second electrode 26, the gate lines GCL, the signal lines SGL, and the like of the fingerprint sensor 20A are provided in the fingerprint detection area Fd.

A configuration of the first electrodes 25, the second electrode 26, the gate lines GCL, the signal lines SGL, and the like is similar to that of the first embodiment, in which the drive signal Vf is supplied to the first electrodes 25, and the detection signal Vdet responsive to the capacitance change of the first electrodes 25 is output. The detector 40 (refer to FIG. 5) can detect the unevenness of the surface of the object to be detected such as a fingerprint of a finger that comes into contact with or close to the fingerprint detection area Fd by the detection signal Vdet output from the first electrodes 25.

In the present embodiment, the first electrodes 25 of the fingerprint sensor 20A are provided only at the central part of the short side of the transmissive area Ad. Consequently, the circuitry 15 including the gate driver 12 and the first electrode driver 14 is provided only at the central part of the short side of the frame area Gd. The gate lines GCL and the signal lines SGL are routed to the short side of the frame area Gd and are coupled to the circuitry 15. The drive circuits such as the gate driver 12 and the first electrode driver 14 and the first electrodes 25 are provided on the first cover base 101, and thus the responsivity of detection operation improves, and detection performance can be improved. The area of the fingerprint detection area Fd is smaller than that of the first embodiment. Consequently, the time required for detection can be reduced, and the load of arithmetic processing on the detector 40 can be reduced.

The fingerprint sensor 20A is a fingerprint detector having translucency and is provided in between the first cover base 101 and the second cover base 102 (refer to FIG. 2), whereby there are few constraints by the members such as the polarizing plate 35 of the display panel 30, the arrangement of the electrodes, and the like, and the degree of freedom of the size and arrangement of the fingerprint sensor 20A can be increased. Consequently, as illustrated in FIG. 14, even when the fingerprint detection area Fd is reduced in size to be provided only in part of the transmissive area Ad, the fingerprint sensor 20A can be easily arranged in accordance with the fingerprint detection area Fd.

As illustrated in FIG. 14, a fingerprint detection area FdA that is a further smaller range than the fingerprint detection area Fd can be a detection area for detecting a fingerprint. In this case, the first electrodes 25, the gate lines GCL, and the signal lines SGL are provided in the fingerprint detection area FdA. In an area outside the fingerprint detection area FdA, no first electrode 25 can be provided, or dummy electrodes that do not function as detection electrodes can be provided. The gate lines GCL and the signal lines SGL provided in the fingerprint detection area FdA are routed to the area outside the fingerprint detection area FdA, and thus dummy wires are preferably provided in the area outside the fingerprint detection area FdA. The same material as those of the gate lines GCL and the signal lines SGL is used for the dummy wires, which are arranged at the same pitch as that of the gate lines GCL and the signal lines SGL. With this configuration, the wires are arranged around the fingerprint detection area FdA, and a difference in light transmittance between the part in which the gate lines GCL and the signal lines SGL are provided and the part in which the dummy wires are provided is reduced. With this configuration, visibility can be improved.

Figure 15:
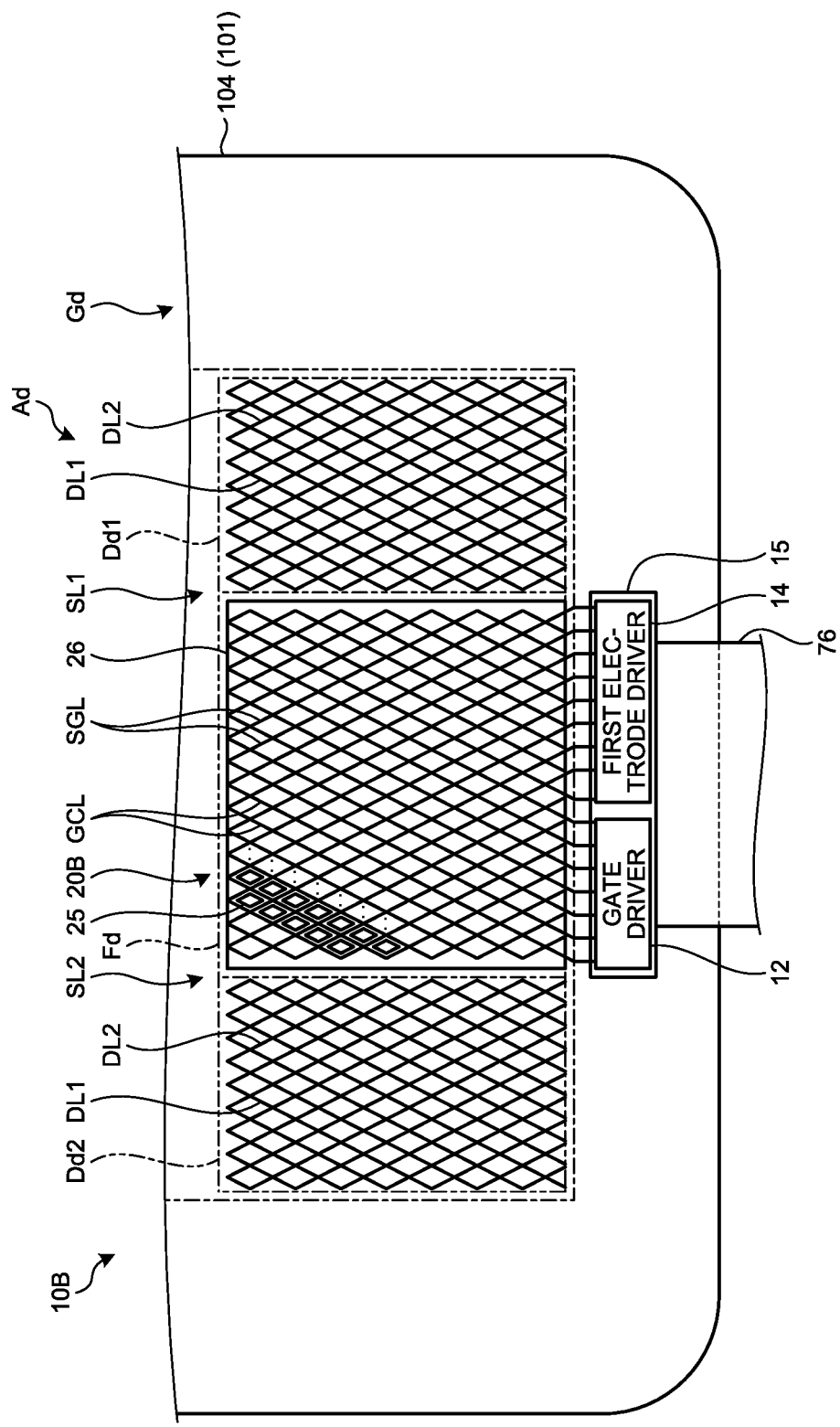
FIG. 15 is a schematic plan view of a fingerprint sensor of a cover member according to a third modification of the first embodiment.

FIG. 15 is a schematic plan view of a fingerprint sensor of a cover member according to a third modification of the first embodiment. In this cover member 10B of the present modification, similarly to the example illustrated in FIG. 14, the fingerprint detection area Fd is an area overlapping with the transmissive area Ad and a rectangular area protruding from the central part of the short side of the transmissive area Ad toward the central part in the in-plane direction. A fingerprint sensor 20B is provided outside the fingerprint detection area Fd and also near the long sides of the frame area Gd in a direction along the short side of the transmissive area Ad.

As illustrated in FIG. 15, the first electrodes 25 are provided in the fingerprint detection area Fd of the first cover base 101, whereas dummy areas Dd1 and Dd2 are provided adjacent to the fingerprint detection area Fd in the direction along the short side of the transmissive area Ad. In the dummy areas Dd1 and Dd2, dummy wires DL1 and dummy wires DL2 are provided on the first cover base 101. The dummy wires DL1 are provided along the gate lines GCL, whereas the dummy wires DL2 are provided along the signal lines SGL. The same materials as those of the gate lines GCL and the signal lines SGL are used for the dummy wires DL1 and DL2, respectively, which are arranged with the same pitch as the arrangement pitch of the gate lines GCL and the signal lines SGL.

The dummy wires DL1 and DL2 in the dummy area Dd1 are electrically separated from the gate lines GCL and the signal lines SGL in the fingerprint detection area Fd by a slit SL1. The dummy wires DL1 and DL2 in the dummy area Dd2 are electrically separated from the gate lines GCL and the signal lines SGL in the fingerprint detection area Fd by a slit SL2. The dummy wires DL1 and DL2 are wires that are not coupled to the gate driver 12 and the first electrode driver 14 of the circuitry 15 and are not used for detection operation.

With this configuration, even when the fingerprint detection area Fd is provided only in part of the transmissive area Ad, a difference in light transmittance between the fingerprint detection area Fd and the dummy areas Dd1 and Dd2 can be reduced, and thus the visibility of a display image can be improved.

Although the dummy areas Dd1 and Dd2 are provided in part of the transmissive area Ad in FIG. 15, this is not limiting; the dummy areas Dd1 and Dd2 may be provided in the entire area that is not overlapped with the fingerprint detection area Fd in the transmissive area Ad. Although not illustrated in FIG. 15, dummy electrodes that do not function as detection electrodes may be provided in the dummy areas Dd1 and Dd2, and these dummy electrodes may have the same shape and arrangement as those of the first electrodes 25. Further, on the same layer as the second electrode 26, the dummy electrodes may be provided continuously in the entire dummy area Dd1, or the dummy electrodes may be provided continuously in the entire dummy area Dd2.

Figure 16:
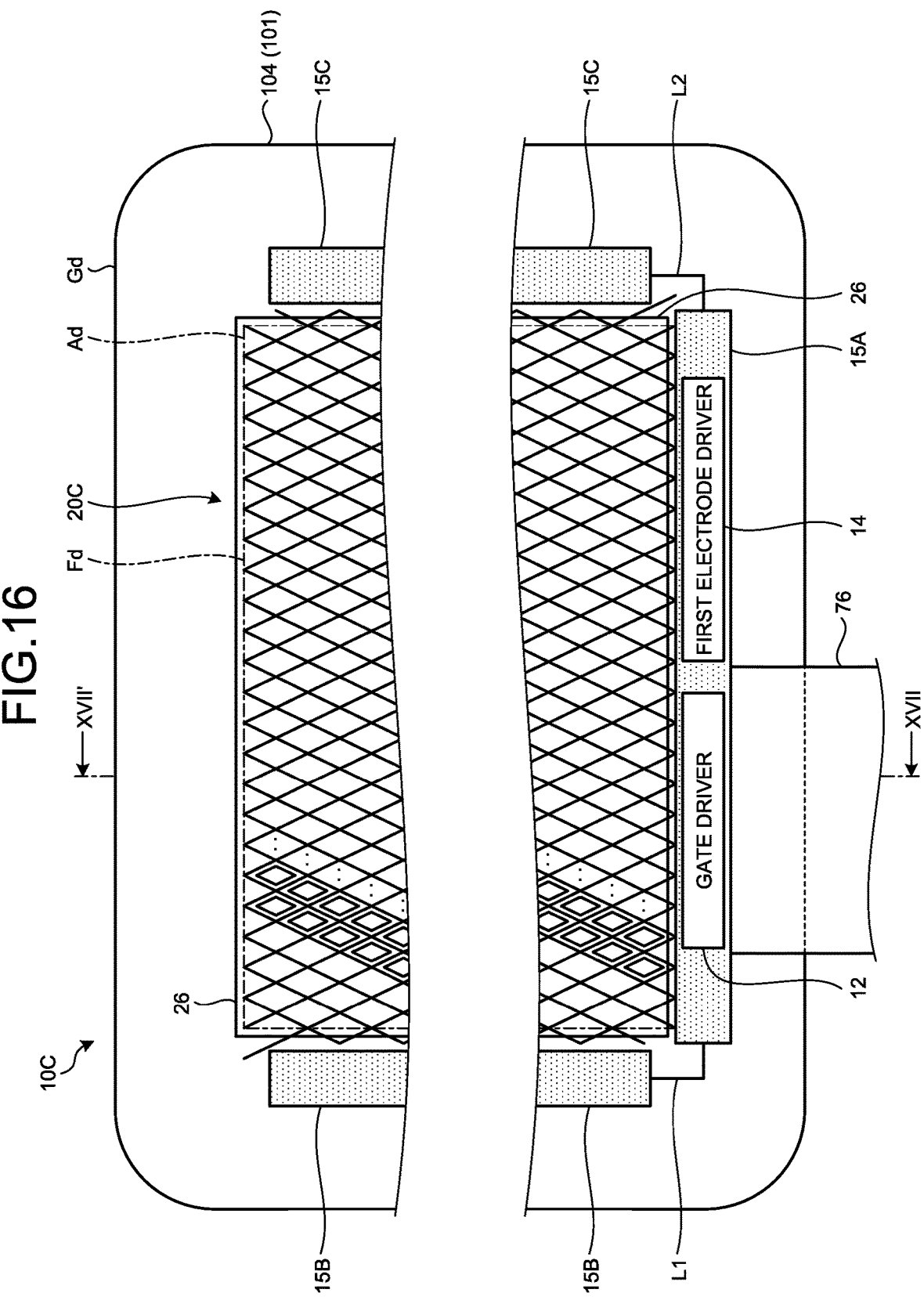
FIG. 16 is a schematic plan view of a fingerprint sensor of a cover member according to a fourth modification of the first embodiment.
Figure 17:
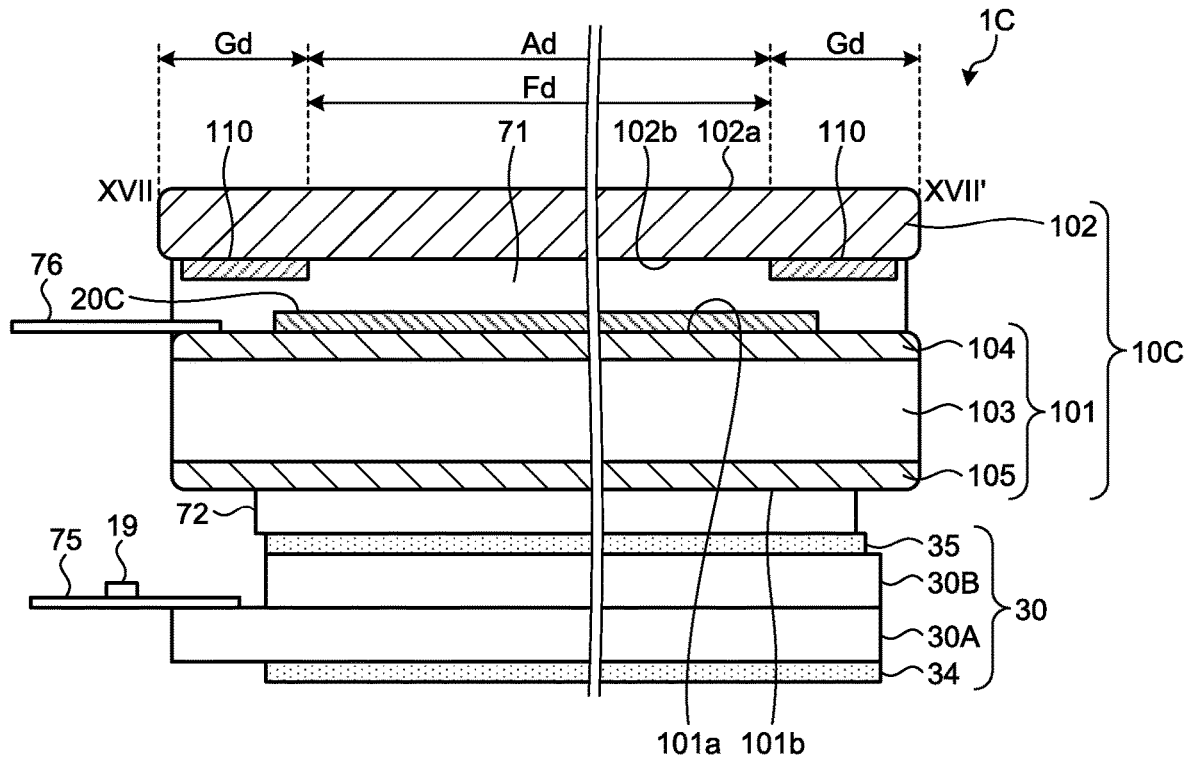
FIG. 17 is a sectional view along the line XVII-XVII' in FIG. 16.

FIG. 16 is a schematic plan view of a fingerprint sensor of a cover member according to a fourth modification of the first embodiment. FIG. 17 is a sectional view along the line XVII-XVII' in FIG. 16. As illustrated in FIG. 16 and FIG. 17, in this cover member 10C of the present embodiment, a fingerprint sensor 20C is provided in the entire transmissive area Ad. In other words, the entire transmissive area Ad is the fingerprint detection area Fd.

As illustrated in FIG. 16, the first electrodes 25 are arranged in the entire transmissive area Ad of the first cover base 101, and the second electrode 26 is provided in the entire transmissive area Ad facing the first electrodes 25. The circuitry 15A including the gate driver 12 and the first electrode driver 14 is provided on the short side of the frame area Gd, whereas the circuitries 15B and 15C are provided along the long sides of the frame area Gd. The gate lines GCL and the signal lines SGL are arranged in the entire transmissive area Ad. On the short side of the frame area Gd, the gate lines GCL and the signal lines SGL are coupled to the circuitry 15A. On the long sides of the frame area Gd, the gate lines GCL and the signal lines SGL are coupled to the circuitries 15B and 15C.

With this configuration, based on the basic principle of the self-capacitance type, in the entire transmissive area Ad, the unevenness of a finger or the like that comes into contact with or close to the fingerprint sensor 20C can be detected from the detection signal Vdet responsive to the capacitance change of the first electrodes 25. The position of an external object such as a finger that comes into contact with or close to the fingerprint sensor 20C can also be detected by the first electrodes 25. Consequently, the position of the finger or the like that comes close to or into contact with the fingerprint sensor 20C may be detected by the first electrodes 25, and fingerprint detection operation may be performed with a fine pitch at the detected position.

As illustrated in FIG. 17, in a display apparatus 1C, the fingerprint sensor 20C is provided facing almost the entire polarizing plate 35 of the display panel 30 with the adhesive layer 72 and the first cover base 101 interposed therebetween. The fingerprint sensor 20C is thus provided facing the entire transmissive area Ad. Consequently, a difference in light transmittance in the entire transmissive area Ad is lessened, and the visibility of the display image of the display panel 30 can be improved.

Figure 18:
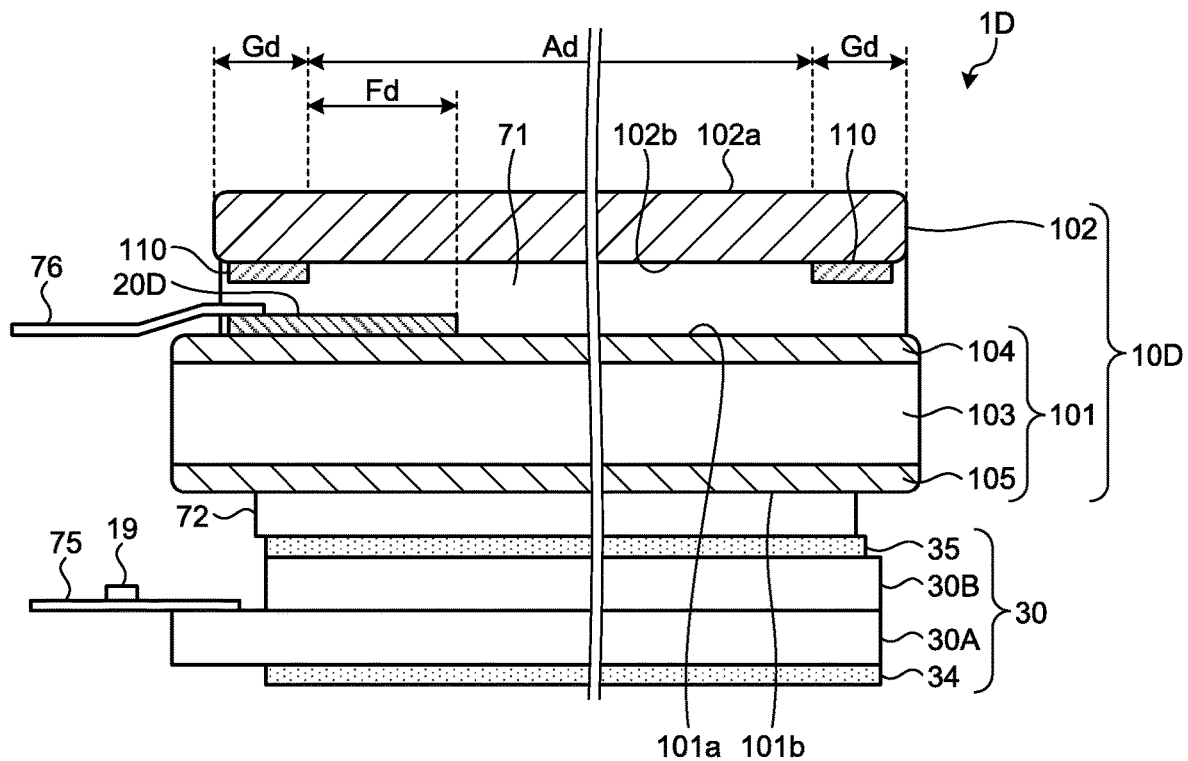
FIG. 18 is a sectional view of a schematic sectional structure of a display apparatus according to a fifth modification of the first embodiment.

FIG. 18 is a sectional view of a schematic sectional structure of a display apparatus according to a fifth modification of the first embodiment. In this display apparatus 1D of the present modification, the external shape of the second cover base 102 of a cover member 10D when viewed in the direction perpendicular to the first face 102a is smaller than the external shape of the first cover base 101. As described above, the second cover base 102 is formed to be as thin as about 0.2 mm, for example, in order to improve the detection performance of a fingerprint sensor 20D. Consequently, when an impact is applied to the second cover base 102, it may break.

By making the external shape of the second cover base 102 smaller than that of the first cover base 101, the end of the second cover base 102 is arranged at a position overlapping with the first cover base 101, and the entire second face 102b of the second cover base 102 adheres to the adhesive layer 71 to be supported. Consequently, a part of the second cover base 102 that is not supported by the adhesive layer 71 and the first cover base 101 is reduced in size, and the likelihood of breakage of the second cover base 102 can be lessened. In the present modification, the second cover base 102 is preferably provided so as to cover at least the entire transmissive area Ad in order to lessen degradation in the display image of the display panel 30.

Second Embodiment

Figure 19:
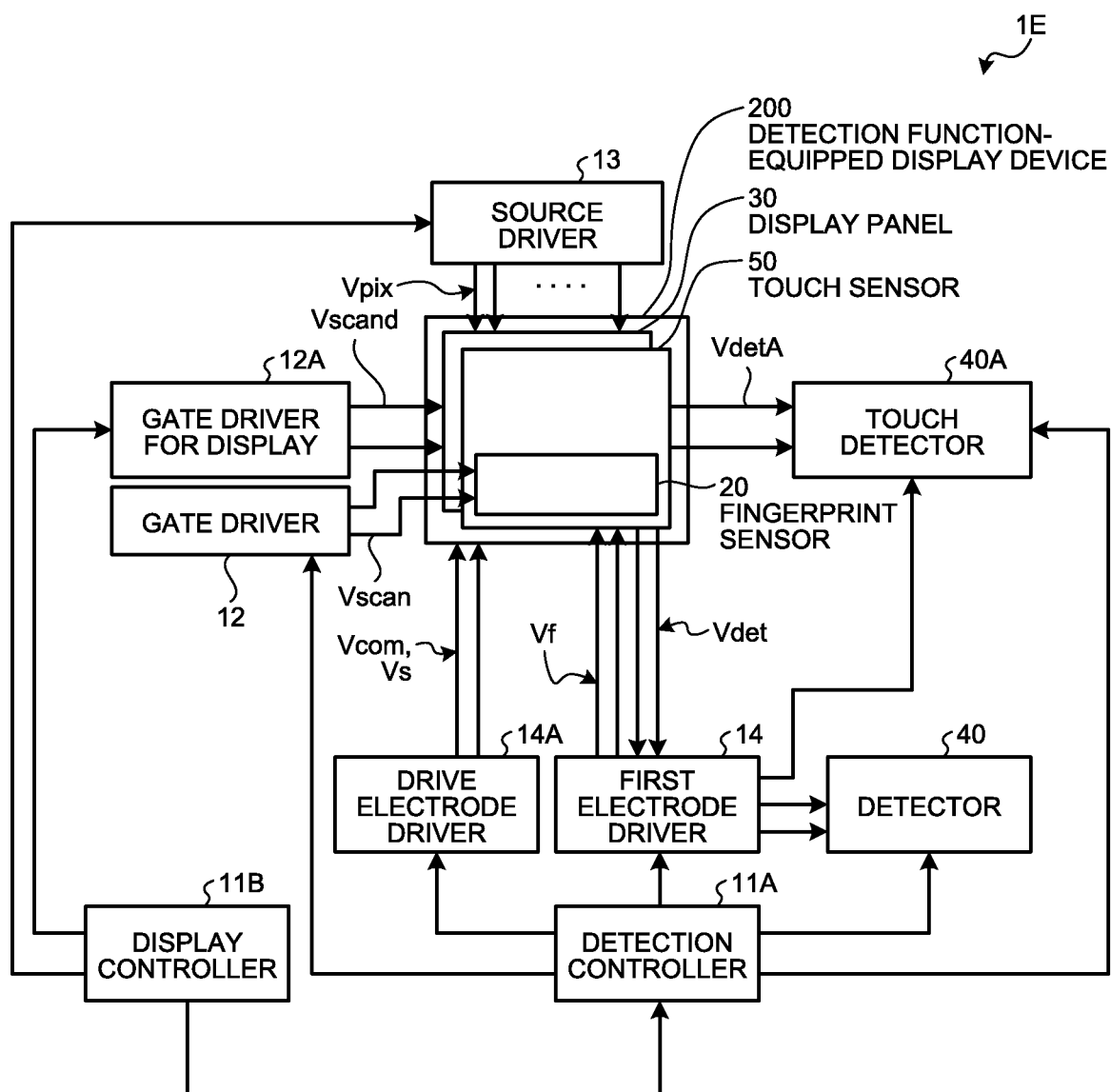
FIG. 19 is a block diagram of a configuration example of a display apparatus according to a second embodiment.

FIG. 19 is a block diagram of a configuration example of a display apparatus according to a second embodiment. As illustrated in FIG. 19, this display apparatus 1E includes a detection function-equipped display device 200, the fingerprint sensor 20, a detection controller 11A, a display controller 11B, the gate driver 12, a gate driver 12A for display, a source driver 13, the first electrode driver 14, a drive electrode driver 14A, the detector 40, and a touch detector 40A. The display apparatus 1E is a display apparatus in which the detection function-equipped display device 200 incorporates a detection function.

The detection function-equipped display device 200 is an apparatus that integrates the display panel 30 and a touch sensor 50 as a detection apparatus configured to detect touch input. The apparatus that integrates the display panel 30 and the touch sensor 50 indicates that part of substrates or electrodes used for the display panel 30 or the touch sensor 50 is used for both of them, for example. The display panel 30 may be an organic EL display panel, for example.

The display controller 11B is a circuit that supplies a control signal to the gate driver 12A for display or the source driver 13 based on a video signal supplied from the outside to control mainly display operation. The display controller 11B supplies a control signal further to the detection controller 11A to enable control to cause the gate driver 12A for display, the source driver 13, and the detection controller 11A to operate in sync with each other or out of sync with each other.

The gate driver 12A for display has a function of outputting a scan signal Vscand for display based on the control signal supplied from the display controller 11B and successively selecting one horizontal line as an object of the display drive of the detection function-equipped display device 200.

The source driver 13 is a circuit that supplies a pixel signal Vpix to the respective pixels Pix of the detection function-equipped display device 200 based on the control signal supplied from the display controller 11B. The display controller 11B may generate the pixel signal Vpix and supply this pixel signal Vpix to the source driver 13.

The touch sensor 50 performs touch detection operation based on the basic principle of capacitance-type touch detection to detect the position of an external object that comes into contact therewith or close thereto. Upon detection of the contact or closeness of the external object, the touch sensor 50 outputs a detection signal VdetA to the touch detector 40A.

The detection controller 11A is a circuit that controls detection operation in the touch sensor 50 configured to detect an external object that comes into contact therewith or close thereto and controls the detection operation of the fingerprint sensor 20. The drive electrode driver 14A is a circuit that supplies a drive signal Vs for detection or a drive signal Vcom for display to drive electrodes 33A of the detection function-equipped display device 200 based on the control signal supplied from the detection controller 11A. The gate driver 12 supplies the scan signal Vscan to the fingerprint sensor 20 as described above based on the control signal supplied from the detection controller 11A. The first electrode driver 14 supplies the drive signal Vf to the fingerprint sensor 20 based on the control signal supplied from the detection controller 11A.

Figure 35:
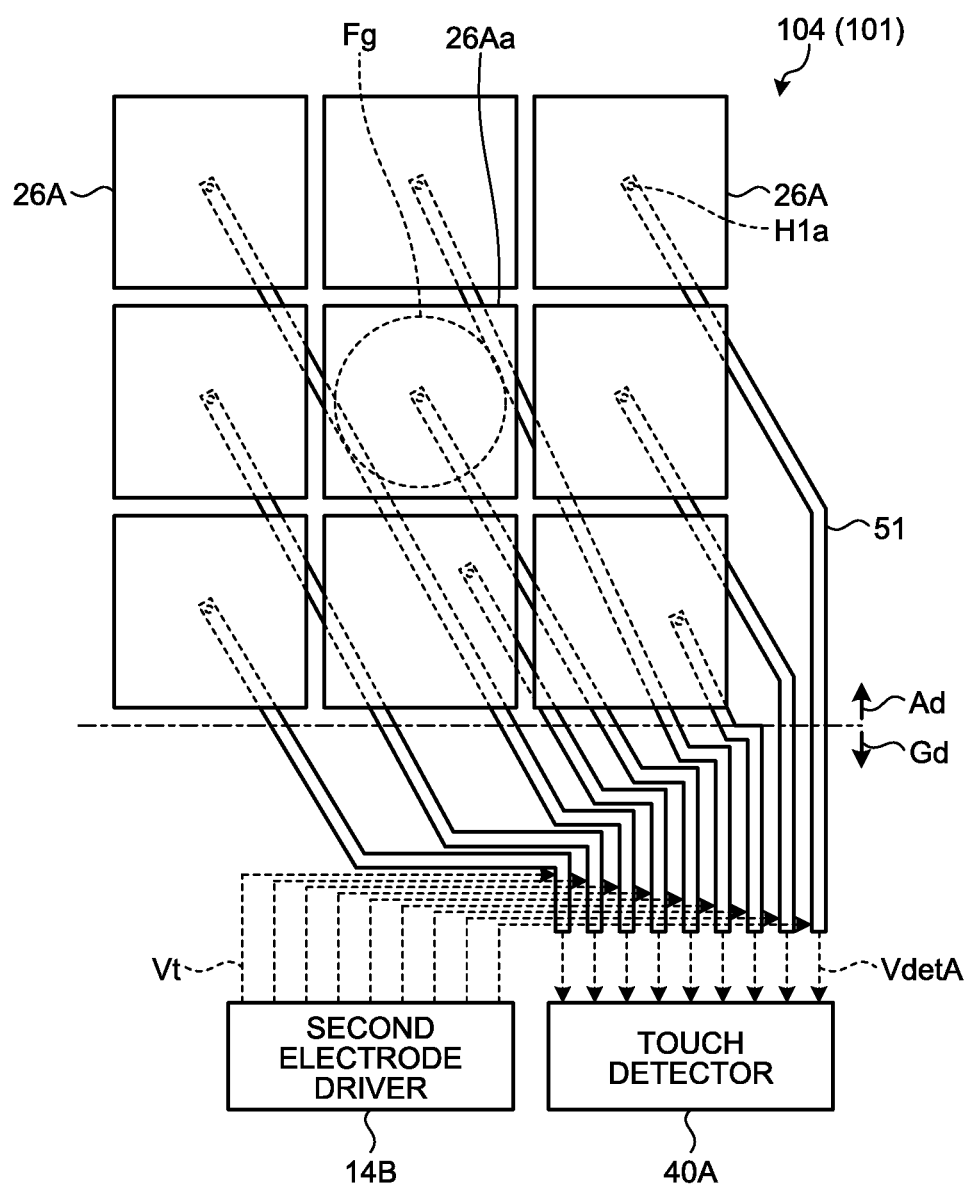
FIG. 35 is a plan view schematically illustrating an entire configuration of second electrodes and conductive wires.

The touch detector 40A is a circuit configured to detect the presence or absence of a touch on the touch sensor 50 based on the control signal supplied from the detection controller 11A and the detection signal VdetA output from third electrodes TDL (refer to FIG. 35). The touch detector 40A determines coordinates at which touch input has been performed and the like when a touch is present. The touch detector 40A includes for example, a detection signal amplifier, an A/D converter, a signal processor, a coordinates extractor, and a detection timing controller similarly to the detector 40 described above.

Figure 20:
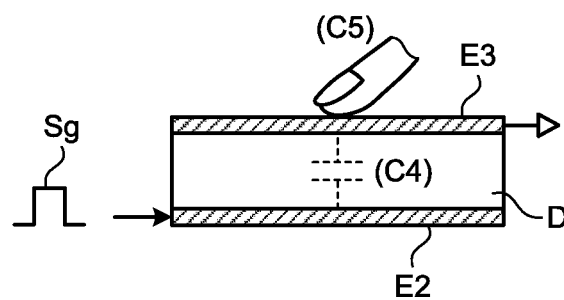
FIG. 20 is an illustrative diagram for illustrating the basic principle of touch detection of a mutual capacitance type.
Figure 21:
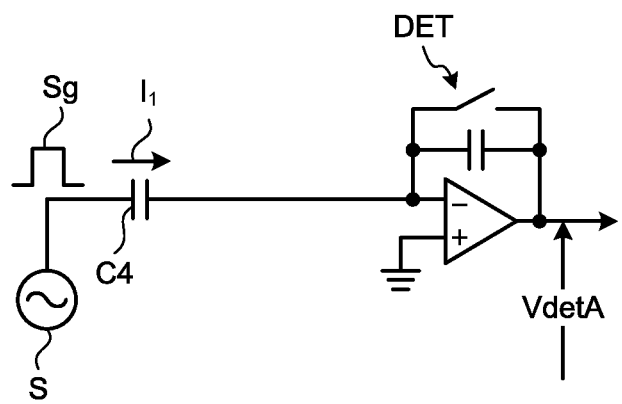
FIG. 21 is an illustrative diagram of an example of an equivalent circuit for illustrating the basic principle of touch detection of the mutual capacitance type.
Figure 22:
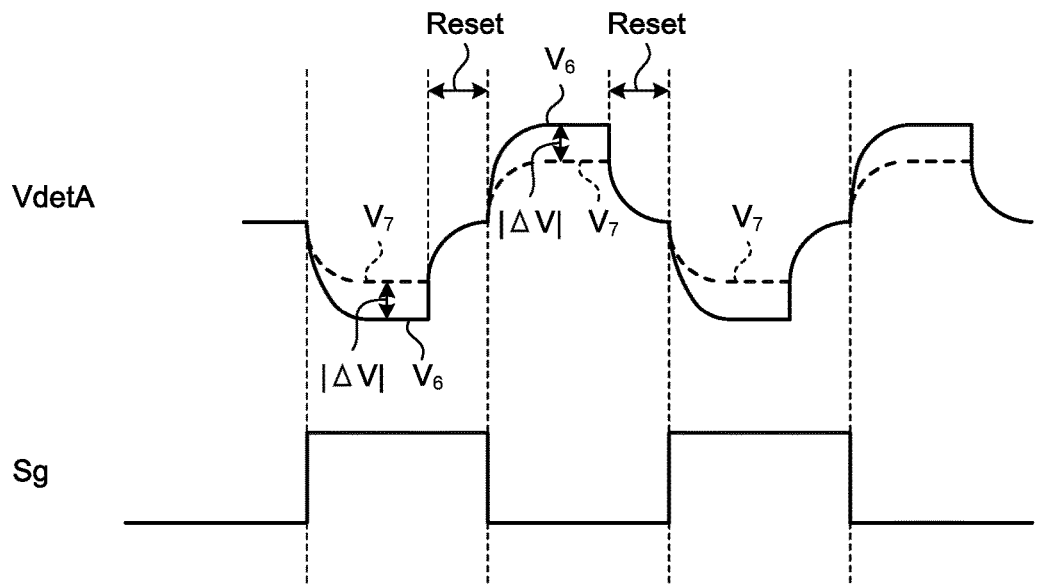
FIG. 22 is a diagram of examples of waveforms of a drive signal and a detection signal of touch detection of the mutual capacitance type.

The touch sensor 50 operates based on the basic principle of capacitance-type touch detection. The following describes the basic principle of touch detection by the mutual capacitance type of the display apparatus 1E of the present embodiment with reference to FIG. 20 to FIG. 22. FIG. 20 is an illustrative diagram for illustrating the basic principle of touch detection of the mutual capacitance type. FIG. 21 is an illustrative diagram of an example of an equivalent circuit for illustrating the basic principle of touch detection of the mutual capacitance type. FIG. 22 is a diagram of examples of waveforms of a drive signal and a detection signal of touch detection of the mutual capacitance type. Although the following describes a case in which a finger comes into contact with or close to the touch sensor 50, the finger, which is not limiting, may be an object containing a conductor such as a stylus.

As illustrated in FIG. 20, for example, a capacitance element C4 includes a pair of electrodes, or a drive electrode E2 and a detection electrode E3 that are arranged facing each other across a dielectric body D. The capacitance element C4 causes fringe-originated electric lines of force extending from the end of the drive electrode E2 toward the upper face of the detection electrode E3 in addition to electric lines of force (not illustrated) generated between the opposite faces, or the drive electrode E2 and the detection electrode E3. As illustrated in FIG. 21, one end of the capacitance element C4 is coupled to an AC signal source (drive signal source) S, whereas the other end thereof is coupled to the voltage detector DET. The voltage detector DET is an integrating circuit included in the touch detector 40A illustrated in FIG. 19, for example.

When an AC rectangular wave Sg with a certain frequency (about a few kilohertz to a few hundred kilohertz, for example) is applied from the AC signal source S to the drive electrode E2 (one end of the capacitance element C4), an output waveform (the detection signal VdetA) as illustrated in FIG. 22 appears via the voltage detector DET coupled to the detection electrode E3 (the other end of the capacitance element C4) side. This AC rectangular wave Sg corresponds to the drive signal Vs input from the drive electrode driver 14A.

In a state (a non-contact state) in which the finger does not come into contact therewith nor close thereto, along with charge to and discharge from the capacitance element C4, a current responsive to the capacitance value of the capacitance element C4 passes. The voltage detector DET illustrated in FIG. 21 converts fluctuations in the current responsive to the AC rectangular wave Sg into fluctuations in voltage (a solid line waveform $V_6$ (refer to FIG. 22)).

In contrast, in a state (a contact state) in which the finger comes into contact therewith or close thereto, a capacitance C5 generated by the finger is in contact with or close to the detection electrode E3 as illustrated in FIG. 20. With this configuration, the fringe-originated electric lines of force present in between the drive electrode E2 and the detection electrode E3 are shielded by a conductor (the finger). Consequently, the capacitance C4 operates as a capacitance element having a smaller capacitance value than a capacitance value in the non-contact state. As illustrated in FIG. 21 and FIG. 22, the voltage detector DET converts fluctuations in a current $I_1$ responsive to the AC rectangular wave Sg into fluctuations in voltage (a dotted line waveform $V_7$).

In this case, the waveform $V_7$ is smaller in amplitude than the waveform $V_6$. With this relation, the absolute value $|\Delta V|$ of the voltage difference between the waveform $V_6$ and the waveform $V_7$ changes in accordance with the influence of an external object such as the finger that externally comes into contact therewith or close thereto. To detect the absolute value $|\Delta V|$ of the voltage difference between the waveform $V_6$ and the waveform $V_7$ with high precision, the voltage detector DET more preferably operates with a period Reset that resets the charge and discharge of a capacitor in accordance with the frequency of the AC rectangular wave Sg by intra-circuit switching.

The touch detector 40A compares the absolute value $|\Delta V|$ with a certain threshold voltage and determines that the external close object is in the non-contact state if this absolute value $|\Delta V|$ is less than the threshold voltage. In contrast, if the absolute value $|\Delta V|$ is the threshold voltage or more, the touch detector 40A determines that the external close object is in the contact state. The touch detector 40A thus enables touch detection.

Figure 23:
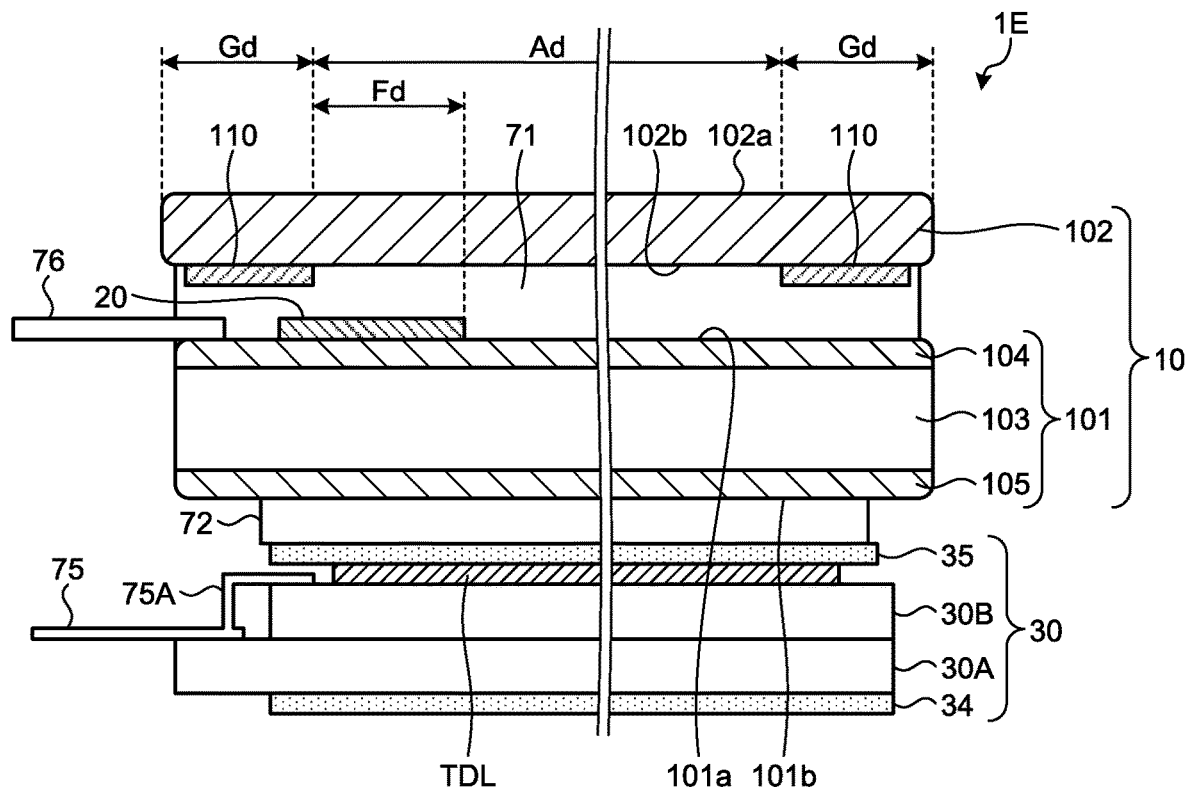
FIG. 23 is a sectional view of a schematic sectional structure of the display apparatus according to the second embodiment.
Figure 24:
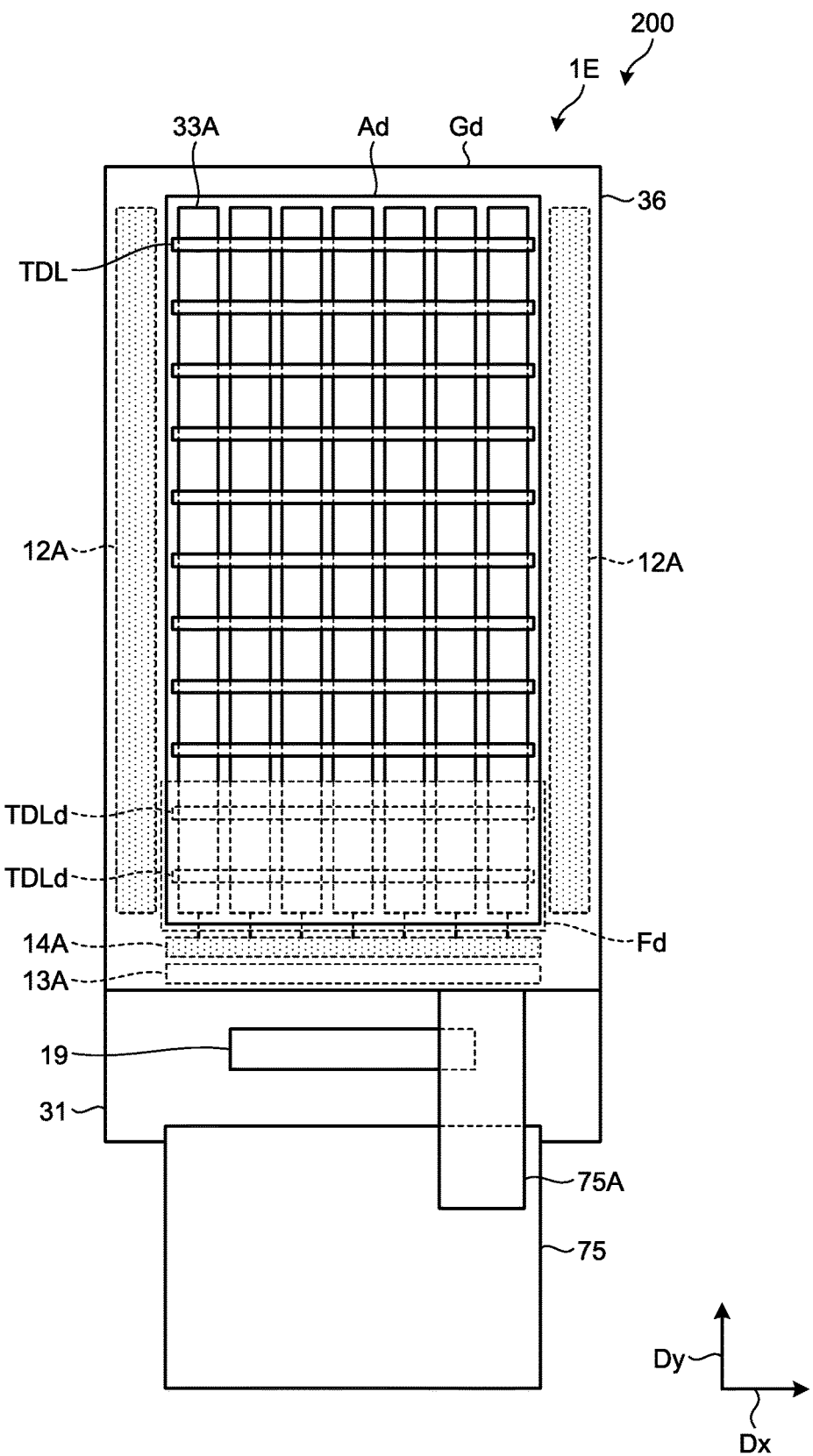
FIG. 24 is a schematic plan view for illustrating the relation between drive electrodes and third electrodes according to the present embodiment.

The following describes a configuration example of the display apparatus 1E of the present embodiment. FIG. 23 is a sectional view of a schematic sectional structure of the display apparatus according to the second embodiment. FIG. 24 is a schematic plan view for illustrating the relation between drive electrodes and third electrodes according to the present embodiment.

As illustrated in FIG. 23, the display apparatus 1E of the present embodiment includes the cover member 10 and the display panel 30. The cover member 10 of the present embodiment can be any of the cover members 10 and 10A to 10D illustrated in the first embodiment and the modifications. The fingerprint sensor 20 included in the cover member 10 of the present embodiment can also be any of the fingerprint sensors 20 and 20A to 20D illustrated in the first embodiment and the modifications.

As illustrated in FIG. 23, third electrodes TDL are provided on the counter substrate 30B of the display panel 30, and the polarizing plate 35 is provided on the upper side of the third electrodes TDL. The third electrodes TDL function as the detection electrodes of the touch sensor 50. The fingerprint sensor 20 is arranged overlapping with the fingerprint detection area Fd provided in part of the transmissive area Ad when viewed in the direction perpendicular to the first face 102a of the second cover base 102. As illustrated in FIG. 23, the fingerprint sensor 20 is arranged overlapping with part of the third electrodes TDL.

As illustrated in FIG. 24, the detection function-equipped display device 200 includes the drive electrodes 33A provided to the first substrate 31 and the third electrodes TDL provided to the second substrate 36. The drive electrode 33A is provided in a second direction Dy and a plurality of the drive electrodes 33A are arranged in a first direction Dx in the transmissive area Ad. The drive electrodes 33A are supplied with the drive signal Vcom for display from the drive electrode driver 14A in display operation and function as common electrodes for the pixel electrodes 32 (refer to FIG. 4).

The third electrode TDL is provided in the first direction Dx and a plurality of the third electrodes TDL are arranged in the second direction Dy in the transmissive area Ad. In other words, the third electrodes TDL cross the drive electrodes 33A in a plan view. The third electrodes TDL are coupled to a flexible board 75A provided on the short side of the frame area Gd of the second substrate 36 via frame wiring (omitted in FIG. 24). In the present embodiment, a conductive material having translucency such as ITO is used for the third electrodes TDL. As illustrated in FIG. 24, the drive electrodes 33A are provided overlapping with the fingerprint detection area Fd provided in part of the transmissive area Ad. The third electrodes TDL provided at positions overlapping with the fingerprint detection area Fd are dummy electrodes TDLd that do not substantially function as the detection electrodes.

Capacitances are generated at respective intersections of the third electrodes TDL and the drive electrodes 33A. In the touch sensor 50, when the touch detection operation of the mutual capacitance type is performed, the drive electrode driver 14A successively selects the drive electrodes 33A in a time division manner and supplies the drive signal Vs to the selected drive electrode 33A. The detection signal VdetA is then output from the third electrodes TDL to perform touch detection. In other words, the drive electrodes 33A correspond to the drive electrode E2 in the basic principle of touch detection of the mutual capacitance type, whereas the third electrodes TDL correspond to the detection electrode E3. The drive electrode driver 14A may successively select each drive electrode block including a plurality of drive electrodes 33A and drive the drive electrode block.

Thus, in the present embodiment, the drive electrodes 33A function as the common electrodes for the pixel electrodes 32 in display operation and function as the drive electrodes for the third electrodes TDL in detection operation.

In FIG. 24, various circuits such as the gate driver 12A for display, the drive electrode driver 14A, and a multiplexer 13A are provided in the frame area Gd of the first substrate 31; this is not limiting. Part of the functions of the gate driver 12A for display and the drive electrode driver 14A may be included in the IC 19 for display.

Figure 25:
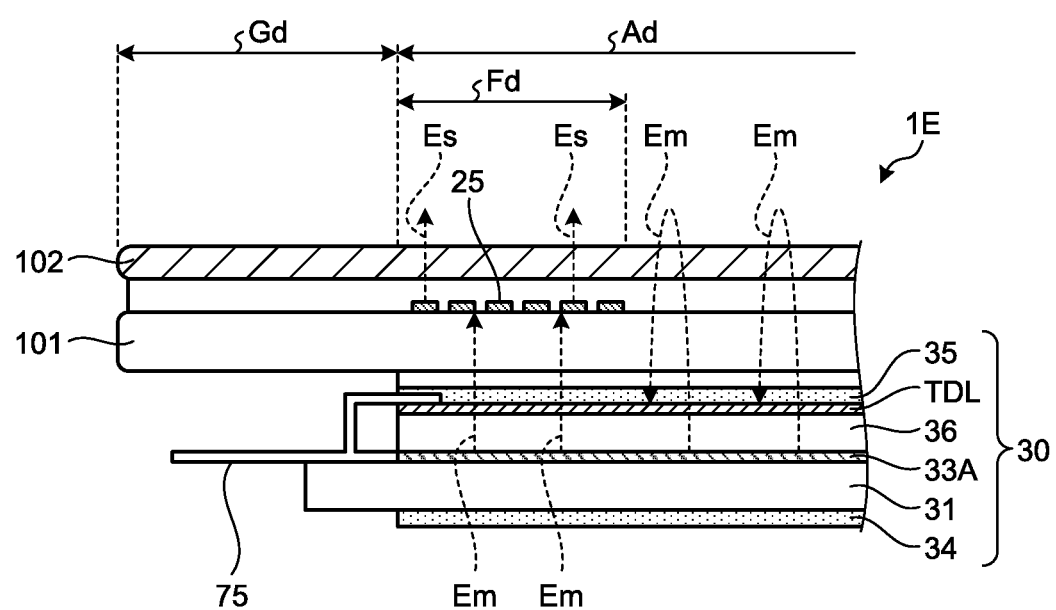
FIG. 25 is a schematic diagram for illustrating touch detection operation according to the present embodiment.

FIG. 25 is a schematic diagram for illustrating touch detection operation according to the present embodiment. As illustrated in FIG. 25, part of the third electrodes TDL overlaps with the fingerprint sensor 20 and is arranged at a position more separate from the second cover base 102 than the fingerprint sensor 20 in the direction perpendicular to the first face 102a as the detection face.

At the time of the touch detection operation, the drive signal Vs is supplied to the drive electrodes 33A, whereby a fringe electric field is generated in between the third electrodes TDL and the drive electrodes 33A. Electric lines of force Em of the fringe electric field reach above the first face 102a of the second cover base 102 in an area that does not overlap with the fingerprint detection area Fd in the transmissive area Ad. With this phenomenon, based on the basic principle of touch detection of the mutual capacitance type, the position of an external object such as a finger that comes into contact with or close to the first face 102a of the second cover base 102 can be detected.

In the fingerprint detection area Fd, the electric lines of force Em of the fringe electric field are shielded by the first electrodes 25 and the second electrode 26 (not illustrated) of the fingerprint sensor 20 and may not reach above the first face 102a of the second cover base 102. Consequently, the touch sensor 50 may reduce in the detection sensitivity of touch detection or may not perform touch detection in the fingerprint detection area Fd.

In the present embodiment, the first electrodes 25 of the fingerprint sensor 20 are used as the detection electrodes in the touch detection operation. In other words, the drive signal Vf is supplied to the first electrodes 25, whereby electric lines of force Es of an electric field extending upward from the first electrodes 25 are generated. The electric lines of force Es reach above the first face 102a of the second cover base 102 in the fingerprint detection area Fd. With this phenomenon, based on the basic principle of touch detection of the self-capacitance type, the position of an external object such as a finger that comes into contact with or close to the fingerprint detection area Fd can be detected.

The detection controller 11A (refer to FIG. 19) performs the touch detection operation by the mutual capacitance type of the touch sensor 50 in the area that does not overlap with the fingerprint detection area Fd in the transmissive area Ad and performs the touch detection operation of the fingerprint sensor 20 in the fingerprint detection area Fd. The touch detector 40A (refer to FIG. 19) performs touch detection in the area that does not overlap with the fingerprint detection area Fd in the transmissive area Ad based on the detection signal VdetA output from the third electrodes TDL. The touch detector 40A further performs touch detection in the fingerprint detection area Fd based on the detection signal Vdet output from the first electrodes 25. With this operation, touch detection in the entire transmissive area Ad is enabled. The fingerprint sensor 20 can thus perform touch detection so as to complement the touch detection operation of the touch sensor 50.

In this process, the fingerprint sensor 20 may only detect a touch without detecting a fingerprint. Consequently, for the drive of the fingerprint sensor 20, not drive for the fingerprint detection, a method of another drive, or a method for simultaneously driving a plurality of the first electrodes 25 can be employed, for example. As another method of drive, a method for driving only the first electrodes 25 at some important positions, not all the first electrodes 25, can be employed. Thus, drive for the reduction of the detection processing of the fingerprint sensor 20 can be employed. The third electrodes TDL that overlap with the fingerprint detection area Fd among the third electrodes TDL may be the dummy electrodes TDLd that do not function as the detection electrodes.

The detection controller 11A may perform the touch detection operation of the touch sensor 50 and the touch detection operation of the fingerprint sensor 20 simultaneously or with different timing. The detection controller 11A may switch the touch detection operation of the fingerprint sensor 20 to the fingerprint detection operation to perform fingerprint detection when the fingerprint sensor 20 detects the contact or closeness of a finger or the like in the fingerprint detection area Fd. In this case, the fingerprint sensor 20 can perform the fingerprint detection operation by driving the first electrodes 25 at a position overlapping with the finger or the like that comes into contact therewith or close thereto based on the positional information of the finger or the like that comes into contact therewith or close thereto detected by the touch detection operation.

Many first electrodes 25 are arranged with a pitch corresponding to an arrangement pitch Pp of the pixels Pix. In the touch detection operation, the resolution of detection may be reduced in comparison with the fingerprint detection. In this case, the fingerprint sensor 20 may collectively drive the first electrodes 25 to perform the touch detection operation for each detection electrode block. The gate driver 12 selects the gate lines GCL simultaneously, whereas the first electrode driver 14 supplies the drive signal Vf to the first electrodes 25 (the detection electrode block) corresponding to the selected gate lines GCL, for example. The detection signal Vdet responsive to the capacitance change of the first electrodes 25 (the detection electrode block) is output to the touch detector 40A. Thus, by performing touch detection for each detection electrode block, the time required for touch detection can be reduced, and the load of arithmetic processing on the touch detector 40A can be reduced.

In the present embodiment, the shape and the arrangement of the drive electrodes 33A and the third electrodes TDL illustrated in FIG. 24 can be modified as appropriate. The drive electrode 33A may be provided in the first direction Dx and a plurality of the drive electrodes 33A arranged in the second direction Dy, whereas the third electrode TDL may be provided in the second direction Dy and a plurality of the third electrodes TDL arranged in the first direction Dx, for example.

Figure 26:
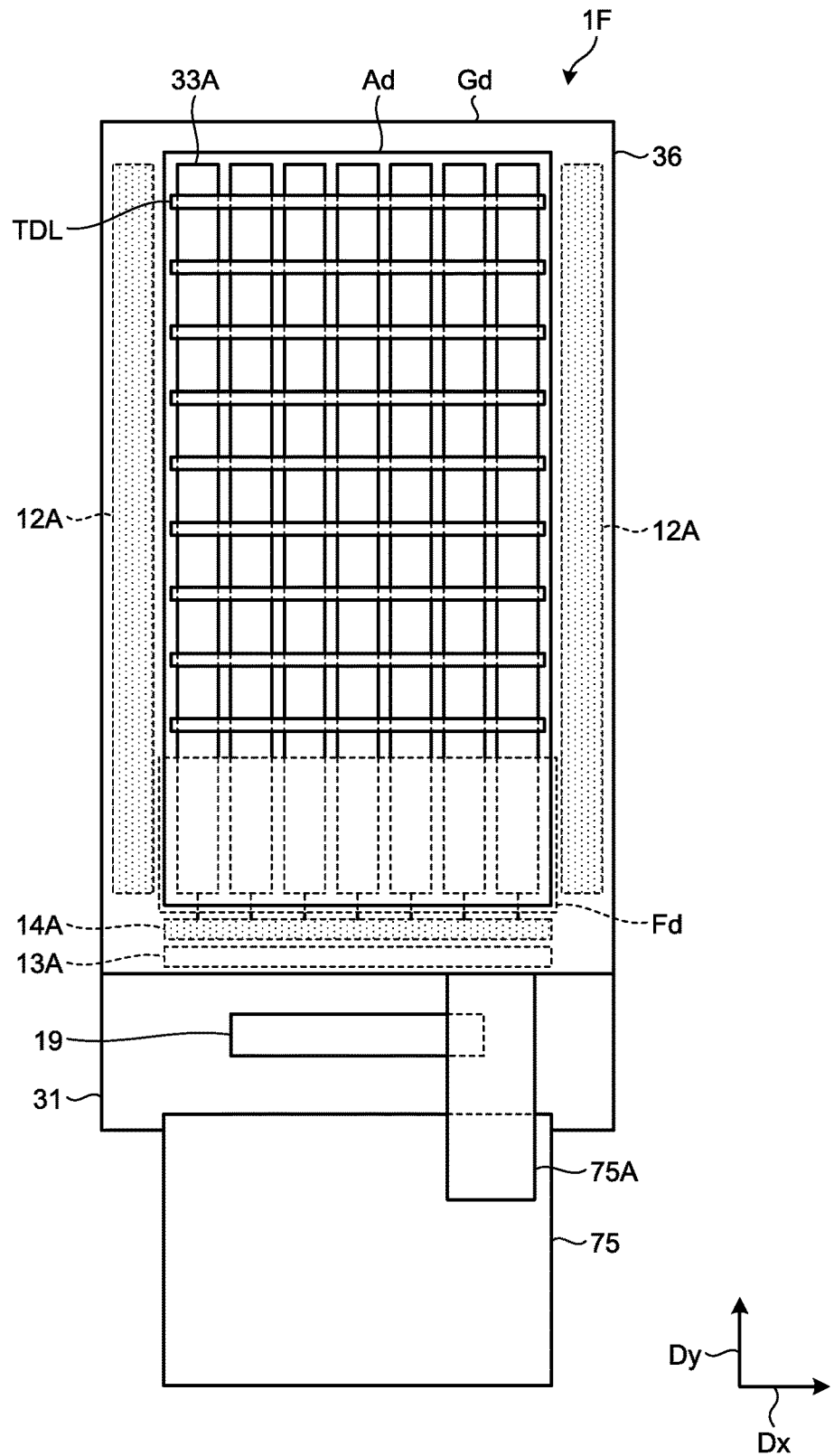
FIG. 26 is a schematic plan view of a detection function-equipped display device according to a first modification of the second embodiment.

FIG. 26 is a schematic plan view of a detection function-equipped display device according to a first modification of the second embodiment. As illustrated in FIG. 26, a display apparatus 1F of the present modification is different in that the third electrodes TDL are provided in the area that does not overlap with the fingerprint detection area Fd in the transmissive area Ad and are not provided in the fingerprint detection area Fd.

As described above, in the fingerprint detection area Fd, touch detection can be performed by the fingerprint sensor 20. Consequently, there is no need to provide the third electrodes TDL at a position overlapping with the fingerprint sensor 20. Thus, when a finger or the like comes into contact with or close to the fingerprint detection area Fd, the detection signal Vdet is output from the fingerprint sensor 20, whereas the detection signal VdetA is not output from the touch sensor 50. Consequently, the load of arithmetic processing on the touch detector 40A can be reduced.

The drive electrodes 33A function also as the common electrodes in display operation. For this purpose, the drive electrodes 33A are provided in the entire transmissive area Ad including the fingerprint detection area Fd as illustrated in FIG. 26.

Figure 27:
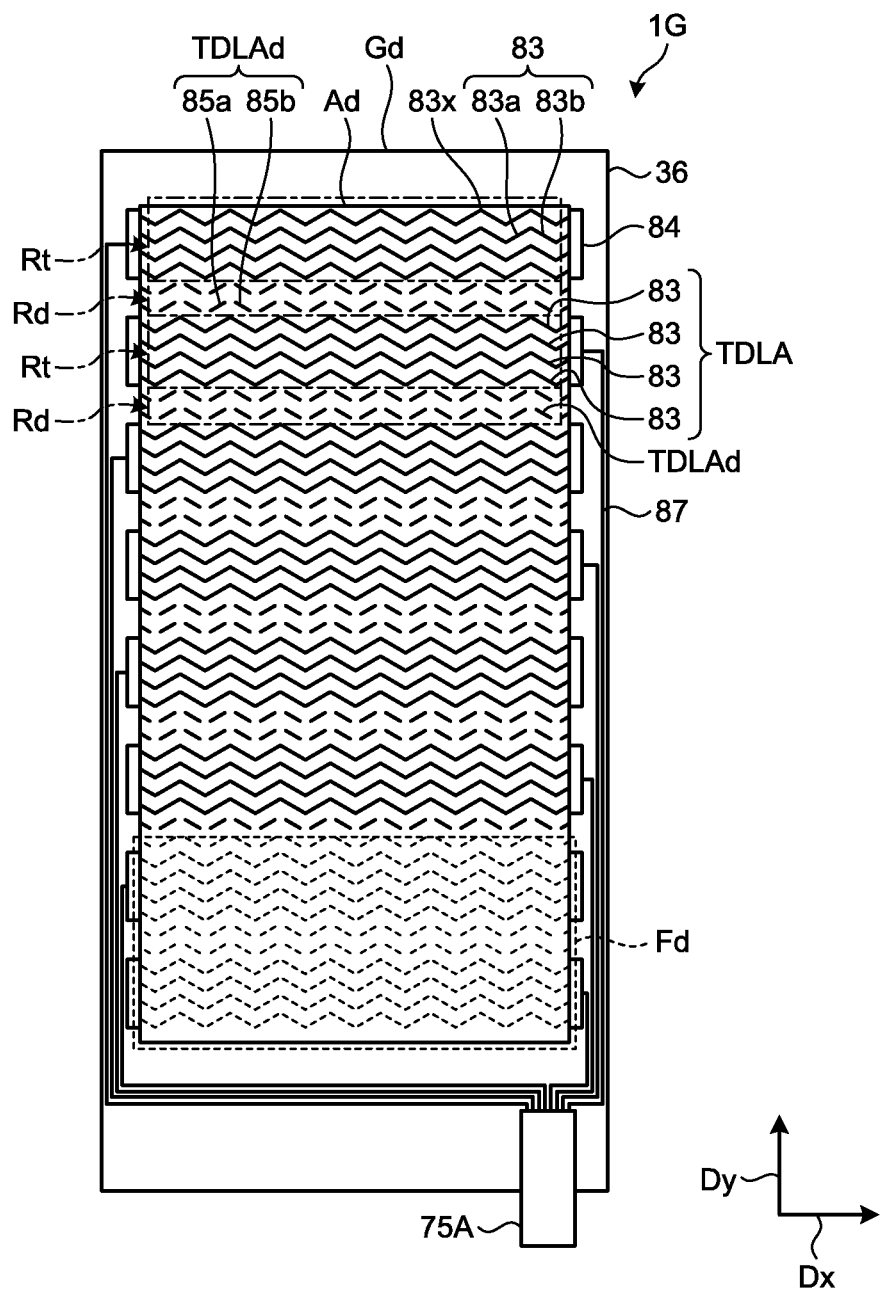
FIG. 27 is a schematic plan view of a detection function-equipped display device according to a second modification of the second embodiment.

Although FIG. 24 and FIG. 26 illustrate the configuration in which the band-shaped third electrodes TDL are arranged, this is not limiting. FIG. 27 is a schematic plan view of a detection function-equipped display device according to a second modification of the second embodiment. FIG. 27 illustrates only a plan view of the second substrate 36 and omits the drive electrodes 33A provided to the first substrate 31; also in the present modification, the drive electrodes 33A can be similar to the examples illustrated in FIG. 24 and FIG. 26.

As illustrated in FIG. 27, third electrodes TDLA that function as the detection electrodes of the touch sensor 50 and dummy electrodes TDLAd that do not function as the detection electrodes are provided in the transmissive area Ad of the second substrate 36. Detection electrode areas Rt in which the third electrodes TDLA are provided and dummy electrode areas Rd in which the dummy electrodes TDLAd are provided are alternately arranged in the second direction Dy.

Each of the third electrodes TDLA includes a plurality of metallic wires 83. Each of the metallic wires 83 includes thin line pieces 83a and thin line pieces 83b that are alternately coupled to each other with a coupling part 83x. The thin line pieces 83a and the thin line pieces 83b are inclined in directions opposite to each other relative to the first direction Dx. Each of the metallic wires 83 is formed in a zigzag line or a wavy line and is provided in the first direction Dx on the whole. A plurality of the metallic wires 83 are arranged with spacing in the second direction Dy. The ends of the arranged metallic wires 83 are coupled with a pad 84 to function as a single third electrode TDLA.

The third electrodes TDLA are band-shaped with the length in the first direction Dx on the whole and are arranged in the second direction Dy. The third electrodes TDLA are coupled to the flexible board 75A provided on the short side of the frame area Gd of the second substrate 36 via the pad 84 and a frame wire 87.

Each of the dummy electrodes TDLAd includes thin line pieces 85a and thin line pieces 85b. The thin line piece 85a is provided along the thin line piece 83a of the metallic wire 83, whereas the thin line piece 85b is provided along the thin line piece 83b of the metallic wire 83. The thin line pieces 85a and the thin line pieces 85b are alternately arranged in the first direction Dx spaced apart from each other, and a plurality of the thin wire pieces 85a and 85b are arranged in the second direction Dy.

The dummy electrodes TDLAd are arranged in between the third electrodes TDLA arranged in the second direction Dy. The dummy electrodes TDLAd are arranged in a manner spaced apart from the third electrodes TDLA and are in a floating state, in which no voltage signal is supplied, and their potential is not fixed, at the time of touch detection.

Also in the present modification, capacitances are generated at intersections of the third electrodes TDLA and the drive electrodes 33A (refer to FIGS. 24 and 26), and touch detection is enabled based on the basic principle of touch detection of the mutual capacitance type. The electric lines of force Em of the fringe electric field pass through the dummy electrode areas Rd to reach above the first face 102a of the second cover base 102.

The metallic wires 83 included in the third electrodes TDLA are formed of at least one metallic material of aluminum (Al), copper (Cu), silver (Ag), molybdenum (Mo), or an alloy of these metals. The metallic wires 83 may be a multilayer of a plurality of layers using one or more of these metallic materials. The metallic material of at least one of aluminum (Al), copper (Cu), silver (Ag), molybdenum (Mo), or an alloy of these metals is lower in resistance than translucent conductive oxides such as ITO. Since these metallic materials have larger light shielding effect than translucent conductive oxides such as ITO, transmittance may reduce, or the pattern of the third electrodes TDLA may be visually recognized. In the present embodiment, a single third electrode TDLA has a plurality of thin metallic wires 83, and the metallic wires 83 are formed in a zigzag line or a wavy line and are arranged with spacing larger than their line width, whereby a reduction in resistance and hiding can be achieved. Consequently, the third electrodes TDLA reduce in resistance, and a display apparatus 1G can be thinned and increased in screen size or increased in precision.

The thin line pieces 85a and the thin line pieces 85b included in the dummy electrodes TDLAd are preferably formed of the same metallic material as that of the metallic wires 83. With this, a difference in light transmittance between the detection electrode areas Rt and the dummy electrode areas Rd is lessened, and the third electrodes TDLA and the dummy electrodes TDLAd can be hidden. To reduce reflectance, blackening treatment is preferably performed on the outermost surface of the metallic wires 83, the thin line pieces 85a, and the thin line pieces 85b.

Also in the present modification, the fingerprint sensor 20 is provided overlapping with the fingerprint detection area Fd. The touch sensor 50 performs touch detection in accordance with a capacitance change between the third electrodes TDLA and the drive electrodes 33A in the area that does not overlap with the fingerprint detection area Fd in the transmissive area Ad. The fingerprint sensor 20 performs touch detection by the capacitance change of the first electrodes 25 in the fingerprint detection area Fd. With this operation, touch detection in the entire transmissive area Ad is enabled.

In the present modification, the third electrodes TDLA include the metallic wires 83, and the area that includes the third electrodes TDLA and the area that does not include the third electrodes TDLA differ in light transmittance, whereby the third electrodes TDLA may be visually recognized by a viewer. For this reason, the third electrodes TDLA are preferably provided in the fingerprint detection area Fd. Alternatively, without providing the third electrodes TDLA in the fingerprint detection area Fd, the dummy electrodes TDLAd formed of the same metallic material may be provided in the fingerprint detection area Fd. With this configuration, the third electrodes TDLA and the dummy electrodes TDLAd can be hidden in the entire transmissive area Ad.

Third Embodiment

Figure 28:
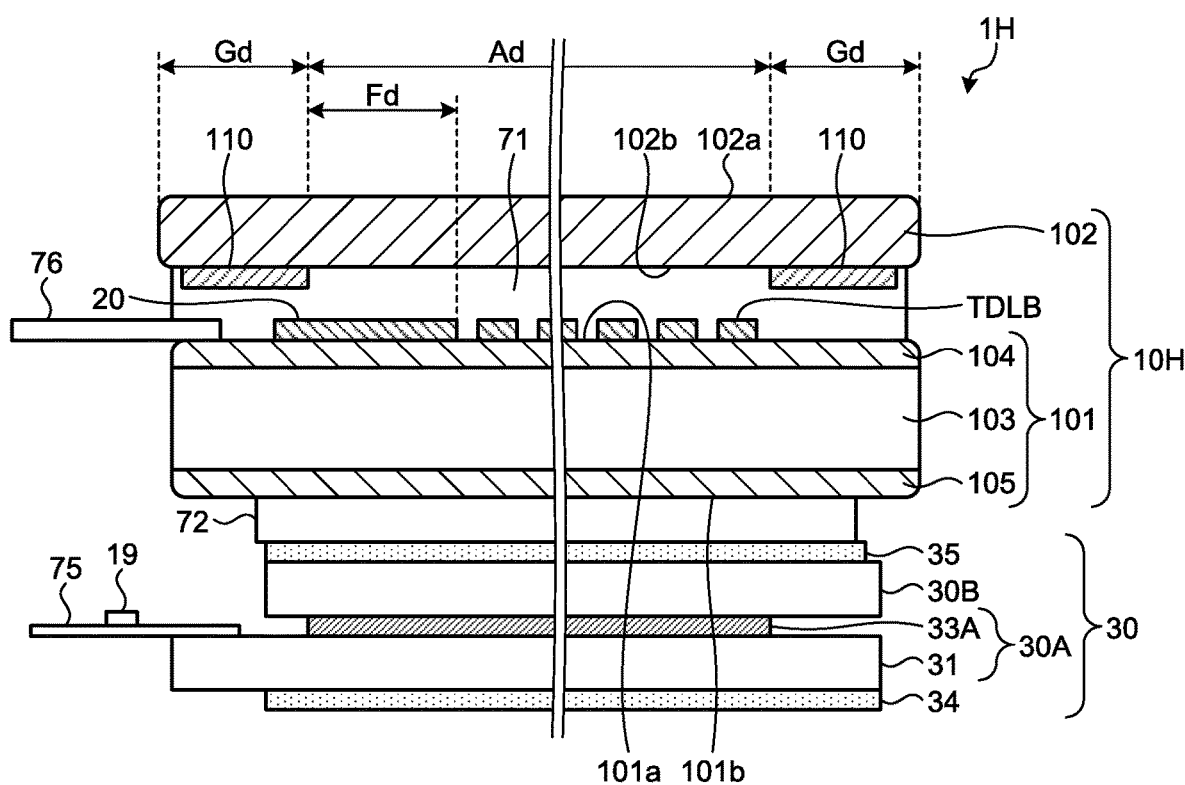
FIG. 28 is a sectional view of a schematic sectional structure of a display apparatus according to a third embodiment.
Figure 29:
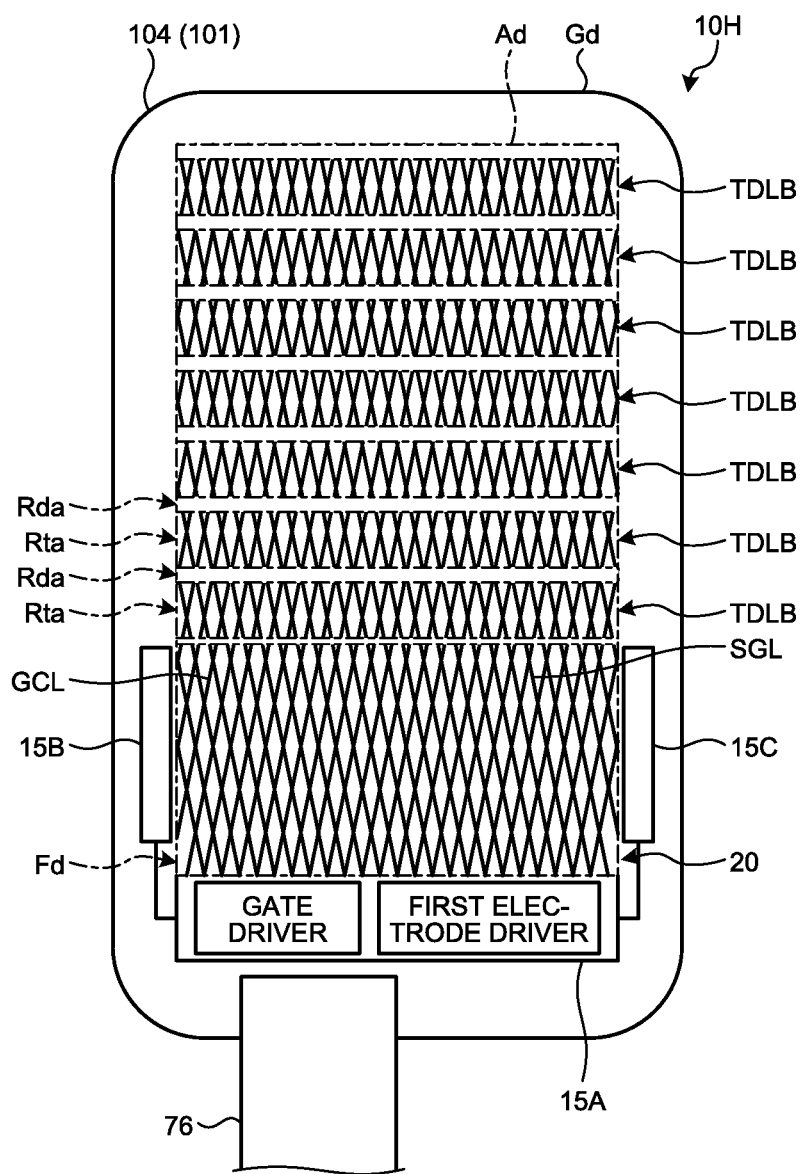
FIG. 29 is schematic plan view of a cover member according to the third embodiment.
Figure 30:
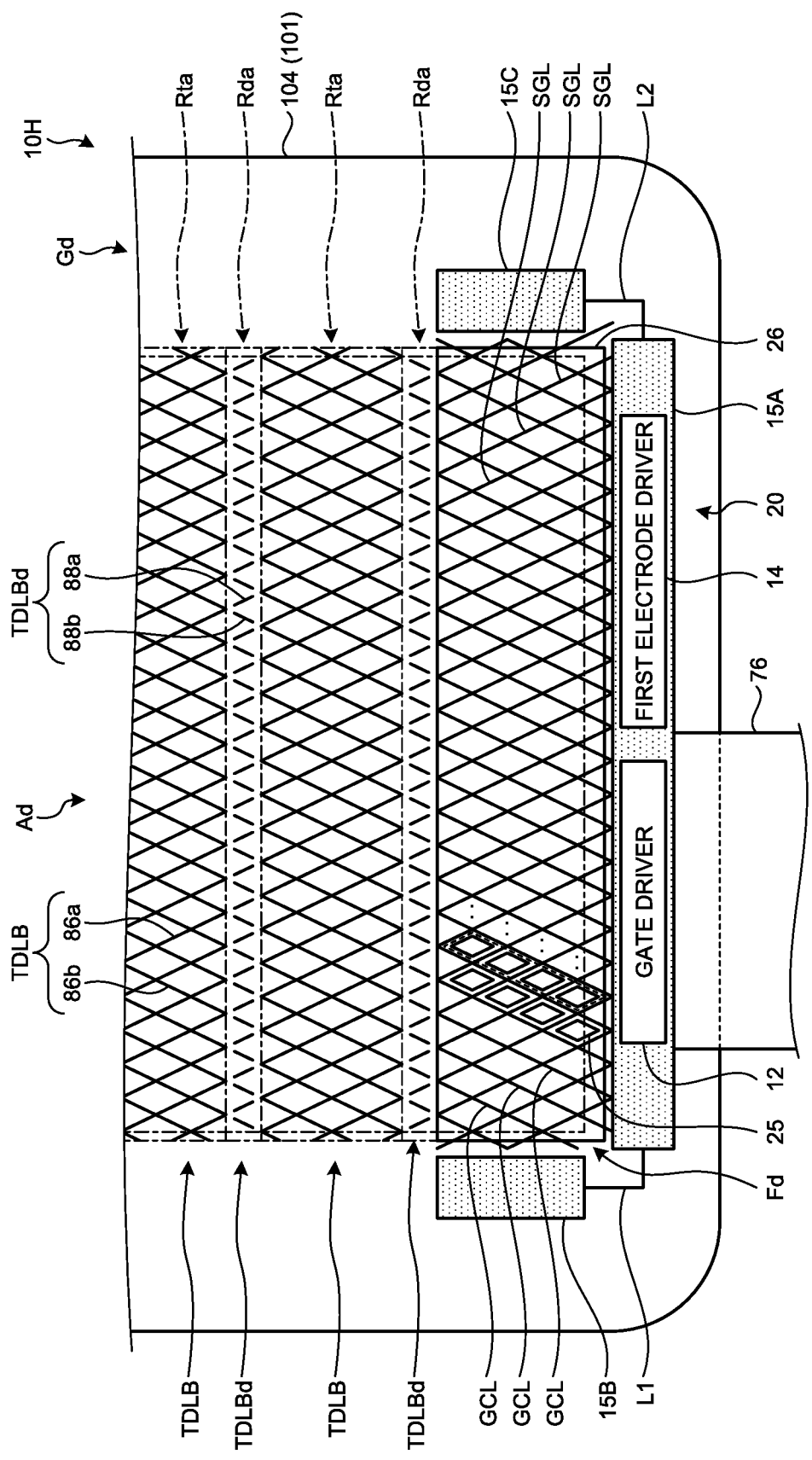
FIG. 30 is a plan view illustrating the relation among first electrodes, third electrodes, and various wires according to the third embodiment in an enlarged manner.
Figure 31:
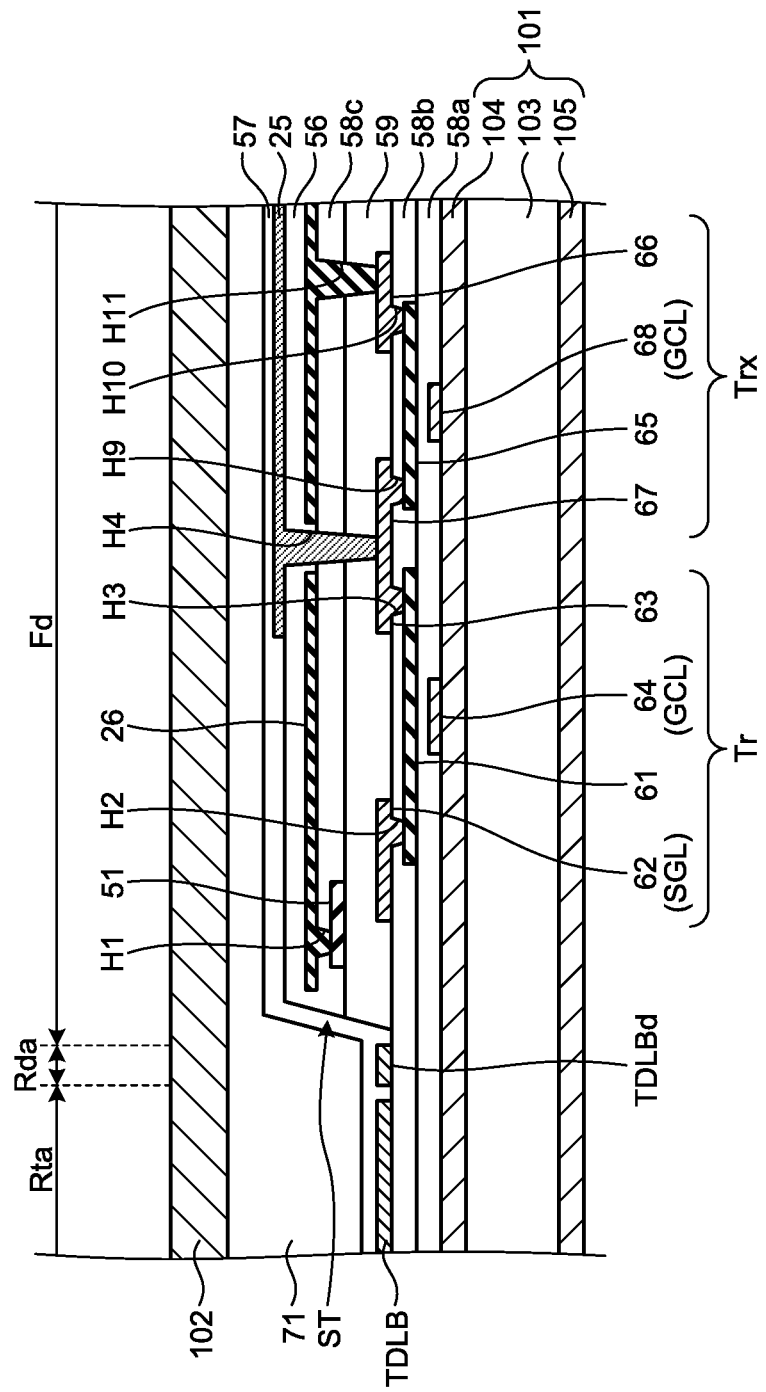
FIG. 31 is a sectional view schematically illustrating a sectional structure of a fingerprint detection area, a dummy electrode area, and a detection electrode area.

FIG. 28 is a sectional view of a schematic sectional structure of a display apparatus according to a third embodiment. FIG. 29 is schematic plan view of a cover member according to the third embodiment. FIG. 30 is a plan view illustrating the relation among first electrodes, third electrodes, and various wires according to the third embodiment in an enlarged manner. FIG. 31 is a sectional view schematically illustrating a sectional structure of a fingerprint detection area, a dummy electrode area, and a detection electrode area.

As illustrated in FIG. 28, in a display apparatus 1H of the present embodiment, third electrodes TDLB are provided adjacent to the fingerprint sensor 20 on the first cover base 101 of a cover member 10H. In an area overlapping with the fingerprint detection area Fd in the transmissive area Ad, the fingerprint sensor 20 is provided on the first alkali-free glass layer 104 of the first cover base 101. In the area that does not overlap with the fingerprint detection area Fd in the transmissive area Ad, the third electrodes TDLB are provided on the first alkali-free glass layer 104 of the first cover base 101. In the present embodiment, no detection electrode is provided on the display panel 30.

The drive electrodes 33A are provided to the first substrate 31 of the display panel 30, and capacitances are generated in between the third electrodes TDLB of the cover member 10H and the drive electrodes 33A of the display panel 30. A signal responsive to a change in the capacitances generated at intersections of the third electrodes TDLB and the drive electrodes 33A is output from the third electrodes TDLB, and touch detection is enabled based on the basic principle of touch detection of the mutual capacitance type. In other words, the third electrodes TDLB and the drive electrodes 33A function as the touch sensor 50 (refer to FIG. 19).

As illustrated in FIG. 29 and FIG. 30, in the area that does not overlap with the fingerprint detection area Fd in the transmissive area Ad, the third electrodes TDLB that function as the detection electrodes and dummy electrodes TDLBd that do not function as the detection electrodes are provided on the first cover base 101. Detection electrode areas Rta including the third electrodes TDLB and dummy electrode areas Rda including the dummy electrodes TDLBd are alternately arranged in the second direction Dy. FIG. 29 omits the dummy electrodes TDLBd for easy viewing.

As illustrated in FIG. 30, each of the third electrodes TDLB includes a plurality of metallic wires 86a and 86b. The metallic wire 86a is provided in a manner inclined in the same direction as that of the signal lines SGL of the fingerprint sensor 20 and a plurality of the metallic wires 86a are arranged with the same pitch as that of the signal lines SGL. The metallic wire 86b is provided in a manner inclined in the same direction as that of the gate line GCL of the fingerprint sensor 20 and a plurality of the metallic wires 86b are arranged with the same pitch as that of the gate lines GCL. The metallic wires 86a and 86b are provided on the same layer and are electrically coupled to each other at intersections to function as a single third electrode TDLB.

As illustrated in FIG. 29, the third electrode TDLB is band-shaped with the length in the first direction Dx on the whole and a plurality of the third electrodes TDLB are arranged in the second direction Dy. In other words, the third electrodes TDLB cross the drive electrodes 33A illustrated in FIG. 24 and FIG. 26 in a plan view. The third electrodes TDLB are coupled to the flexible board 76 provided on the short side of the frame area Gd of the first cover base 101 via frame wiring (not illustrated).

As illustrated in FIG. 30, each of the dummy electrodes TDLBd includes thin line pieces 88a and thin line pieces 88b. The thin line piece 88a is provided in a manner inclined in the same direction as that of the signal lines SGL and a plurality of the thin line pieces 88a are arranged with the same pitch as that of the signal lines SGL. The thin line piece 88b is provided in a manner inclined in the same direction as that of the gate lines GCL and a plurality of the thin line pieces 88b are arranged with the same pitch as that of the gate lines GCL. The thin line piece 88a and the thin line piece 88b are alternately arranged in the first direction Dx spaced from each other.

The dummy electrodes TDLBd are arranged in between the third electrodes TDLB arranged in the second direction Dy. The dummy electrodes TDLBd are arranged in a manner spaced apart from the third electrodes TDLB and are in a floating state, in which no voltage signal is supplied, and their potential is not fixed, at the time of touch detection.

Also in the present embodiment, capacitances are generated at intersections of the third electrodes TDLB and the drive electrodes 33A (refer to FIGS. 24 and 26), and touch detection is enabled based on the basic principle of touch detection of the mutual capacitance type. The electric lines of force Em of the fringe electric field pass through the dummy electrode areas Rda to reach above the first face 102a of the second cover base 102.

In the present embodiment, the detection controller 11A (refer to FIG. 19) performs the touch detection operation by the mutual capacitance type with the third electrodes TDLB and the drive electrodes 33A in the area that does not overlap with the fingerprint detection area Fd in the transmissive area Ad, and performs the touch detection operation of the fingerprint sensor 20 in the fingerprint detection area Fd. The touch detector 40A (refer to FIG. 19) performs touch detection in the area that does not overlap with the fingerprint detection area Fd in the transmissive area Ad based on the detection signal VdetA output from the third electrodes TDLB. The touch detector 40A further performs touch detection in the fingerprint detection area Fd based on the detection signal Vdet output from the first electrodes 25. With this operation, touch detection in the entire transmissive area Ad is enabled. The fingerprint sensor 20 and the third electrodes TDLB of the cover member 10H can thus perform touch detection in the entire transmissive area Ad.

As illustrated in FIG. 31, the third electrodes TDLB and the dummy electrodes TDLBd are provided on the same layer as the signal lines SGL. The third electrodes TDLB and the dummy electrodes TDLBd are provided on the first alkali-free glass layer 104 of the first cover base 101 with the insulating layer 58a and the insulating layer 58b interposed therebetween. The insulating layer 57 is provided on the third electrodes TDLB and the dummy electrodes TDLBd. In other words, the flattening layer 59 and the insulating layer 58c are not provided on the third electrodes TDLB and the dummy electrodes TDLBd, whereas the insulating layer 58b, the flattening layer 59, and the insulating layer 58c form a step ST. The insulating layer 57 covers the first electrodes 25, the third electrodes TDLB, and the dummy electrodes TDLBd and is provided continuously on a side face of the flattening layer 59 of the step ST and a side face of the insulating layer 58c.

The second cover base 102 is laminated on the insulating layer 57 with the adhesive layer 71 interposed therebetween. As described above, the optical clear resin (OCR) as a liquid UV-curable resin is used for the adhesive layer 71, whereby the step ST is flattened, and the second cover base 102 is laminated to be flat across the fingerprint detection area Fd, the dummy electrode areas Rda, and the detection electrode area Rta.

In the cover member 10H of the present embodiment, the metallic wires 86a and 86b of the third electrodes TDLB and the thin line pieces 88a and the thin line pieces 88b of the dummy electrodes TDLBd are provided in the same direction and with the same pitch as those of the signal lines SGL and the gate lines GCL of the fingerprint sensor 20. With this configuration, a difference in light transmittance among the fingerprint detection area Fd, the dummy electrode areas Rda, and the detection electrode area Rta can be reduced, whereby the visibility of the entire transmissive area Ad can be improved. The third electrodes TDLB and the dummy electrodes TDLBd are provided on the same layer as the signal lines SGL. With this configuration, the third electrodes TDLB and the dummy electrodes TDLBd can be formed using the same material and in the same process as those of the signal lines SGL.

Fourth Embodiment

Figure 32:
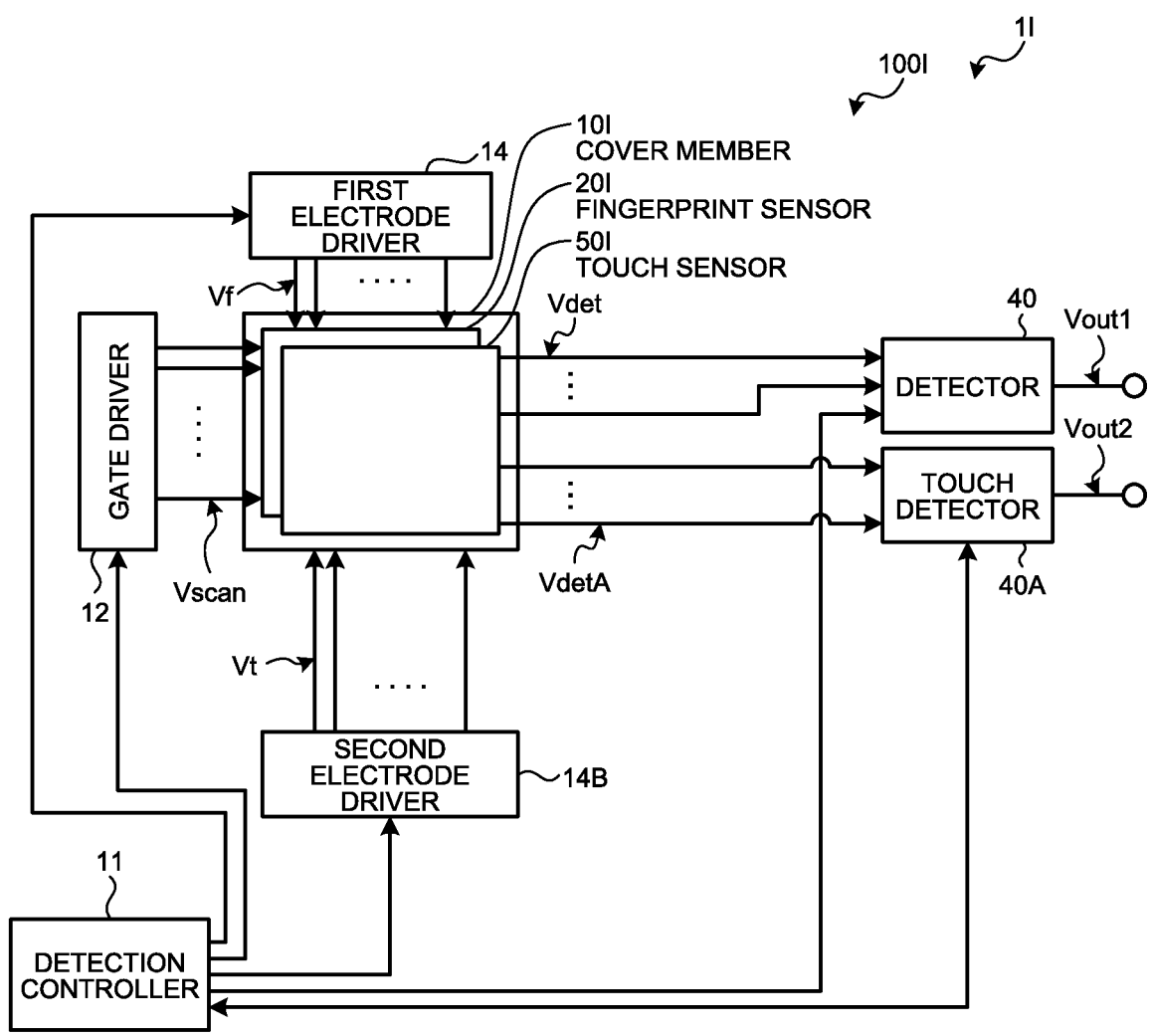
FIG. 32 is a block diagram of a configuration example of a detection apparatus that a display apparatus according to a fourth embodiment includes.

FIG. 32 is a block diagram of a configuration example of a detection apparatus that a display apparatus according to a fourth embodiment includes. In this display apparatus 1I of the present embodiment, a detection apparatus 1001 includes a cover member 10I, the detection controller 11, the gate driver 12, the first electrode driver 14, a second electrode driver 14B, the detector 40, and the touch detector 40A. In the present embodiment, the cover member 10I is a member in which a fingerprint sensor 201 configured to detect a fingerprint of a finger and a touch sensor 501 configured to detect the closeness and the position of a finger are integral with each other.

The detection controller 11, the gate driver 12, and the first electrode driver 14 perform operations similar to those of the first embodiment. The second electrode driver 14B is a circuit that supplies a drive signal Vt to the second electrode 26 of the touch sensor 501 based on the control signal supplied from the detection controller 11. The touch sensor 501 outputs the detection signal VdetA based on the capacitance change of the second electrode 26 to the touch detector 40A. The touch detector 40A can detect the position of an object that comes into contact with or close to the cover member 10I based on the detection signal VdetA.

Figure 33:
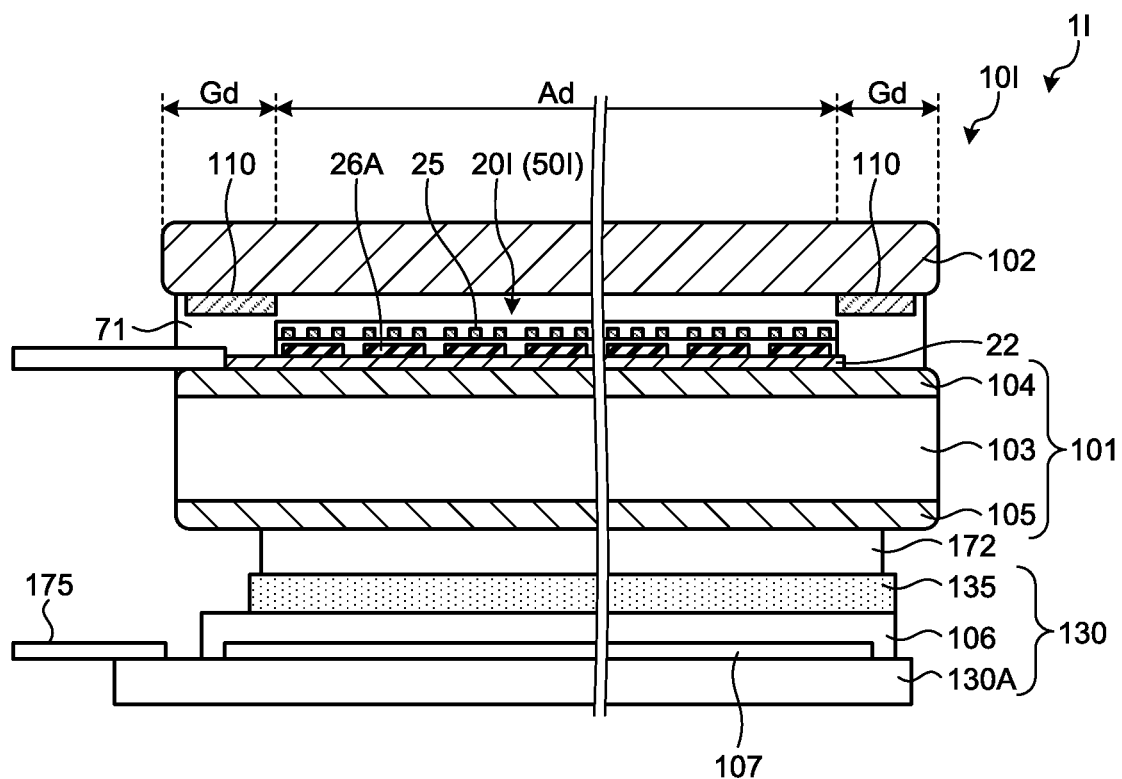
FIG. 33 is a sectional view of a schematic sectional structure of the display apparatus according to the fourth embodiment.
Figure 34:
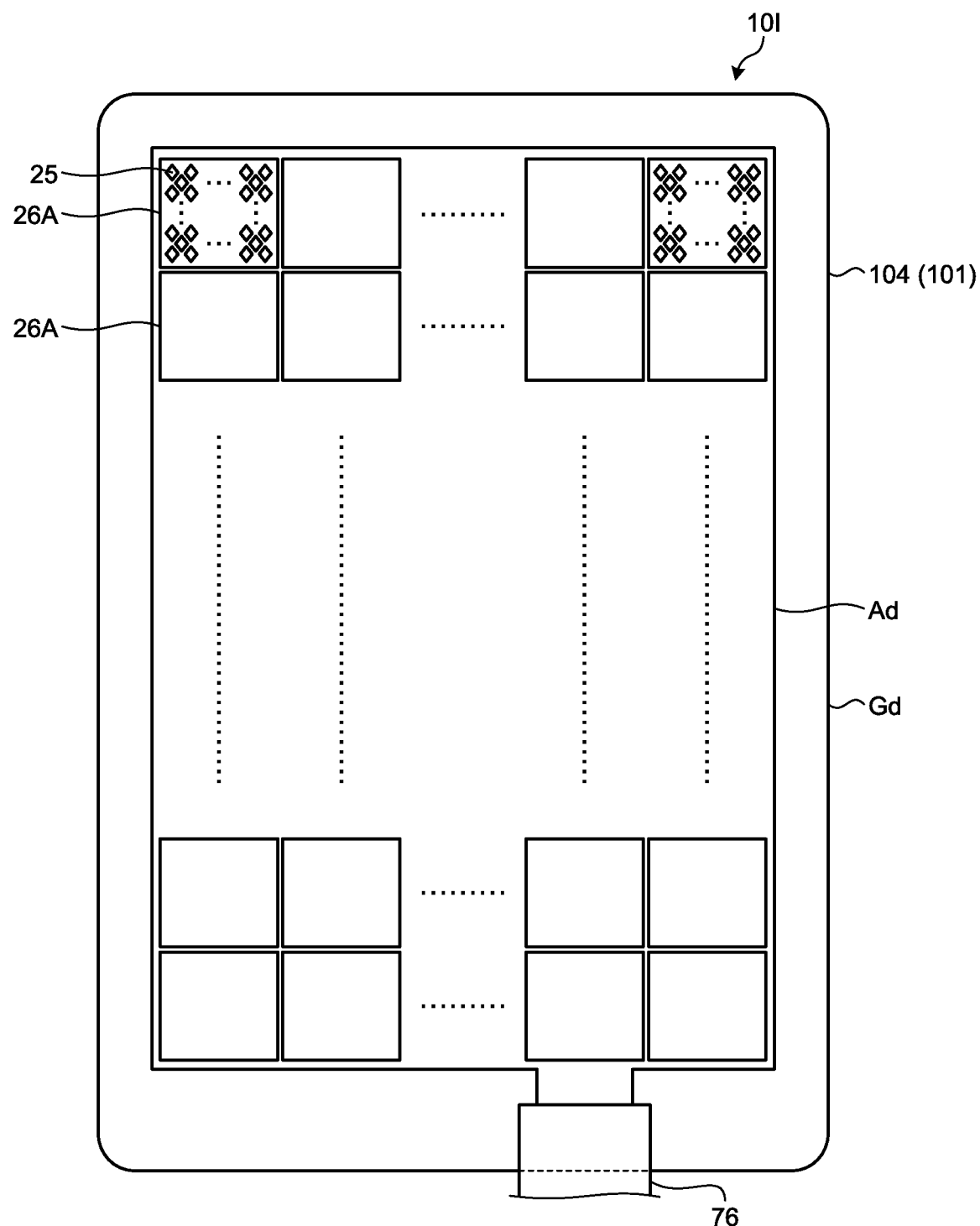
FIG. 34 is a plan view of a cover member according to the fourth embodiment.

FIG. 33 is a sectional view of a schematic sectional structure of the display apparatus according to the fourth embodiment. FIG. 34 is a plan view of the cover member according to the fourth embodiment. As illustrated in FIG. 33, in the display apparatus 1I of the present embodiment, the fingerprint sensor 201 is provided on the first alkali-free glass layer 104 of the first cover base 101 overlapping with the entire transmissive area Ad. An organic EL display panel 130 is laminated on the second alkali-free glass layer 105 of the first cover base 101 with an adhesive layer 172 interposed therebetween.

The organic EL display panel 130 includes a circuit board 130A, a light-emitting layer 107, a sealing layer 106, and a polarizing plate 135. The light-emitting layer 107 includes a plurality of light-emitting devices (organic light-emitting diodes (OLEDs)) as self-light-emitting elements; light originating from the light-emitting devices is emitted toward the cover member 10I, and an image is displayed. The organic EL display panel 130 may emit white light from the light-emitting layer 107 to cause the white light to pass through color filters (not illustrated) to achieve colorization or may cause the respective light-emitting devices of the light-emitting layer 107 to emit light of respective RGB colors without providing any color filter.

The circuit board 130A includes switching elements for performing display drive and various signal lines. A flexible board 175 is coupled to the circuit board 130A, to which a control signal is supplied from an external control circuit via the flexible board 175. The sealing layer 106 is provided on the light-emitting layer 107 and has a function of lessening the transmission of water and the like to protect the light-emitting devices (the OLEDs) of the light-emitting layer 107. The polarizing plate 135 is a circularly polarizing plate including a phase difference plate and a polarizing plate, for example, and is provided in order to lessen the reflection of external light. However, the polarizing plate 135 is not necessarily provided.

Although the organic EL display panel 130 is what is called a top emission type, this is not limiting; it may be a bottom emission type. In place of the organic EL display panel 130, the display panel 30 as the liquid crystal panel in which the liquid crystal display element is used as the display functional layer illustrated in the first embodiment may be provided.

As illustrated in FIG. 34, a plurality of second electrodes 26A are arranged in a matrix manner in a direction along the long side of the transmissive area Ad and a direction along the short side thereof. The second electrodes 26A are each rectangular-shaped. The first electrodes 25 are provided overlapping with the second electrodes 26A in the transmissive area Ad. The first electrodes 25 are each rhombic-shaped and are arranged so as to cause the respective sides of the rhombic shape to face each other similarly to the above configuration. Each of the first electrodes 25 has a smaller area than the second electrode 26A, and many first electrodes 25 are arranged overlapping with one second electrode 26A. Although FIG. 34 illustrates only part of the first electrodes 25 and part of the second electrodes 26A for easy viewing of the drawing, the first electrodes 25 and the second electrodes 26A may be provided in the entire transmissive area Ad. The first electrodes 25 may be provided at positions overlapping with partial second electrodes 26A.

In the present embodiment, the first electrodes 25 function as the detection electrodes of the fingerprint sensor 201. The second electrodes 26A function as both the shield electrodes of the fingerprint sensor 201 and the detection electrodes of the touch sensor 501.

Figure 36:
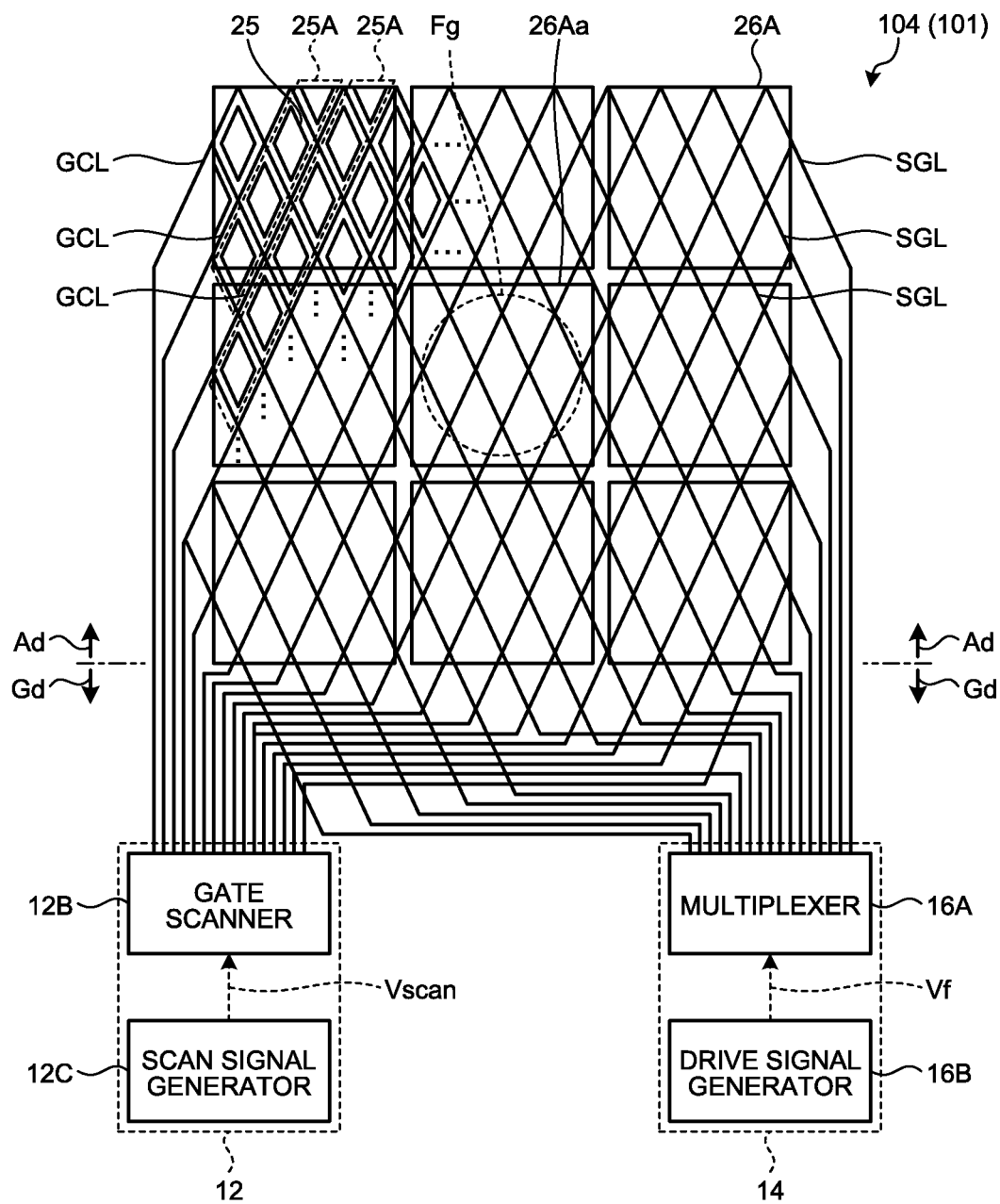
FIG. 36 is a plan view schematically illustrating an entire configuration of the first electrodes, the second electrodes, the gate lines, and the signal lines.

FIG. 35 is a plan view schematically illustrating an entire configuration of the second electrodes and conductive wires. FIG. 36 is a plan view schematically illustrating an entire configuration of the first electrodes, the second electrodes, the gate lines, and the signal lines. As illustrated in FIG. 35, respective conductive wires 51 are coupled to the second electrodes 26A arranged in a matrix manner through respective contact holes H1a. In the present embodiment, one conductive wire 51 is coupled to one second electrode 26A. The conductive wires 51 are inclined relative to the arrangement direction of the row direction of the second electrodes 26A in the transmissive area Ad and are routed from the transmissive area Ad to the frame area Gd. The conductive wires 51 are electrically coupled to the flexible board 76 (refer to FIG. 34) to be coupled to control circuits such as the IC 18 for detection (refer to FIG. 2).

The drive signal Vt is supplied from the second electrode driver 14B to the conductive wires 51. The detection signal VdetA responsive to a change in the self capacitance of the second electrodes 26A is supplied to the touch detector 40A via the conductive wires 51. With this operation, an external object that comes into contact with or close to the cover member 10I can be detected based on the touch detection principle of the self-capacitance type. The drive signal Vt may be supplied to all the second electrodes 26A simultaneously or supplied thereto successively by providing a scanner circuit in the second electrode driver 14B. The second electrodes 26A are arranged in almost the entire transmissive area Ad. With this configuration, the touch detector 40A can detect the position of the external object that comes into contact with or close to the transmissive area Ad based on the detection signal VdetA from the respective second electrodes 26A.

As illustrated in FIG. 36, the gate lines GCL and the signal lines SGL are provided overlapping with the second electrodes 26A. The gate lines GCL are inclined relative to the arrangement direction of the row direction of the second electrodes 26A. The signal lines SGL are inclined in a direction opposite to the gate lines GCL relative to the arrangement direction of the row direction of the second electrodes 26A. The signal lines SGL and the gate lines GCL cross each other to be arranged in a mesh manner. The rhombic-shaped first electrodes 25 are provided in the respective areas surrounded by the signal lines SGL and the gate lines GCL. Although each of the first electrodes 25 is rhombic-shaped, in which the four sides are the same in length, this is not limiting; it may be parallelogrammatic-shaped, rectangular-shaped, or square-shaped, for example.

Also in the present embodiment, similarly to the configuration illustrated in FIG. 9 to FIG. 11, the first switching elements Tr and the second switching elements Trx (omitted in FIG. 36) are provided corresponding to the respective first electrodes 25, and the fingerprint detection operation is performed based on the capacitance change of the first electrodes 25.

As illustrated in FIG. 36, the gate lines GCL are coupled to a gate scanner 12B of the gate driver 12 provided in the frame area Gd. The gate scanner 12B successively selects the gate lines GCL. A scan signal generator 12C supplies the scan signal Vscan to the gate line GCL selected by the gate scanner 12B. The first electrodes 25 arranged along the gate lines GCL are selected as the first electrode block 25A as the object to be detected, and a high-level scan signal Vscan is supplied to the first switching elements Tr (refer to FIG. 9 and FIG. 11) corresponding to the respective first electrodes 25 of the first electrode block 25A.

The signal lines SGL are coupled to a multiplexer 16A of the first electrode driver 14 provided in the frame area Gd. The multiplexer 16A successively selects the signal lines SGL. A drive signal generator 16B supplies the drive signal Vf to the selected signal line SGL via the multiplexer 16A. With this operation, the drive signal Vf is supplied to the respective first electrodes 25 of the first electrode block 25A as the object to be detected via the signal lines SGL and the first switching elements Tr (refer to FIG. 9 and FIG. 11). The drive signal Vf is supplied, whereby the detection signal Vdet responsive to the capacitance changes of the respective first electrodes 25 is output from the respective first electrodes 25 to the detector 40 (refer to FIG. 32), whereby the fingerprint of the finger is detected. At the time of the detection operation by the first electrodes 25, the guard signal Vsgl that is in sync with and has the same waveform as the drive signal Vf is supplied to the respective second electrodes 26A, whereby the respective second electrodes 26A function as shield electrodes.

The cover member 10I of the present embodiment includes the touch sensor 501 and the fingerprint sensor 201. With this configuration, the detection controller 11 acquires the position coordinates of a finger detected by the touch sensor 501, and the fingerprint sensor 201 can perform fingerprint detection at a part corresponding to the position coordinates of the finger. In the touch detection operation, when the contact or closeness of a finger Fg is detected at a position overlapping with a second electrode 26Aa illustrated in FIG. 35, for example, the first electrode 25 at a position overlapping with this second electrode 26Aa is driven to perform fingerprint detection.

In other words, in the fingerprint detection operation, the gate scanner 12B illustrated in FIG. 36 selects only the gate lines GCL that overlap with the second electrode 26Aa on which the finger Fg has been detected and successively scans the gate lines GCL. The gate lines GCL that do not overlap with the second electrode 26Aa are not selected, and the scan signal Vscan is not supplied thereto. The multiplexer 16A selects only the signal lines SGL that overlap with the second electrode 26Aa and successively drives the first electrodes 25 that are arranged overlapping with the second electrode 26Aa. The signal lines SGL that do not overlap with the second electrode 26Aa are not selected. With this operation, the fingerprint can be detected at the position with which or to which the finger Fg has come into contact or close.

Thus, the fingerprint detection operation can be performed at the position in which the contact or closeness of the finger Fg has been detected. Consequently, it is not necessary to perform the fingerprint detection operation in the entire transmissive area Ad or the entire fingerprint detection area Fd, whereby the time required for detection can be reduced, and the load of arithmetic processing on the detector 40 can be reduced.

Fifth Embodiment

Figure 37:
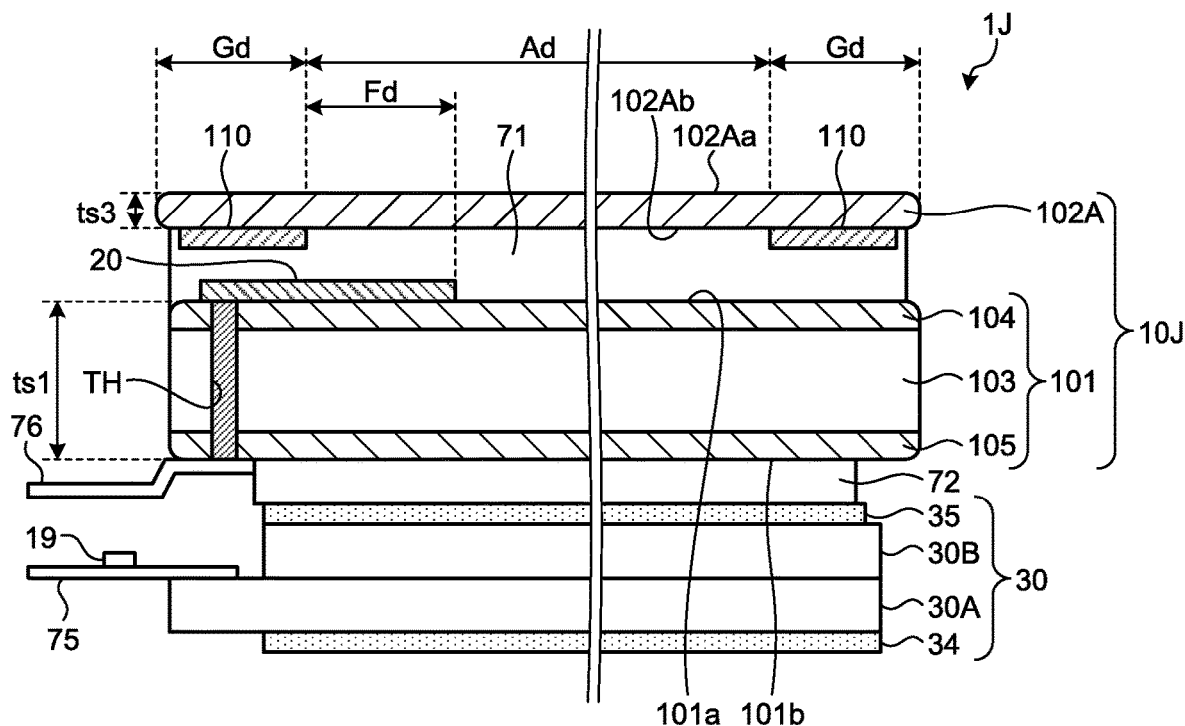
FIG. 37 is a sectional view of a schematic sectional structure of a display apparatus according to a fifth embodiment.

FIG. 37 is a sectional view of a schematic sectional structure of a display apparatus according to a fifth embodiment. In this display apparatus 1J of the present embodiment, a resin film is used for a second cover base 102A of a cover member 10J. A polyimide resin or an acrylic resin is used for the second cover base 102A, for example. A resin film is used for the second cover base 102A. Consequently, compared with a case in which a glass substrate is used, the likelihood of breakage of the second cover base 102A when an impact is applied is lessened, for example, and favorable records can be achieved in a drop test and a steel ball drop test, for example.

Compared with a case in which a glass substrate is used, a thickness ts3 of the second cover base 102A can be easily reduced; the thickness ts3 can be a thickness of 0.2 mm or less, for example. Consequently, the distance between a first face 102Aa of the second cover base 102A as a detection face and the first electrodes 25 (omitted in FIG. 37) of the fingerprint sensor 20 can be reduced, and favorable detection performance can be achieved.

The decoration layer 110 is provided on a second face 102Ab of the second cover base 102A in the frame area Gd. The decoration layer 110 can be formed by printing using colored ink.

The flexible board 76 is provided on the second alkali-free glass layer 105 of the first cover base 101. The first cover base 101 has a through hole TH passing through in a thickness direction, and the flexible board 76 and the fingerprint sensor 20 are electrically coupled to each other through the through hole TH. The flexible board 76 is provided on a side of the first cover base 101 opposite to the fingerprint sensor 20. With this configuration, the spacing between the first cover base 101 and the second cover base 102A can be reduced, whereby the distance between the first face 102Aa and the first electrodes 25 (omitted in FIG. 37) of the fingerprint sensor 20 can be reduced.

Sixth Embodiment

Figure 38:
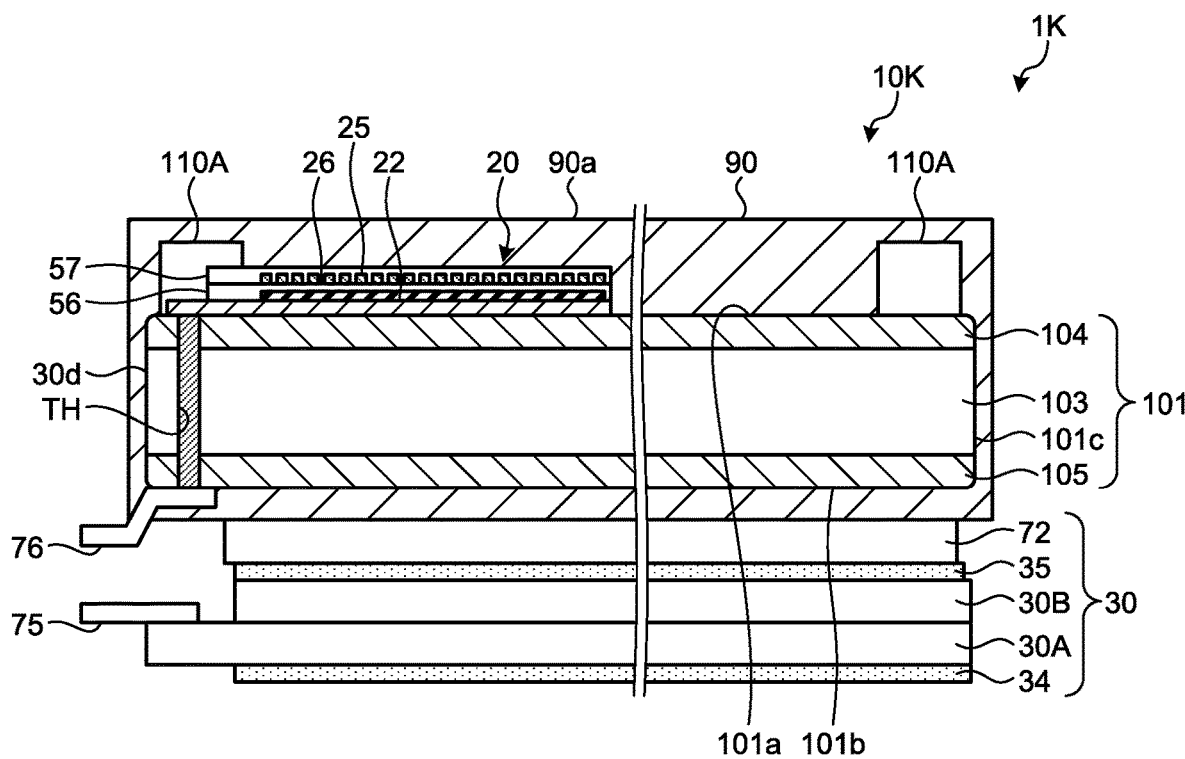
FIG. 38 is a sectional view of a schematic sectional structure of a display apparatus according to a sixth embodiment.
Figure 39:
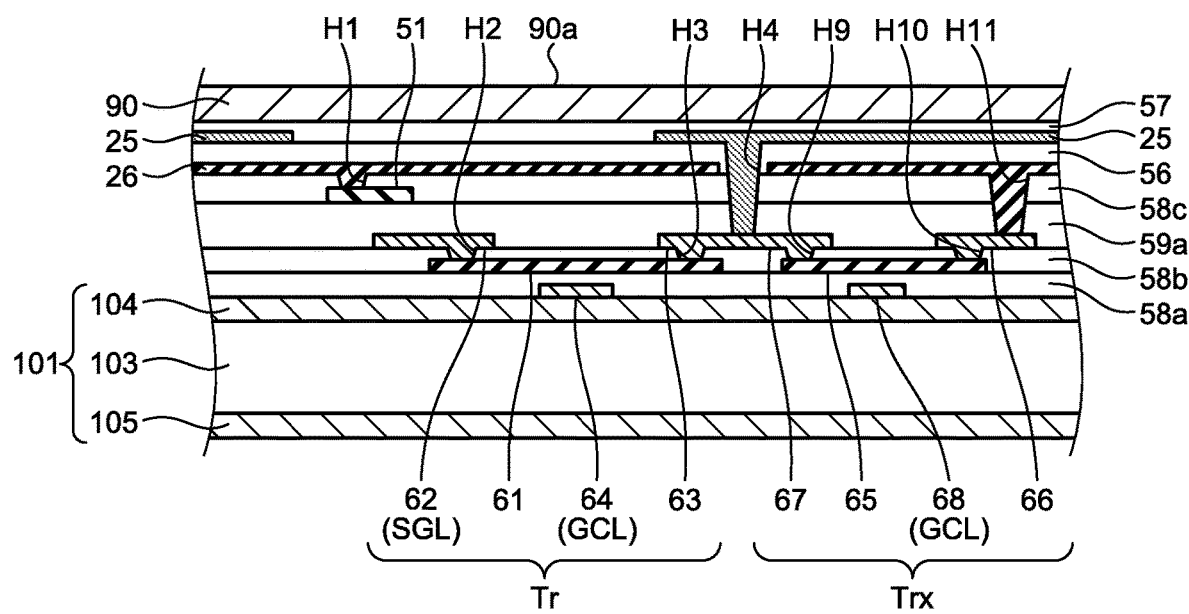
FIG. 39 is a sectional view of a schematic sectional structure of a fingerprint sensor according to the sixth embodiment.

FIG. 38 is a sectional view of a schematic sectional structure of a display apparatus according to a sixth embodiment. FIG. 39 is a sectional view of a schematic sectional structure of a fingerprint sensor according to the sixth embodiment. In this display apparatus 1K of the present embodiment, a cover member 10K includes a protective layer 90 in place of the second cover bases 102 and 102A. An upper face 90a of the protective layer 90 is a detection face for detecting the unevenness of the surface of an object to be detected such as a fingerprint of a finger that comes into contact therewith or close thereto.

As illustrated in FIG. 38, the fingerprint sensor 20 and a decoration layer 110A are provided on the first alkali-free glass layer 104 of the first cover base 101. For the fingerprint sensor 20, any of the fingerprint sensors 20, 20A to 20D, and 20I illustrated in the embodiments and the modifications can be used. The decoration layer 110A can be formed by printing or may be formed by sputtering, vapor deposition, or the like. The flexible board 76 is coupled to the fingerprint sensor 20 through the through hole TH provided in the first cover base 101.

The protective layer 90 is provided around the first cover base 101 covering the fingerprint sensor 20 and the decoration layer 110A. In other words, the protective layer 90 is provided continuously adjacent to the first alkali-free glass layer 104, the second alkali-free glass layer 105, and a side face 101c of the first cover base 101. The protective layer 90 is provided on the entire circumference of the first cover base 101, and the protective layer 90 is provided also on an end face of the alkali glass layer 103. Consequently, the occurrence of microcracks on the end face is lessened, whereby the first cover base 101 can be increased in strength.

An inorganic-organic copolymer such as an organic film containing silicon (Si) can be used for the protective layer 90, for example. The protective layer 90 is formed to have a more homogeneous film thickness by dipping through which the first cover base 101 provided with the fingerprint sensor 20 is immersed into a solution containing the inorganic-organic copolymer and then raised at a certain speed. A resin material may be used for the protective layer 90. Using the inorganic-organic copolymer can increase hardness.

As illustrated in FIG. 39, a configuration of the first switching elements Tr, the second switching elements Trx, the first electrodes 25, the second electrode 26, and the like of the present embodiment is similar to the first embodiment. In the present embodiment, the protective layer 90 is provided on the first electrodes 25 with the insulating layer 57 interposed therebetween. Thus, the second cover base 102 and the adhesive layer 71 are not provided on the first electrodes 25. Consequently, the distance between the upper face 90a of the protective layer 90 and the first electrodes 25 can be reduced. Consequently, the detection performance of the fingerprint sensor 20 can be increased.

In the present embodiment, an inorganic insulating material such as silicon oxide (SiO2) or silicon nitride (SiN) is used as a flattening layer 59a provided on the source electrode 62 (the signal line SGL), the drain electrodes 63 and 67, and the source electrode 66. With this configuration, the fingerprint sensor 20 does not contain any organic resin, and a manufacturing process can be simplified.

Figure 40:
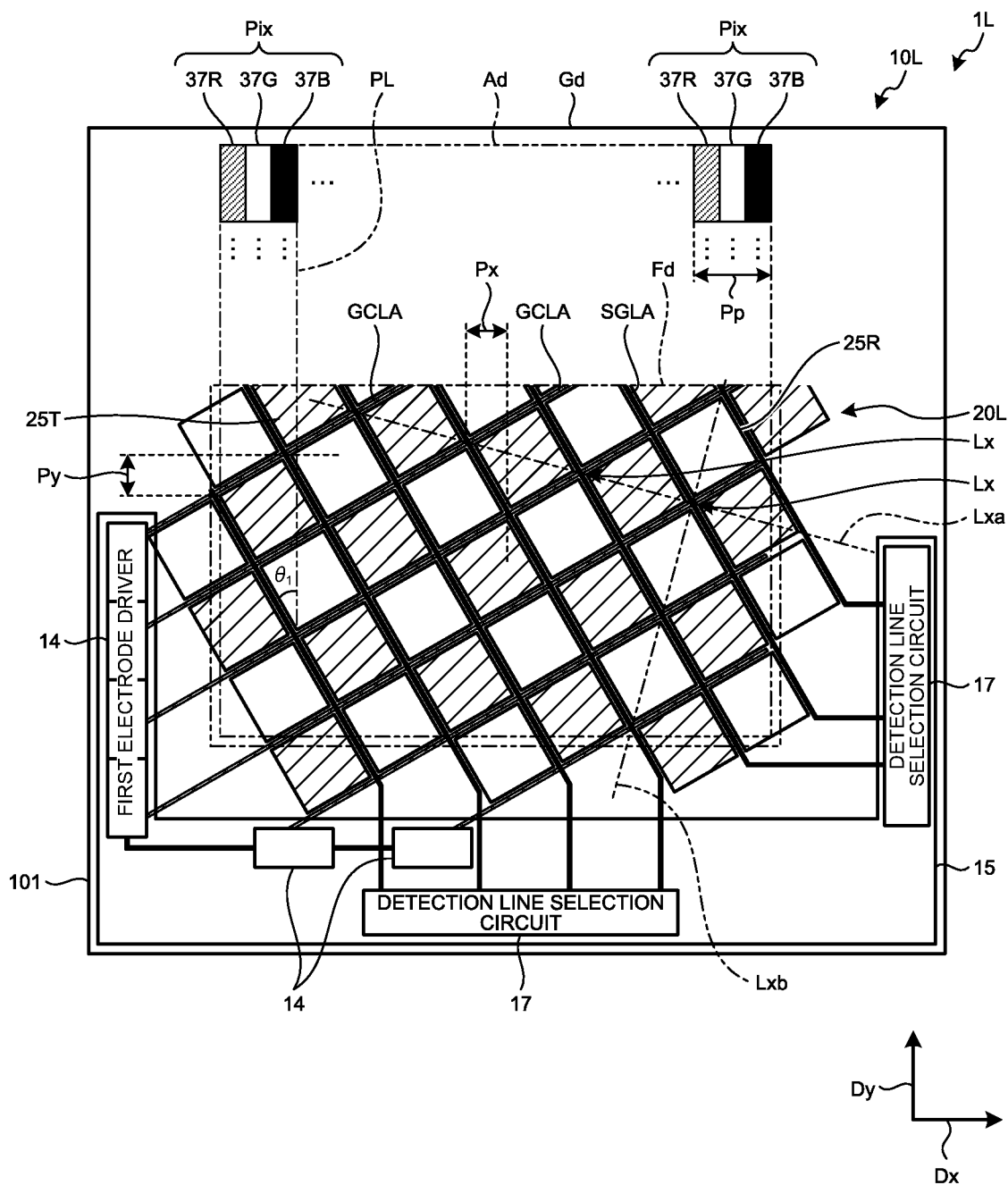
FIG. 40 is an illustrative diagram for illustrating the relation between the arrangement of pixels of a display apparatus and the arrangement of drive electrodes and detection electrodes according to a modification of the sixth embodiment.
Figure 41:
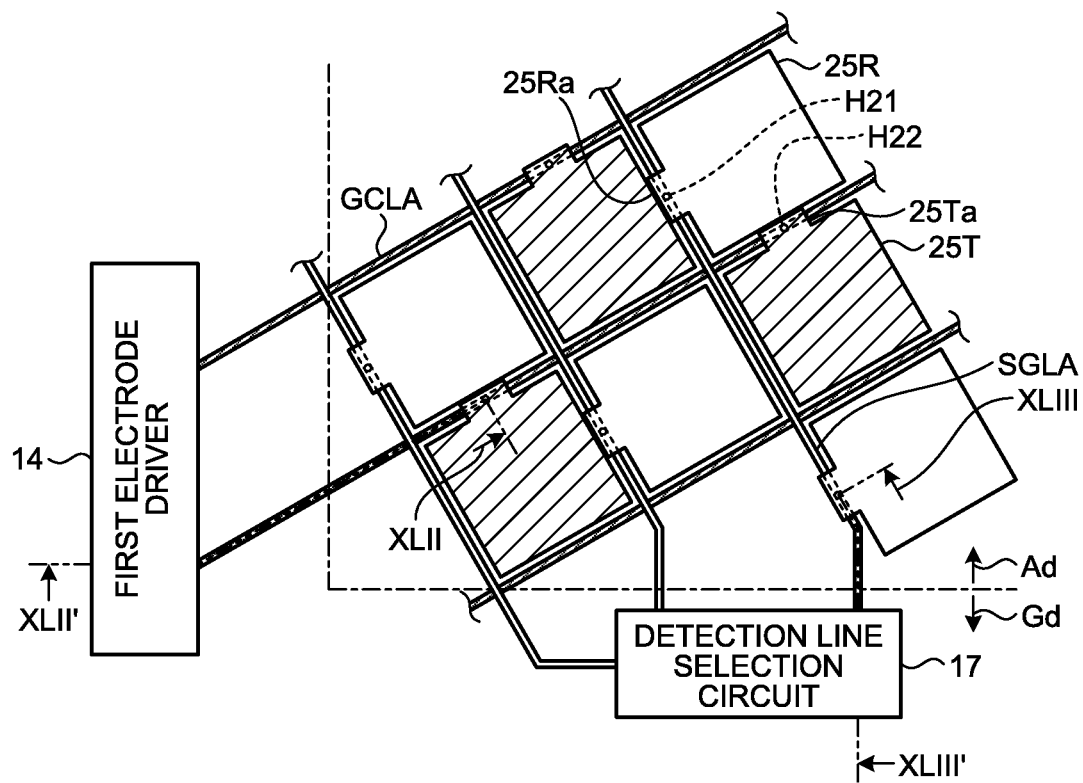
FIG. 41 is a plan view schematically illustrating a coupling structure of the drive electrodes and drive signal lines and a coupling structure of the detection electrodes and detection lines according to the modification of the sixth embodiment.
Figure 42:
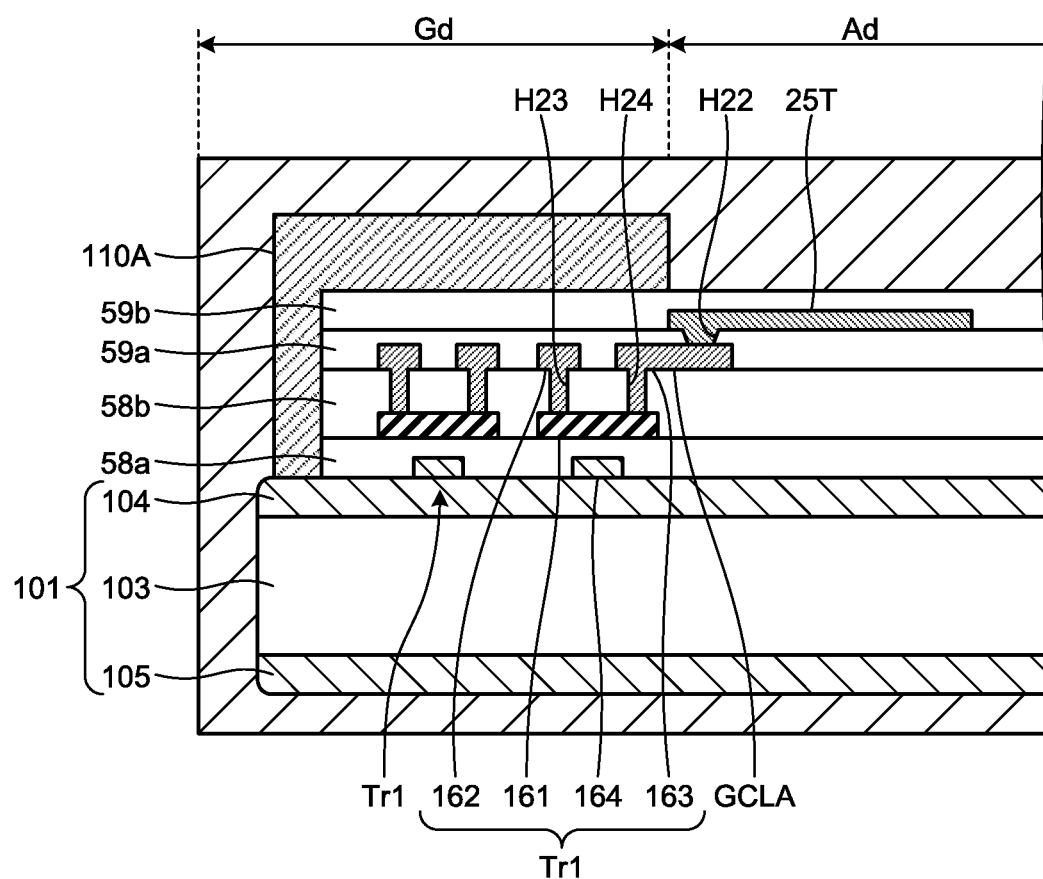
FIG. 42 is a sectional view along the line XLII-XLII' in FIG. 41.
Figure 43:
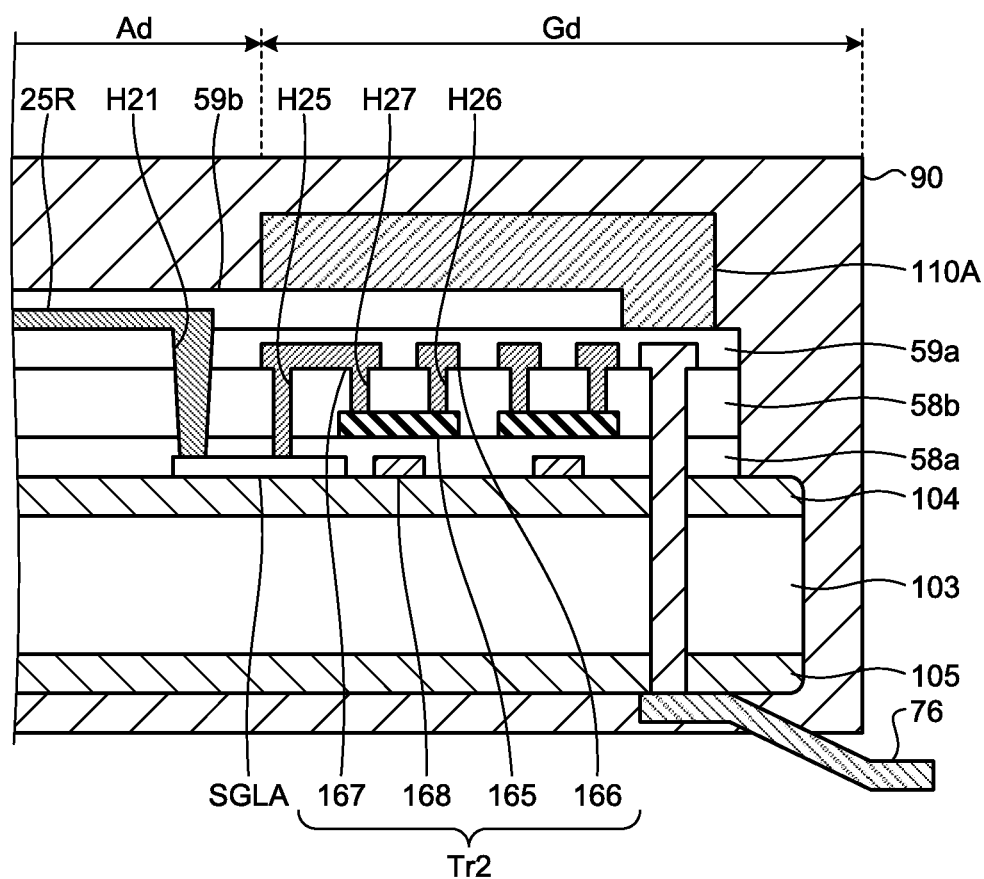
FIG. 43 is a sectional view along the line XLIII-XLIII' in FIG. 41.

FIG. 40 is an illustrative diagram for illustrating the relation between the arrangement of pixels of a display apparatus and the arrangement of drive electrodes and detection electrodes according to a modification of the sixth embodiment. FIG. 41 is a plan view schematically illustrating a coupling structure of the drive electrodes and drive signal lines and a coupling structure of the detection electrodes and detection lines according to the modification of the sixth embodiment. FIG. 42 is a sectional view along the line XLII-XLII' in FIG. 41. FIG. 43 is a sectional view along the line XLIII-XLIII' in FIG. 41.

As illustrated in FIG. 40, in a fingerprint sensor 20L of a cover member 10L of the present modification, drive electrodes 25T and detection electrodes 25R are alternately arranged in a matrix manner in the transmissive area Ad of the first cover base 101 in place of the first electrodes 25. The drive electrodes 25T and the detection electrodes 25R are each square-shaped and are arranged so as to cause one side of the drive electrodes 25T and one side of the detection electrodes 25R to face each other. In FIG. 40, the drive electrodes 25T are illustrated by hatching.

In the transmissive area Ad of the first cover base 101, drive signal lines GCLA and detection lines SGLA are arranged crossing each other. The drive electrodes 25T or the detection electrodes 25R are arranged in the respective areas surrounded by drive signal lines GCLA and detection lines SGLA. The drive electrodes 25T and the detection electrodes 25R are alternately arranged along the drive signal lines GCLA, and the drive electrodes 25T and the detection electrodes 25R are alternately arranged along the detection lines SGLA.

As illustrated in FIG. 41, a coupling part 25Ta that protrudes from part of one side of a drive electrode 25T to a position overlapping with a drive signal line GCLA is provided. The coupling part 25Ta is coupled to the drive signal line GCLA through a contact hole H22. The drive signal lines GCLA are coupled to the first electrode driver 14 provided in the frame area Gd. With this configuration, the drive electrodes 25T are supplied with the drive signal Vf from the first electrode driver 14 via the drive signal lines GCLA.

A coupling part 25Ra that protrudes from part of one side of a detection electrode 25R to a position overlapping with a detection line SGLA is provided. The coupling part 25Ra is coupled to the detection line SGLA through a contact hole H21. The detection lines SGLA are coupled to a detection line selection circuit 17 provided in the frame area Gd.

When the drive signal Vf is supplied to the drive electrodes 25T, a fringe electric field is generated in between the drive electrodes 25T and the detection electrodes 25R that are adjacent to each other, and a capacitance between the drive electrodes 25T and the detection electrodes 25R changes by the unevenness of a finger that comes into contact with or close to the cover member 10L. The detection electrodes 25R output the detection signal Vdet responsive to the capacitance change between the drive electrodes 25T and the detection electrodes 25R to the detector 40 (refer to FIG. 5) via the detection lines SGLA. The first electrode driver 14 successively selects the drive signal lines GCLA to drive the drive electrodes 25T, and the detection line selection circuit 17 successively selects the detection lines SGLA and supplies the detection signal Vdet output from the detection electrodes 25R to the detector 40 (refer to FIG. 5). With this operation, based on the basic principle of touch detection of the mutual capacitance type, the unevenness of the surface of the object to be detected such as a fingerprint of a finger that comes into contact with or close to the cover member 10L can be detected. In other words, the drive electrodes 25T correspond to the drive electrode E2 in the basic principle of touch detection of the mutual capacitance type, whereas the detection electrodes 25R correspond to the detection electrode E3.

In the present embodiment, with a plurality of drive electrodes 25T coupled to one drive signal line GCLA as one drive electrode block, the first electrode driver 14 can successively drive each of the drive electrode blocks. The first electrode driver 14 may also collectively drive the drive electrode blocks. The detection line selection circuit 17 may successively select the detection electrode 25R adjacent to the drive electrode 25T as an object to be driven in a direction along one drive signal line GCLA or may successively select the detection electrode 25R adjacent to the drive electrode 25T as an object to be driven in a direction along one detection line SGLA.

The fingerprint sensor 20 performs the detection operation based on the basic principle of touch detection of the self-capacitance type. In the present modification, the distance between the upper face 90a of the protective layer 90 and the first electrodes 25 can be reduced. With this configuration, the electric lines of force of the fringe electric field generated in between the drive electrodes 25T and the detection electrodes 25R reach above the upper face 90a of the protective layer 90. Consequently, the fingerprint sensor 20L of the present modification can perform fingerprint detection based on the basic principle of touch detection of the mutual capacitance type.

FIG. 42 is a sectional view schematically illustrating a coupling structure of a switching element Tr1 included in the first electrode driver 14 and the drive electrode 25T. FIG. 43 is a sectional view schematically illustrating a coupling structure of a switching element Tr2 included in the detection line selection circuit 17 and the detection electrode 25R. As illustrated in FIG. 42, the switching element Tr1 is provided on the first alkali-free glass layer 104 of the first cover base 101. Specifically, a gate electrode 164 is provided on the first alkali-free glass layer 104. On the upper side of the gate electrode 164, a semiconductor layer 161 is provided with the insulating layer 58a interposed therebetween. On the upper side of the semiconductor layer 161, a drain electrode 163, the drive signal line GCLA, and a source electrode 162 are provided with the insulating layer 58b interposed therebetween. On the upper side of the drain electrode 163, the drive signal line GCLA, and the source electrode 162, the drive electrode 25T is provided with the flattening layer 59a interposed therebetween.

The source electrode 162 and the semiconductor layer 161 are coupled to each other through a contact hole H23. The semiconductor layer 161 and the drive signal line GCLA are coupled to each other through a contact hole H24. A part of the drive signal line GCLA overlapping with the semiconductor layer 161 functions as the drain electrode 163. The drive signal line GCLA and the drive electrode 25T are coupled to each other through the contact hole H22. The drive electrode 25T is thus coupled to the switching element Tr1 via the drive signal line GCLA.

As illustrated in FIG. 43, the switching element Tr2 included in the detection line selection circuit 17 is provided on the first alkali-free glass layer 104 of the first cover base 101. Specifically, a gate electrode 168 and the detection line SGLA are provided on the first alkali-free glass layer 104. On the upper side of the gate electrode 168 and the detection line SGLA, a semiconductor layer 165 is provided with the insulating layer 58a interposed therebetween. On the upper side of the semiconductor layer 165, a drain electrode 167 and a source electrode 166 are provided with the insulating layer 58b interposed therebetween. On the upper side of the drain electrode 167 and the source electrode 166, the detection electrode 25R is provided with the flattening layer 59a interposed therebetween.

The source electrode 166 and the semiconductor layer 165 are coupled to each other through a contact hole H26. The semiconductor layer 165 and the drain electrode 167 are coupled to each other through a contact hole H27. The drain electrode 167 and the detection line SGLA are coupled to each other through a contact hole H25. The detection line SGLA and the detection electrode 25R are coupled to each other through the contact hole H21. The detection electrode 25R is thus coupled to the switching element Tr2 via the detection line SGLA.

As illustrated in FIG. 42 and FIG. 43, the drive electrode 25T and the detection electrode 25R are provided on the same layer and are provided on a layer different from the drive signal line GCLA and the detection line SGLA. The drive signal line GCLA and the detection line SGLA are provided on different layers each other. With this configuration, at an intersection Lx illustrated in FIG. 40, the drive signal line GCLA and the detection line SGLA are provided so as to separate from each other. The drive electrode 25T and the detection electrode 25R may be provided on different layers. The drive signal line GCLA and the detection line SGLA can be provided on the same layer to make bridge coupling at the intersection Lx.

The following describes the relation between the arrangement of the pixels Pix and the arrangement of the drive electrodes 25T and the detection electrodes 25R. As illustrated in FIG. 40, in the transmissive area Ad, the pixels Pix of the display panel 30 are arranged in both the first direction Dx (a line direction) and the second direction Dy (a row direction). FIG. 40 illustrates only part of the pixels Pix.

Each of the pixels Pix includes a sub-pixel corresponding to a red color filter 37R, a sub-pixel corresponding to a green color filter 37G, and a sub-pixel corresponding to a blue color filter 37B as one group. The pixels Pix may be a combination of other colors or a combination of four or more colors. As illustrated in FIG. 40, a pitch with which the pixels Pix are repeatedly arranged in the first direction Dx is defined as an arrangement pitch Pp. A direction along an arrangement direction in which the pixels Pix are repeatedly arranged in the second direction Dy is defined as a pixel arrangement direction PL.

In a display apparatus 1L of the present embodiment, the drive electrodes 25T and the detection electrodes 25R of the fingerprint sensor 20L are arranged in a manner inclined relative to the pixel arrangement direction PL. An angle formed by one side of the detection electrode 25R and the pixel arrangement direction PL is defined as an angle $\theta_1$. The angle $\theta_1$ in the present embodiment is preferably in the range of 27 degrees to 38 degrees. In this case, the detection lines SGLA are inclined relative to the pixel arrangement direction PL by the angle $\theta_1$. The drive signal lines GCLA are orthogonal to the detection lines SGLA and are inclined relative to the pixel arrangement direction PL by an angle of (90 degrees-$\theta_1$).

The drive signal lines GCLA and the detection lines SGLA are thus provided in a manner inclined relative to the pixel arrangement direction PL of the pixels Pix. Consequently, the arrangement of the intersections Lx of the drive signal lines GCLA and the detection lines SGLA deviates from the arrangement of the pixels Pix in the first direction Dx (the line direction) and the arrangement of the pixels Pix in the second direction Dy (the row direction). Consequently, the occurrence of moire can be lessened. By setting the angle $\theta_1$ to the range of 27 degrees to 38 degrees, the occurrence of moire can be lessened more effectively.

In the present embodiment, at the intersections Lx of the drive signal lines GCLA and the detection lines SGLA, the drive signal lines GCLA and the detection lines SGLA overlap with each other. Consequently, light transmittance at the intersections Lx is reduced. Consequently, moire may occur depending on the relation between an arrangement direction in which the intersections Lx are repeatedly arranged and the pixel arrangement direction PL of the pixels Pix. Moire may occur depending on the relation between the arrangement pitch in which the intersections Lx are repeatedly arranged and the arrangement pitch Pp of the pixels Pix.

As illustrated in FIG. 40, a direction in which the intersections Lx are repeatedly arranged in a diagonal direction of the drive electrode 25T is defined as an arrangement direction Lxa. A direction in which the intersections Lx are repeatedly arranged in a diagonal direction of the detection electrode 25R is defined as an arrangement direction Lxb. As described above, the drive electrodes 25T and the detection electrodes 25R are arranged in a manner inclined relative to the pixel arrangement direction PL by the angle $\theta_1$. With this configuration, the arrangement direction Lxa and the arrangement direction Lxb of the intersections Lx are each inclined relative to the pixel arrangement direction PL of the pixels Pix. Consequently, the occurrence of moire caused by the arrangement direction Lxa and the arrangement direction Lxb of the intersections Lx and the pixel arrangement direction PL of the pixels Pix can be lessened.

As illustrated in FIG. 40, an arrangement pitch of the intersections Lx in the first direction Dx in the intersections Lx arranged along one detection line SGLA is defined as an arrangement pitch Px. An arrangement pitch of the intersections Lx in the second direction Dy in the intersections Lx arranged along one drive signal line GCLA is defined as an arrangement pitch Py.

In the present embodiment, the arrangement pitch Px and the arrangement pitch Py of the intersections Lx are each a half-integral multiple (±0.1 multiple) of the arrangement pitch Pp of the pixels Pix. In other words, the arrangement pitch Px and the arrangement pitch Py satisfy the relation Px, Py=Pp×((n+½)±0.1), where n=1, 2, 3, . . . . Specifically, the arrangement pitch Px and the arrangement pitch Py of the intersections Lx are preferably 1.4 multiple, 1.6 multiple, 2.4 multiple, or 2.6 multiple, . . . of the arrangement pitch Pp of the pixels Pix.

The display apparatus 1L of the present embodiment thus has the arrangement pitch Px and the arrangement pitch Py of the intersections Lx as pitches deviating from the arrangement pitch Pp of the pixels Pix, whereby the occurrence of moire can be lessened.

In the present embodiment, the shape, the arrangement, and the like of the drive electrodes 25T and the detection electrodes 25R can be modified as appropriate. A method for driving the drive electrodes 25T, the order of drive, and detection operation such as the order of selection of the detection electrodes 25R can also be modified as appropriate. Although the protective layer 90 covers the entire circumference of the first cover base 101, the protective layer 90 may be provided at part of the first cover base 101 such as a case in which the protective layer 90 is provided only on the first alkali-free glass layer 104 side of the first cover base 101.

Although the preferred embodiments of the present invention have been described, the present invention is not limited to these embodiments. The details disclosed in the embodiments are only by way of example, and various modifications can be made without departing from the gist of the present invention. Appropriate modifications made without departing from the gist of the present invention also naturally belong to the technical scope of the present invention. Without departing from the gist of the embodiments and the modifications, at least one of various omissions, replacements, and modifications of the components can be made.

What is claimed is:

1. A cover member comprising:
a first cover base;
a sensor that is provided on the first cover base and comprises a plurality of first electrodes, the first electrodes being configured to detect unevenness of a surface of an object to be detected that comes into contact with or close to the first cover base;
a flexible board, a first side of the flexible board being located next to the first cover base; and
a second cover base facing the first cover base; wherein
the second cover base overlaps the first side of the flexible board above the first cover base.

2. The cover member according to claim 1, further comprising,
an adhesive layer provided between the first electrodes and the first side of the flexible board and the second cover base.

3. The cover member according to claim 2, further comprising,
a decoration layer that is provided on a surrounding area of the second cover base, wherein
the decoration layer covers the first side of the flexible board.

4. The cover member according to claim 3, wherein
the decoration layer defines a transmissive area and a frame area that is outside the transmissive area, and
the decoration layer overlaps a part of the first electrodes and the first side of the flexible board.

5. The cover member according to claim 4, wherein
the sensor overlaps a part of the transmissive area.

6. The cover member according to claim 5, wherein
the adhesive layer is provided to the transmissive area, and a thickness of the adhesive layer facing the first cover base via the sensor overlapping being thinner than a thickness of the adhesive layer facing the first cover base directly.

7. The cover member according to claim 4, wherein the sensor overlaps all of the transmissive area.

8. The cover member according to claim 1, wherein the sensor further comprises a thin film transistor layer provided on the first cover base,
the plurality of the first electrodes are provided on the thin film transistor layer, and
the first side of the flexible board is fixed on the thin film transistor layer.

9. The cover member according to claim 8, wherein the thin film transistor layer includes a plurality of switching elements connected with the plurality of the first electrodes respectively, and
the first electrodes are supplied with a drive signal via the switching elements and configured to output a detection signal responsive to a capacitance change between the first electrodes and the object to be detected.

10. The cover member according to claim 9, wherein the sensor further comprises gate lines configured to supply a scan signal that scans the plurality of the switching elements, and signal lines configured to supply a signal to the plurality of the switching elements.

11. The cover member according to claim 10, wherein the sensor further comprises a gate driver connected to the gate lines, and a first electrode driver connected to the signal lines, and
at least one of the gate driver and the first electrode driver is located at a position between the plurality of the first electrodes and the flexible board.

12. The cover member according to claim 10, wherein the first cover base comprises:
an alkali glass layer;
a first alkali-free glass layer provided on one face of the alkali glass layer; and
a second alkali-free glass layer that is provided on another face of the alkali glass layer, and
the gate lines are directly formed on the first alkali-free glass layer.

13. The cover member according to claim 12, wherein the first alkali-free glass layer has a coefficient of thermal expansion substantially the same as a coefficient of thermal expansion of the second alkali-free glass layer and has a coefficient of thermal expansion smaller than a coefficient of thermal expansion of the alkali glass layer.

14. The cover member according to claim 10, wherein the first cover base comprises:
an alkali glass layer;
a first alkali-free glass layer provided on one face of the alkali glass layer; and
a second alkali-free glass layer that is provided on another face of the alkali glass layer, and
the gate lines are formed on the first alkali-free glass layer via a passivation film.

15. The cover member according to claim 14, wherein the first alkali-free glass layer has a coefficient of thermal expansion substantially the same as a coefficient of thermal expansion of the second alkali-free glass layer and has a coefficient of thermal expansion smaller than a coefficient of thermal expansion of the alkali glass layer.

16. The cover member according to claim 1, wherein the sensor has a plurality of second electrodes arranged in a matrix manner and facing the first electrodes, and
the first electrodes are provided at positions further away from the first cover base than the second electrodes in a direction perpendicular to a surface of the first cover base.

17. The cover member according to claim 16, wherein the surface of the object is detected based on a detection signal output based on a capacitance change of the second electrodes.

18. The cover member according to claim 16, wherein at least one of the second electrodes is supplied with a guard signal for lessening a change in capacitance between the second electrode and the first electrodes.

19. The cover member according to claim 1, wherein the first electrodes comprise first detection electrodes to which detection lines are coupled and first drive electrodes to which drive signal lines are coupled,
the sensor comprises a drive circuit that comprises a switching element configured to select the drive signal lines and configured to supply a drive signal to the first drive electrodes via the drive signal lines, and
the first detection electrodes are configured to output a detection signal based on a capacitance change between the first detection electrodes and the first drive electrodes.

20. The cover member according to claim 1, wherein the second cover base is formed of glass thinner than the first cover base.

21. The cover member according to claim 1, wherein the second cover base is a resin film.

* * * * *